(12) United States Patent
Talbot et al.

(10) Patent No.: US 11,966,568 B2
(45) Date of Patent: Apr. 23, 2024

(54) GENERATING DATA VISUALIZATIONS ACCORDING TO AN OBJECT MODEL OF SELECTED DATA SOURCES

(71) Applicant: Tableau Software, Inc., Seattle, WA (US)

(72) Inventors: Justin Talbot, Seattle, WA (US); Roger Hau, Seattle, WA (US); Daniel Cory, Seattle, WA (US); Jiyoung Oh, San Carlos, CA (US); Teresa Roberts, Palo Alto, CA (US)

(73) Assignee: Tableau Software, Inc., Seattle, WA (US)

( * ) Notice: Subject to any disclaimer, the term of this patent is extended or adjusted under 35 U.S.C. 154(b) by 337 days.

(21) Appl. No.: 16/236,611

(22) Filed: Dec. 30, 2018

(65) Prior Publication Data
US 2020/0125559 A1 Apr. 23, 2020

Related U.S. Application Data

(60) Provisional application No. 62/748,968, filed on Oct. 22, 2018.

(51) Int. Cl.
*G06F 16/28* (2019.01)
*G06F 3/04842* (2022.01)
(Continued)

(52) U.S. Cl.
CPC ...... *G06F 3/04842* (2013.01); *G06F 3/04845* (2013.01); *G06F 3/0486* (2013.01);
(Continued)

(58) Field of Classification Search
None
See application file for complete search history.

(56) References Cited

U.S. PATENT DOCUMENTS

| 5,511,186 A | 4/1996 | Carhart et al. |
| 5,917,492 A | 6/1999 | Bereiter et al. |

(Continued)

OTHER PUBLICATIONS

"Mondrian 3.0.4 Technical Guide", 2009 (Year: 2009).*
(Continued)

*Primary Examiner* — Dawaune A Conyers
(74) *Attorney, Agent, or Firm* — Morgan, Lewis & Bockius LLP

(57) ABSTRACT

The method receives a visual specification, which specifies a data source, visual variables, and data fields from the data source. Each visual variable is associated with data fields and each data field is either a dimension or a measure. From an object model of the data source, the method identifies a minimal subtree that includes all of the dimension data fields and constructs a query from the minimal subtree. The method executes the query against the data source to retrieve a set of tuples, each tuple comprising a unique ordered combination of data values for the dimension data fields. For each tuple, the method forms an extended tuple by appending aggregated data values corresponding to each measure data field. The method then builds and displays a data visualization according to the data fields in the extended tuples and according to the visual variables to which the data fields are associated.

20 Claims, 50 Drawing Sheets

(51) Int. Cl.

| | | |
|---|---|---|
| *G06F 3/04845* | (2022.01) | |
| *G06F 3/0486* | (2013.01) | |
| *G06F 16/21* | (2019.01) | |
| *G06F 16/22* | (2019.01) | |
| *G06F 16/242* | (2019.01) | |
| *G06F 16/2453* | (2019.01) | |
| *G06F 16/2455* | (2019.01) | |
| *G06F 16/248* | (2019.01) | |
| *G06F 16/26* | (2019.01) | |
| *G06T 11/20* | (2006.01) | |
| *G06F 3/04847* | (2022.01) | |

(52) U.S. Cl.
CPC ........ *G06F 16/212* (2019.01); *G06F 16/2246* (2019.01); *G06F 16/2282* (2019.01); *G06F 16/242* (2019.01); *G06F 16/24535* (2019.01); *G06F 16/24544* (2019.01); *G06F 16/2456* (2019.01); *G06F 16/248* (2019.01); *G06F 16/26* (2019.01); *G06F 16/287* (2019.01); *G06T 11/206* (2013.01); *G06F 3/04847* (2013.01); *G06T 2200/24* (2013.01)

(56) References Cited

U.S. PATENT DOCUMENTS

| | | | |
|---|---|---|---|
| 6,189,004 | B1* | 2/2001 | Rassen ............... G06F 16/2423 |
| 6,199,063 | B1 | 3/2001 | Colby et al. |
| 6,212,524 | B1 | 4/2001 | Weissman et al. |
| 6,385,604 | B1 | 5/2002 | Bakalash et al. |
| 6,492,989 | B1 | 12/2002 | Wilkinson |
| 6,532,471 | B1 | 3/2003 | Ku et al. |
| 6,807,539 | B2 | 10/2004 | Miller et al. |
| 7,023,453 | B2 | 4/2006 | Wilkinson |
| 7,039,650 | B2 | 5/2006 | Adams et al. |
| 7,176,924 | B2 | 2/2007 | Wilkinson |
| 7,290,007 | B2 | 10/2007 | Farber et al. |
| 7,302,447 | B2 | 11/2007 | Dettinger et al. |
| 7,337,163 | B1 | 2/2008 | Srinivasan et al. |
| 7,426,520 | B2 | 9/2008 | Gorelik et al. |
| 7,800,613 | B2 | 9/2010 | Hanrahan et al. |
| 7,941,521 | B1 | 5/2011 | Petrov et al. |
| 8,082,243 | B2 | 12/2011 | Gorelik et al. |
| 8,442,999 | B2 | 5/2013 | Gorelik et al. |
| 8,874,613 | B2 | 10/2014 | Gorelik et al. |
| 9,165,029 | B2 | 10/2015 | Bhoovaraghavan et al. |
| 9,336,253 | B2 | 5/2016 | Gorelik et al. |
| 9,563,674 | B2 | 2/2017 | Hou et al. |
| 9,613,086 | B1* | 4/2017 | Sherman ............... G06F 16/248 |
| 9,710,527 | B1 | 7/2017 | Sherman |
| 9,779,150 | B1 | 10/2017 | Sherman et al. |
| 2001/0054034 | A1 | 12/2001 | Arning et al. |
| 2002/0055939 | A1 | 5/2002 | Nardone et al. |
| 2003/0023608 | A1 | 1/2003 | Egilsson et al. |
| 2004/0103088 | A1 | 5/2004 | Cragun et al. |
| 2004/0122844 | A1 | 6/2004 | Malloy et al. |
| 2004/0139061 | A1 | 7/2004 | Colosi et al. |
| 2004/0243593 | A1* | 12/2004 | Stolte ............... G06F 16/212 |
| 2005/0038767 | A1 | 2/2005 | Verschell et al. |
| 2005/0060300 | A1 | 3/2005 | Stolte et al. |
| 2005/0182703 | A1 | 8/2005 | D'hers et al. |
| 2006/0010143 | A1 | 1/2006 | Netz et al. |
| 2006/0167924 | A1 | 7/2006 | Bradlee et al. |
| 2006/0173813 | A1 | 8/2006 | Zorola |
| 2006/0206512 | A1 | 9/2006 | Hanrahan et al. |
| 2006/0294081 | A1 | 12/2006 | Dettinger et al. |
| 2006/0294129 | A1 | 12/2006 | Stanfill et al. |
| 2007/0006139 | A1 | 1/2007 | Rubin |
| 2007/0156734 | A1 | 7/2007 | Dipper et al. |
| 2008/0016026 | A1 | 1/2008 | Farber et al. |
| 2008/0027957 | A1 | 1/2008 | Bruckner et al. |
| 2009/0006370 | A1 | 1/2009 | Li et al. |
| 2009/0319548 | A1 | 12/2009 | Brown et al. |
| 2010/0005054 | A1 | 1/2010 | Smith et al. |
| 2010/0005114 | A1 | 1/2010 | Dipper |
| 2010/0077340 | A1 | 3/2010 | French et al. |
| 2011/0131250 | A1 | 6/2011 | Stolte et al. |
| 2012/0116850 | A1 | 5/2012 | Abe et al. |
| 2012/0117453 | A1 | 5/2012 | Mackinlay et al. |
| 2012/0284670 | A1 | 11/2012 | Kashik et al. |
| 2013/0080584 | A1 | 3/2013 | Benson |
| 2013/0159307 | A1 | 6/2013 | Wolge et al. |
| 2013/0166498 | A1 | 6/2013 | Aski et al. |
| 2013/0191418 | A1 | 7/2013 | Martin, Jr. et al. |
| 2014/0181151 | A1 | 6/2014 | Mazoue |
| 2014/0189553 | A1 | 7/2014 | Bleizeffer et al. |
| 2015/0039912 | A1 | 2/2015 | Payton et al. |
| 2015/0261728 | A1 | 9/2015 | Davis |
| 2015/0278371 | A1 | 10/2015 | Anand et al. |
| 2016/0092530 | A1 | 3/2016 | Jakubiak et al. |
| 2016/0092601 | A1 | 3/2016 | Lamas et al. |
| 2017/0132277 | A1 | 5/2017 | Hsiao et al. |
| 2017/0357693 | A1 | 12/2017 | Kumar et al. |
| 2018/0024981 | A1 | 1/2018 | Xia et al. |
| 2018/0129513 | A1 | 5/2018 | Gloystein et al. |
| 2018/0336223 | A1* | 11/2018 | Kapoor .................. G06F 16/14 |
| 2019/0065565 | A1 | 2/2019 | Stolte et al. |
| 2019/0108272 | A1 | 4/2019 | Talbot et al. |
| 2020/0073876 | A1 | 3/2020 | Lopez et al. |
| 2020/0125559 | A1* | 4/2020 | Talbot ................ G06F 3/04842 |
| 2020/0233905 | A1 | 7/2020 | Williams et al. |

OTHER PUBLICATIONS

Ganapavurapu, "Designing and Implementing a Data Warehouse Using Dimensional Modling," Thesis Dec. 7, 2014, XP055513055, retrieved from Internet: UEL:https://digitalepository.unm.edu/cgi/viewcontent.cgi?article=1091&context-ece_etds, 87 pgs.

Gyldenege, Preinterview First Office Action, U.S. Appl. No. 16/221,413, dated Jun. 11, 2020, 4 pgs.

Gyldenege, First Action Interview Office Action, U.S. Appl. No. 16/221,413, dated Jul. 27, 2020, 7 pgs.

Mansmann, "Extending the OLAP Technology to Handle Non-Conventional and Complex Data," Sep. 29, 2008, XP055513939, retrieve from URL/https://kops.uni-konstanz.de/hadle/123456789/5891, 1 pg.

Morton, Office Action, U.S. Appl. No. 14/054,803, dated Sep. 11, 2015, 22 pgs.

Morton, Final Office Action, U.S. Appl. No. 14/054,803, dated May 11, 2016, 22 pgs.

Morton, Notice of Allowance, U.S. Appl. No. 14/054,803, dated Mar. 1, 2017, 23 pgs.

Morton, Preinterview 1st Office Action, U.S. Appl. No. 15/497,130, dated Sep. 18, 2019, 6 pgs.

Morton, First Action Interview Office Action, U.S. Appl. No. 15/497,130, dated Feb. 19, 2020, 26 pgs.

Song et al., "SAMSTAR," Data Warehousing and OLAP, ACM, 2 Penn Plaza, Suite 701, New York, NY, Nov. 9, 2007, XP058133701, pp. 9 to 16, 8 pgs.

Tableau Software, Inc., International Search Report and Written Opinion, PCTUS2019056491, dated Jan. 2, 2020, 11 pgs.

Tableau Software, Inc., International Search Report and Written Opinion, PCTUS2018/044878, dated Oct. 22, 2018, 15 pgs.

Tableau Software, Inc., International Preliminary Report on Patentability, PCTUS2018/044878, dated Apr. 14, 2020, 12 pgs.

Talbot, Office Action, U.S. Appl. No. 14/801,750, dated May 7, 2018, 60 pgs.

Talbot, Final Office Action, U.S. Appl. No. 14/801,750, dated Nov. 28, 2018, 63 pgs.

Talbot, Office Action, U.S. Appl. No. 14/801,750, dated Jun. 24, 2019, 55 pgs.

Talbot, Preinterview First Office Action, U.S. Appl. No. 15/911,026, dated Jun. 9, 2020, 6 pgs.

Talbot, First Action Interview Office Action, U.S. Appl. No. 15/911,026, dated Jul. 22, 2020, 6 pgs.

Talbot, Preinterview First Office Action, U.S. Appl. No. 16/236,612, dated Oct. 29, 2020, 6 pgs.

(56) References Cited

OTHER PUBLICATIONS

Eubank, Office Action, U.S. Appl. No. 16/579,762, dated Feb. 19, 2021, 9 pgs.

Milligan et al., (Tableau 10 Complete Reference, Copyright © 2018 Packt Publishing Ltd., ISBN 978-1-78995-708-2, Electronic edition excerpts retrieved on [Sep. 23, 2020] from [https://learning.orelly.com/], (Year: 2018), 144 pgs.

Morton, Final Office Action, U.S. Appl. No. 15/497,130, dated Aug. 12, 2020, 19 pgs.

Sleeper, Ryan (Practical Tableau, Copyright © 2018 Evolytics and Ryan Sleeper, Published by OP'Reilly Media, Inc., ISBN 978-1-491-97731-6, Electronic editionexcerpts retrieved on [Sep. 23, 2020] from [https://learning.oreilly.com/], (Year: 2018), 101 pgs.

Morton, Office Action, U.S. Appl. No. 15/497,130, dated Jan. 8, 2021, 20 pgs.

Tableau Software, Inc., International Search Report and Written Opinion, PCT/US2020/045461, dated Oct. 28, 2020, 13 pgs.

Tableau All Releases, retrieved on [Oct. 2, 2020] from [https://www.tableau.com/products/all-features], (Year: 2020), 49 pgs.

Talbot, First Action Interview Office Action, U.S. Appl. No. 16/236,612, dated Dec. 22, 2020, 5 pgs.

Talbot, Office-Acton, U.S. Appl. No. 16/675,122, dated Oct. 8, 2020, 18 pgs.

Talbot, Notice of Allowance, U.S. Appl. No. 16/675,122, dated Jan. 26, 2021, 7 pgs.

Trishla Maru, "Running Analytics on SAP HANA and BW with MicroStrategy," Dec. 25, 2016, XP055738162, from https://silo.tips/download/running-analytics-on-sap-hana-and-bw-with-microstrategy, 37 pgs.

Weir, Office Action, U.S. Appl. No. 16/572,506, dated Dec. 11, 2020, 19 pgs.

Weir, Office Action, U.S. Appl. No. 16/679,233, dated Oct. 1, 2020, 9 pgs.

Weir, Notice of Allowance, U.S. Appl. No. 16/679,233, dated Jan. 11, 2021, 8 pgs.

Eubank, Office Action, U.S. Appl. No. 16/570,969, dated Jun. 15, 2021, 12 pgs.

Eubank, Notice of Allowance, U.S. Appl. No. 16/579,762, dated Aug. 18, 2021, 15 pgs.

Talbot, Final Office Action, U.S. Appl. No. 15/911,026, dated Dec. 16, 2020, 28 pgs.

Talbot, Final Office Action, U.S. Appl. No. 16/236,612, dated Apr. 28, 2021, 20 pgs.

Eubank, Notice of Allowance, U.S. Appl. No. 16/570,969, Dec. 18, 2023, 7 pgs.

\* cited by examiner

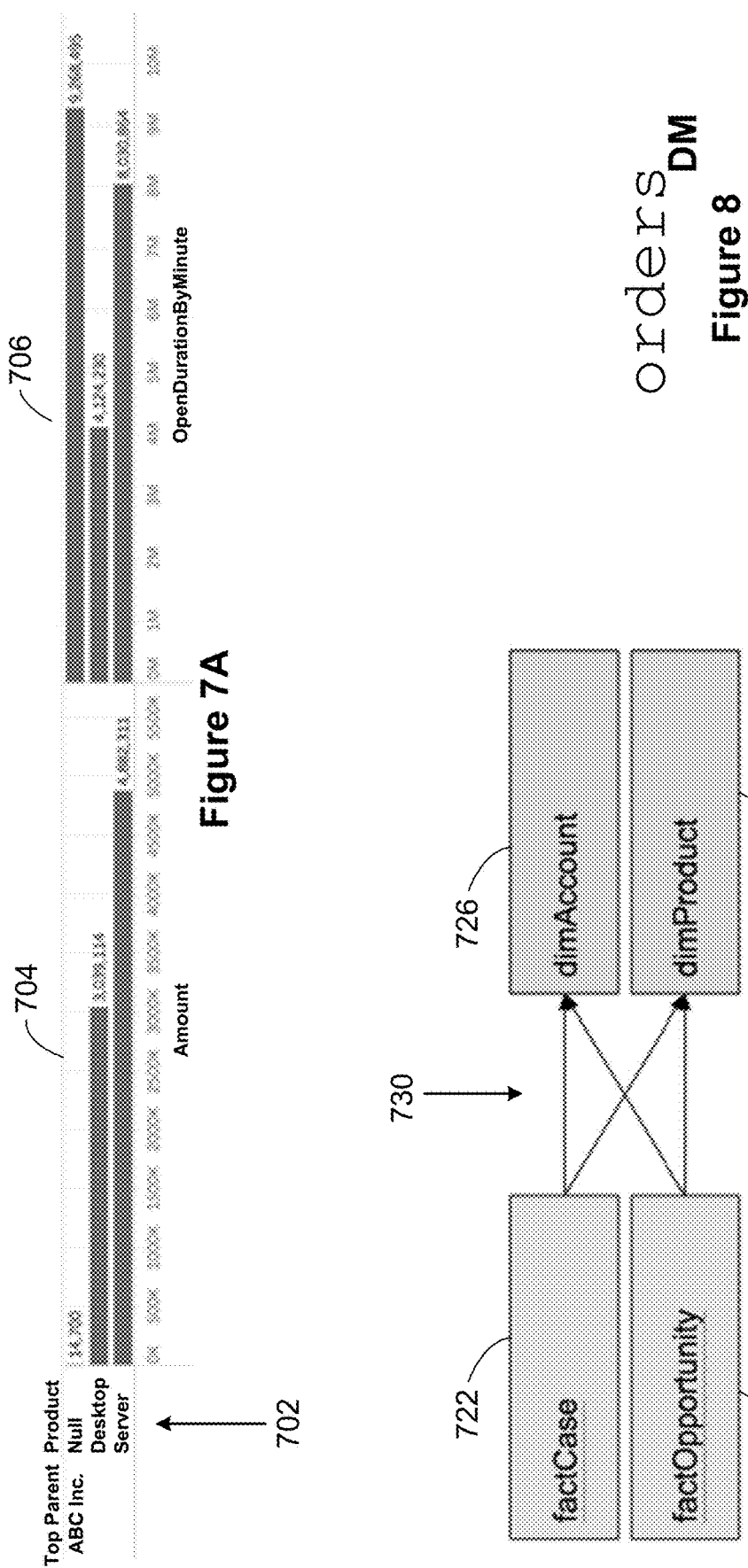

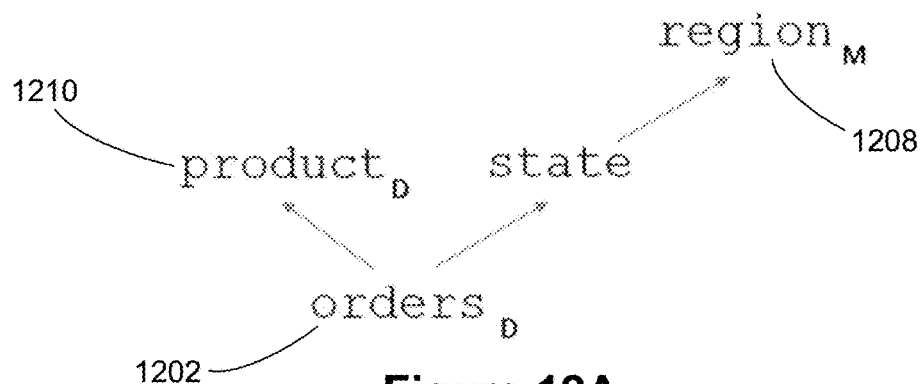
Figure 12A
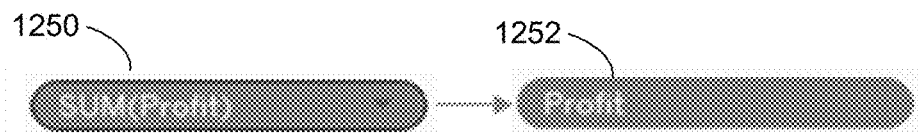
Figure 12B
Figure 12C

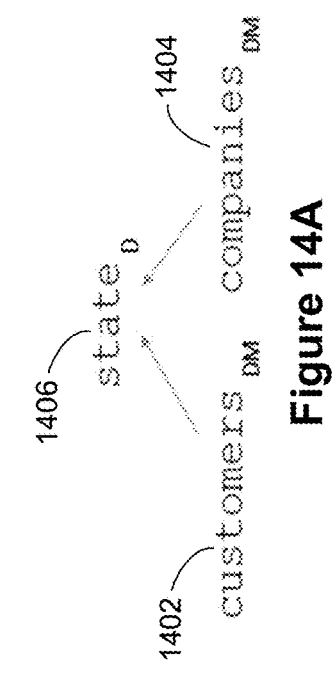
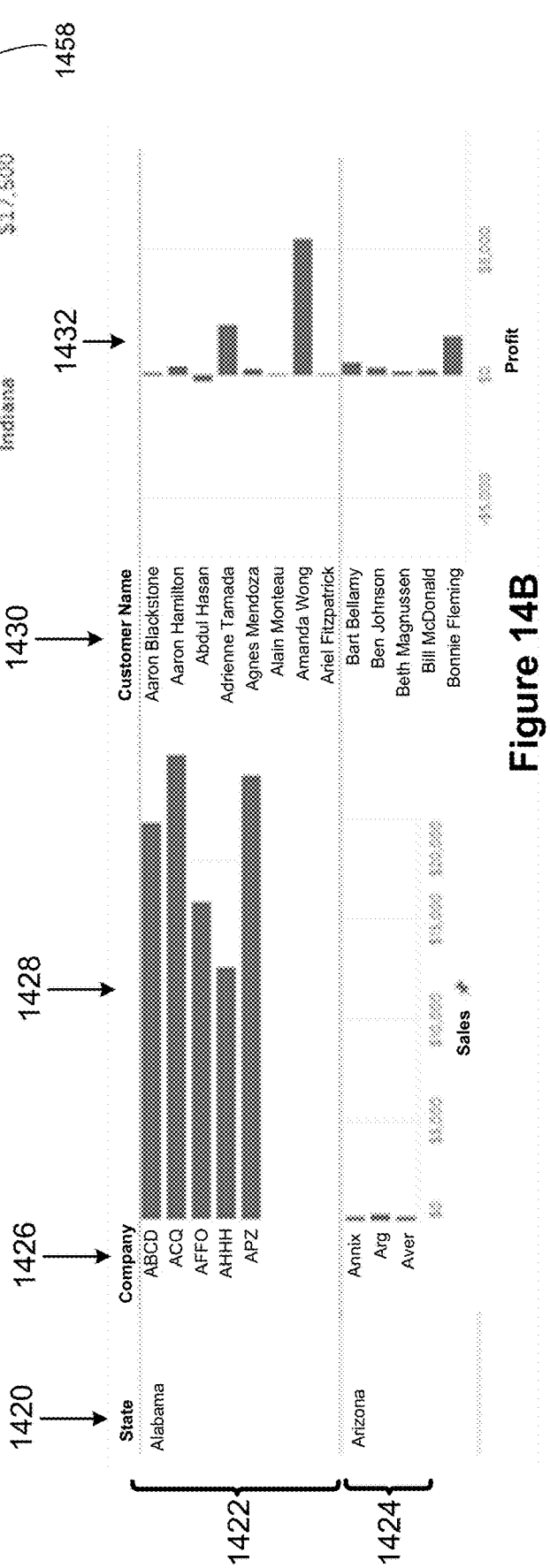
Figure 14A
Figure 14B
Figure 14C

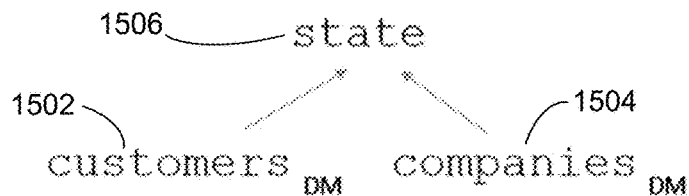
Figure 15
*Dimension*:
```
SELECT Dimension, <Reachable Dimensions>
FROM <Snowflake>
WHERE <Reachable Filters>
GROUP BY Dimension, <Reachable Dimensions>
```
*Measure*:
```
SELECT AGG(Measure), <Reachable Dimensions>
FROM <Snowflake>
WHERE <Reachable Filters>
GROUP BY <Reachable Dimensions>
```
Figure 16
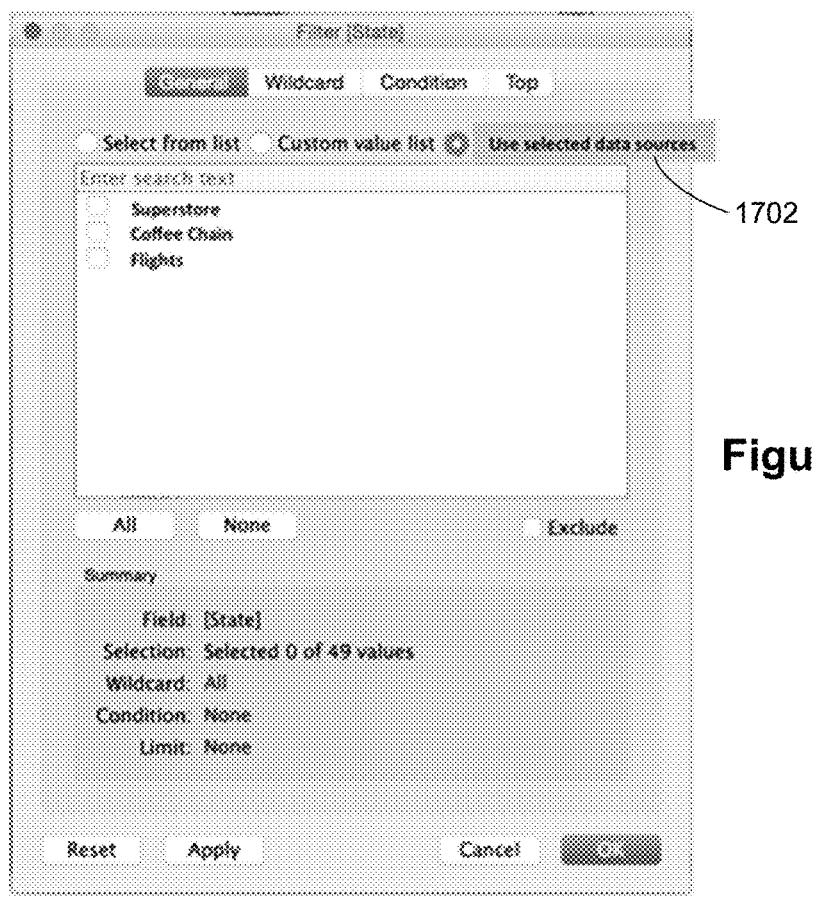
Figure 17

1802 — A method generates data visualizations.

1804 — The method is performed at a computing device having one or more processors and memory.

1806 — The memory stores one or more programs configured for execution by the one or more processors.

1808 — Receive a visual specification, which specifies one or more data sources, a plurality of visual variables, and a plurality of data fields from the one or more data sources.

1810 — Each visual variable is associated with a respective one or more of the data fields and each of the data fields is identified as either a dimension d or a measure m.

1812 — The visual specification includes one or more additional visual variables that are not associated with any data fields from the one or more data sources.

1814 — Each of the visual variables is one of: rows attribute, columns attribute, filter attribute, color encoding, size encoding, shape encoding, or label encoding.

1816 — For each measure m of the data fields, identify a respective reachable dimension set R(m) consisting of all dimensions d, of the data fields, that are reachable from the respective measure m by a sequence of many-to-one relationships in a predefined object model for the one or more data sources.

1820 — A dimension d is reachable from a measure m when the dimension d and the measure m are in a same class in the predefined object model, or else the measure m is an attribute of a first class $C_1$ in the predefined object model, the dimension d is an attribute of an nth class $C_n$ in the object model, with n ≥ 2, and there is a sequence of zero or more intermediate classes $C_2, ..., C_{n-1}$ in the predefined object model such that there is a many-to-one relationship between the classes $C_i$ and $C_{i+1}$ for each i = 1, 2, ..., n-1.

(A)

Figure 19A
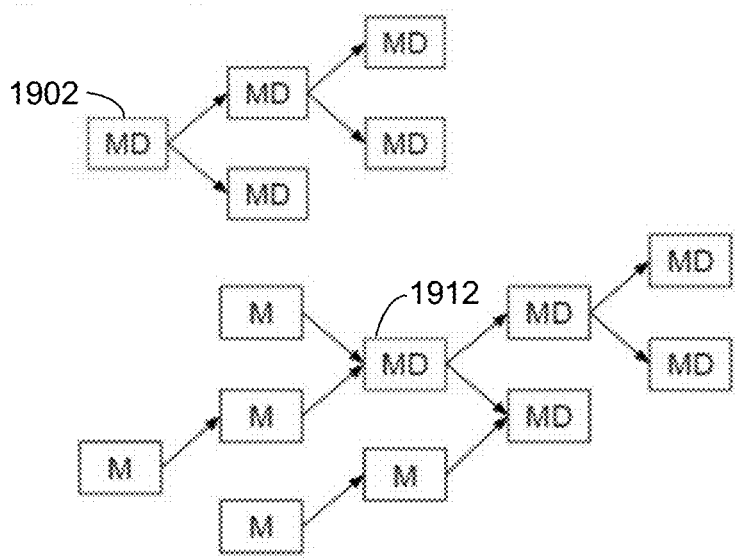
Figure 19B
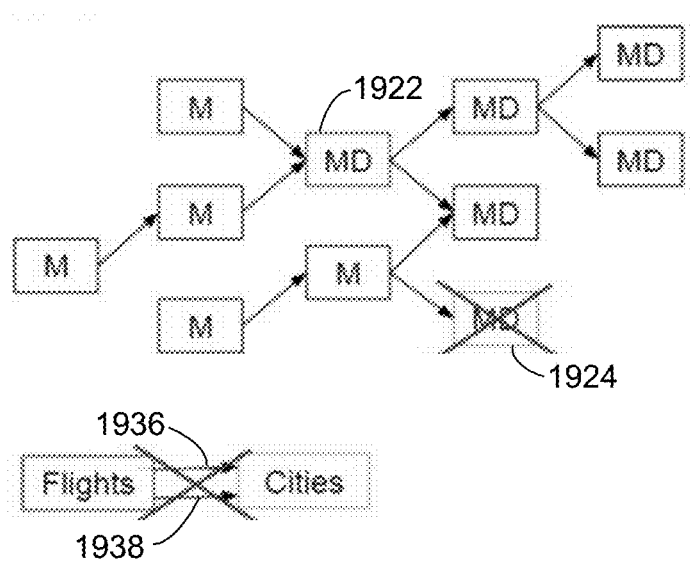
Figure 19C
Figure 19D

```
SELECT Sum(LineItems.Price) AS SumOfPrice, Orders.ZipCode,
     Products.Category
FROM Products INNER JOIN (Orders INNER JOIN LineItems ON
     Orders.ID = LineItems.Order) ON Products.Name =
     LineItems.Product
GROUP BY Orders.ZipCode, Products.Category
```

Figure 20C

```
SELECT DISTINCT Products.Category, Orders.[ZipCode]
FROM ((LineItems INNER JOIN Orders ON LineItems.Order =
     Orders.ID) INNER JOIN Products ON LineItems.Product =
     Products.Name)
```

Figure 20D

```
SELECT Products.Category, Orders.[ZipCode], Sum(LineItems.Price)
     AS SumOfPrice
FROM ((LineItems INNER JOIN Orders ON LineItems.Order =
     Orders.ID)
INNER JOIN Products ON LineItems.Product = Products.Name)
GROUP BY Products.Category, Orders.[ZipCode]
```

Figure 20E

```
SELECT [Step 1].Category, [Step 1].[ZipCode], [Step  2].SumOfPrice
FROM (SELECT DISTINCT Products.Category, Orders.[ZipCode]
     FROM ((LineItems INNER JOIN Orders ON LineItems.Order =    Orders.ID)
INNER JOIN Products ON LineItems.Product = Products.Name)) AS [Step 1]
INNER JOIN
     (SELECT Products.Category, Orders.[ZipCode], Sum(LineItems.Price) AS
     SumOfPrice FROM ((LineItems INNER JOIN Orders ON LineItems.Order =
     Orders.ID)
INNER JOIN Products ON LineItems.Product = Products.Name)
GROUP BY Products.Category, Orders.[ZipCode]) AS [Step 2] ON ([Step
     1].[ZipCode] = [Step 2].[ZipCode]) AND ([Step1].Category = [Step
     2].Category)
```

| ID | Price | SalesTax |
|---|---|---|
| 1 | $20.00 | $4.21 |
| 1 | $25.00 | $4.21 |
| 2 | $15.00 | $4.01 |
| 2 | $15.00 | $4.01 |
| 2 | $12.00 | $4.01 |
| 3 | $15.00 | $3.15 |
| 3 | $20.00 | $3.15 |
| 4 | $12.00 | $4.95 |
| 4 | $25.00 | $4.95 |
| 4 | $15.00 | $4.95 |
| 5 | $50.00 | $6.41 |
| 5 | $15.00 | $6.41 |
| 6 | $18.00 | $3.02 |
| 6 | $15.00 | $3.02 |
| 7 | $12.00 | $3.82 |
| 7 | $8.00 | $3.82 |
| 7 | $20.00 | $3.82 |
| 8 | | $0.00 |

2142 for rows with ID=1; 2144 for rows with ID=4

Figure 21C

```
SELECT LineItems.Order, Sum(LineItems.Price) AS SumOfPrice,
    Sum(Orders.SalesTax) AS SumOfSalesTax
FROM LineItems INNER JOIN Orders ON LineItems.Order = Orders.ID
GROUP BY LineItems.Order
```

Figure 21D

```
SELECT DISTINCT Orders.ID
FROM Orders
```

Figure 21E

```
SELECT Orders.ID, Sum(LineItems.Price) AS SumOfPrice
FROM LineItems INNER JOIN Orders ON LineItems.[Order] =
    Orders.ID
GROUP BY Orders.ID
```

Figure 21F

```
SELECT Orders.ID, Sum(Orders.SalesTax) AS SumOfSalesTax
FROM Orders
GROUP BY Orders.ID
```

Figure 21G

```
SELECT [Step 1].ID, [Step 2a].SumOfPrice, [Step 2b].SumOfSalesTax
FROM ((SELECT DISTINCT Orders.ID FROM Orders) AS [Step 1]
      LEFT JOIN (SELECT Orders.ID, Sum(LineItems.Price) AS SumOfPrice
            FROM LineItems INNER JOIN Orders ON LineItems.[Order] = Orders.ID GROUP
            BY Orders.ID) AS [Step 2a] ON [Step 1].ID = [Step 2a].ID)
LEFT JOIN (SELECT Orders.ID, Sum(Orders.SalesTax) AS SumOfSalesTax
      FROM Orders GROUP BY Orders.ID) AS [Step 2b] ON [Step 1].ID =
      [Step 2b].ID
```

Figure 21H

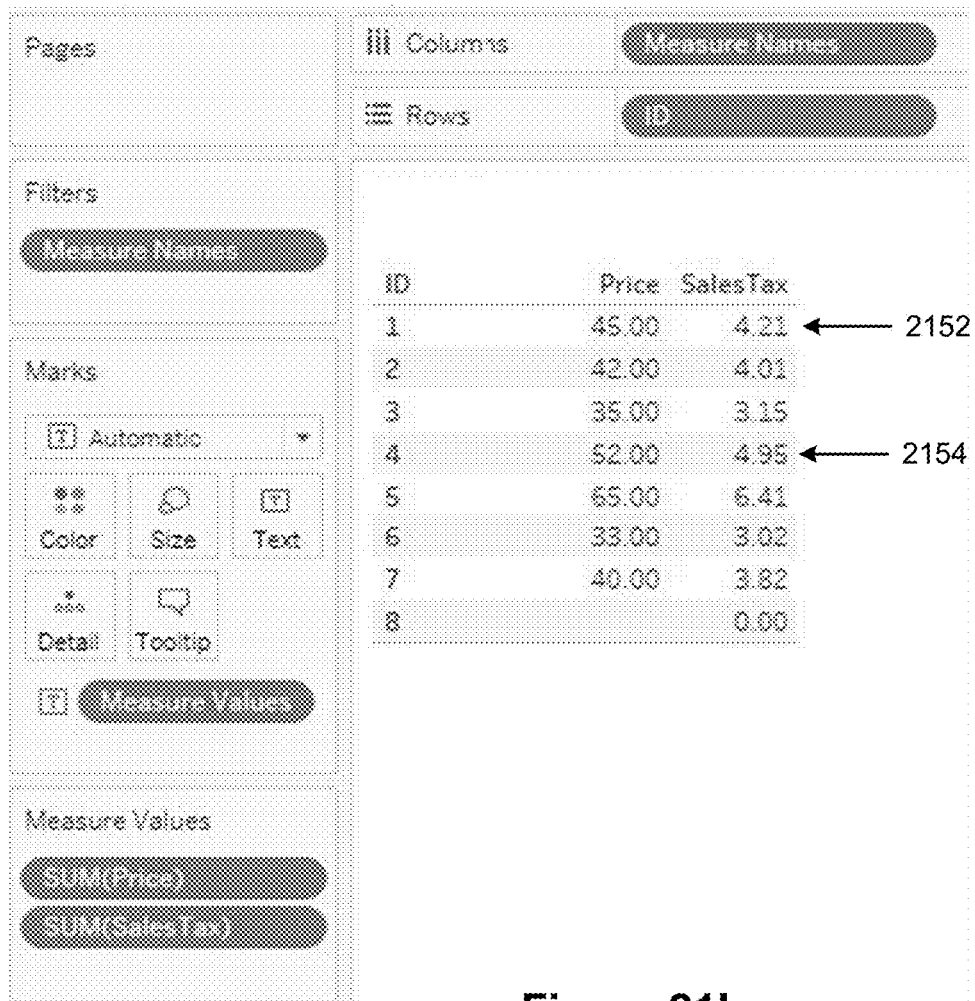

Figure 21I

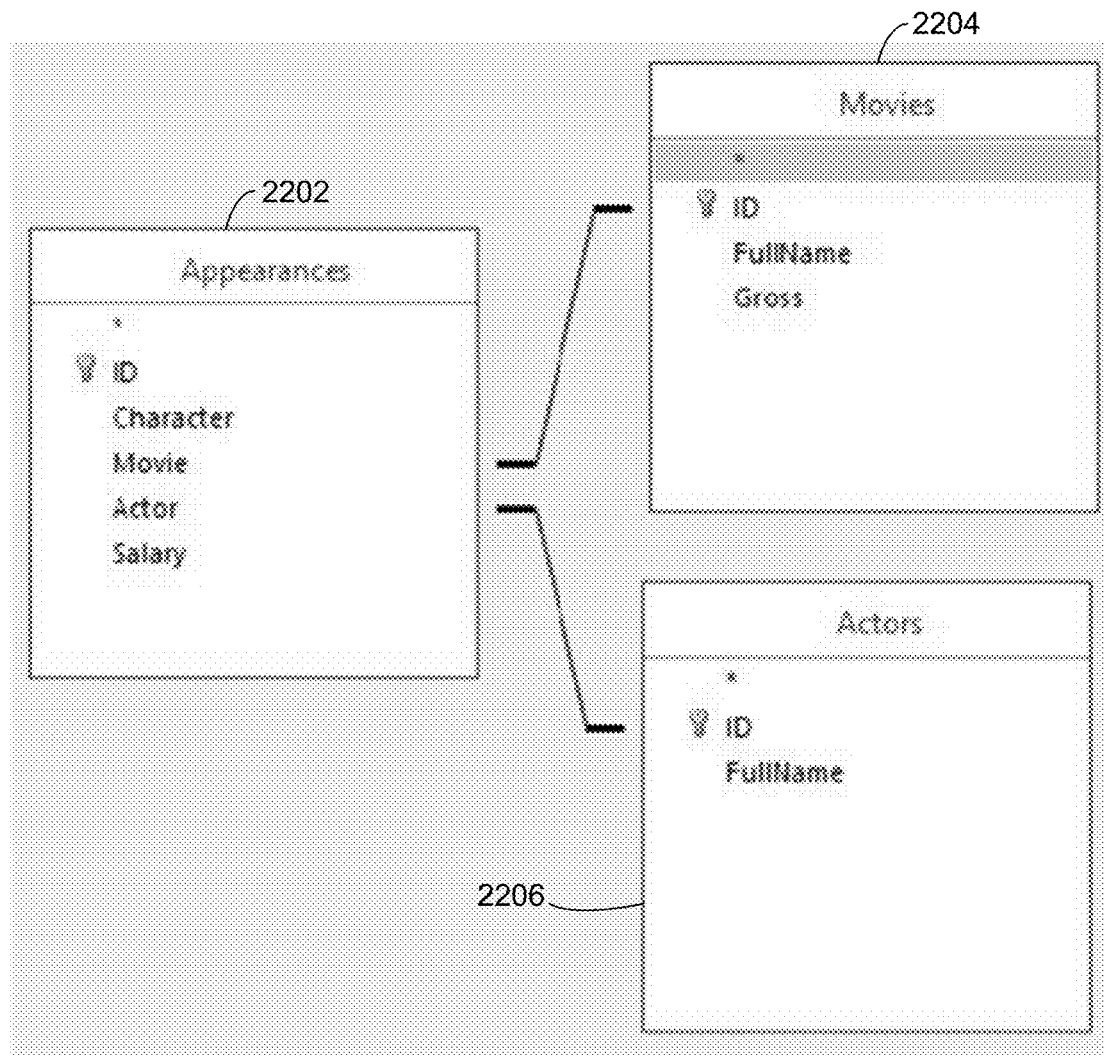

Figure 22A

| Actors.FullName | Character | Movies.FullName | Gross |
|---|---|---|---|
| John Rhys-Davies | Gimli | The Fellowship of the Ring | $1,000.00 |
| John Rhys-Davies | Gimli | The Return of the King | $1,000.00 |
| John Rhys-Davies | Treebeard | The Two Towers | $1,000.00 |
| John Rhys-Davies | Gimli | The Two Towers | $1,000.00 |
| Peter Sellers | James Bond | Casino Royale | $1,000.00 |
| Peter Sellers | President Muffley | Dr. Strangelove | $1,000.00 |
| Peter Sellers | Group Capt Mandrake | Dr. Strangelove | $1,000.00 |
| Peter Sellers | Dr. Strangelove | Dr. Strangelove | $1,000.00 |

Figure 22B

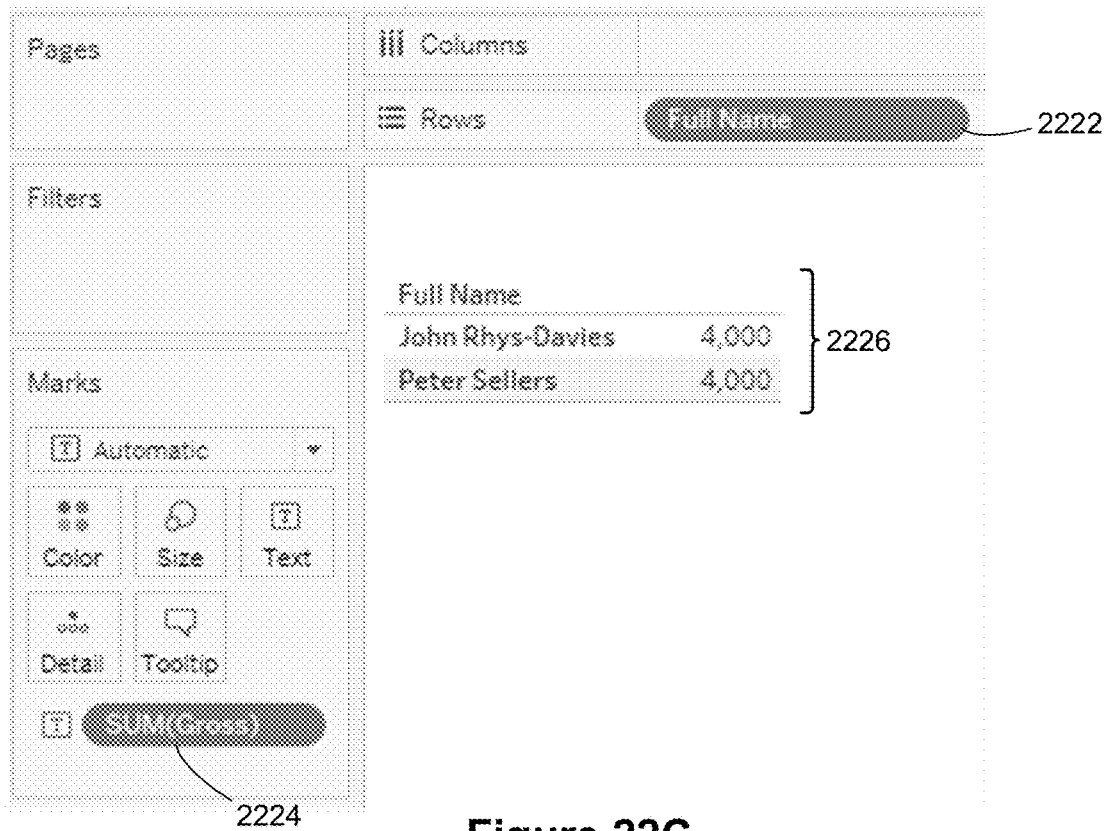

Figure 22C

```
SELECT Actors.FullName, Sum(Movies.Gross) AS SumOfGross
FROM Movies
INNER JOIN (Actors INNER JOIN Appearances ON Actors.ID =
Appearances.Actor) ON   Movies.ID = Appearances.Movie
GROUP BY Actors.FullName
```

Figure 22D

```
SELECT DISTINCT Actors.FullName
FROM Actors
```

Figure 22E

```
SELECT DISTINCT Actors.FullName, Movies.ID, Movies.Gross
FROM Movies
INNER JOIN (Actors INNER JOIN Appearances ON Actors.ID =
     Appearances.Actor) ON Movies.ID = Appearances.Movie
```

Figure 22F

```
SELECT Actors.FullName, Sum([Step 2-b].Gross) AS SumOfGross
FROM (SELECT DISTINCT Actors.FullName, Movies.ID, Movies.Gross
      FROM Movies INNER JOIN (Actors INNER JOIN Appearances ON
      Actors.ID = Appearances.Actor) ON Movies.ID =
      Appearances.Movie) AS [Step 2-b]
INNER JOIN Actors ON [Step 2-b].FullName = Actors.FullName
GROUP BY Actors.FullName
```

Figure 22G

```
SELECT [Step 1].FullName, [Step 2c].SumOfGross
FROM (SELECT DISTINCT Actors.FullName FROM Actors) AS [Step 1]
INNER JOIN (SELECT Actors.FullName, Sum([Step 2b].Gross) AS SumOfGross
      FROM (SELECT DISTINCT Actors.FullName, Movies.ID, Movies.Gross
      FROM Movies INNER JOIN
            (Actors INNER JOIN Appearances ON Actors.ID = Appearances.Actor)
            ON Movies.ID = Appearances.Movie) AS [Step 2b]
      INNER JOIN Actors ON [Step 2b].FullName = Actors.FullName
      GROUP BY Actors.FullName) AS [Step 2c]
ON [Step 1].FullName = [Step 2c].FullName
```

Figure 22H

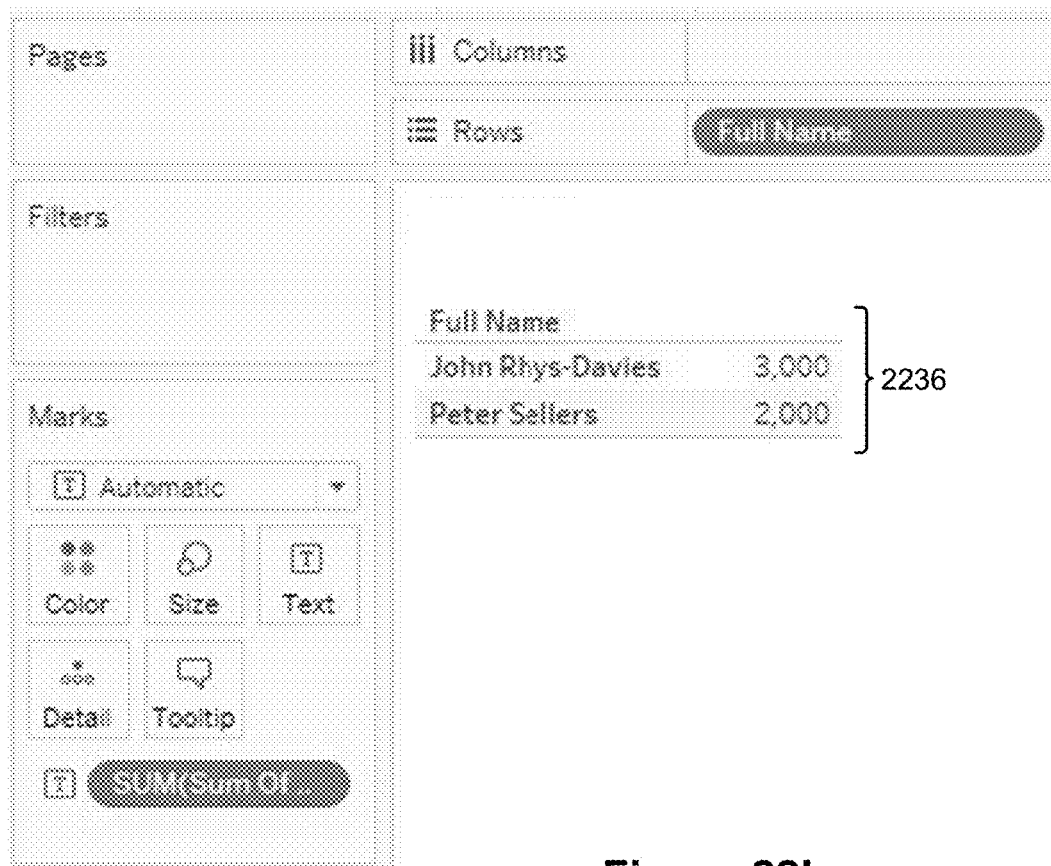

Figure 22I

| Count of Actors by Director - Replicated | | | |
|---|---|---|---|
| Director | Full Name | Movie | Character |
| John McTiernan | Sean Connery | The Hunt for Red October | Marko Ramius |
| Michael Bay | Liv Tyler | Armageddon | Grace Stamper |
| Peter Jackson | John Rhys-Davies | The Fellowship of the Ring | Gimli |
| Peter Jackson | John Rhys-Davies | The Return of the King | Treebeard |
| Peter Jackson | John Rhys-Davies | The Return of the King | Gimli |
| Peter Jackson | John Rhys-Davies | The Two Towers | Treebeard |
| Peter Jackson | John Rhys-Davies | The Two Towers | Gimli |
| Peter Jackson | Liv Tyler | The Fellowship of the Ring | Arwen |
| Peter Jackson | Liv Tyler | The Return of the King | Arwen |
| Peter Jackson | Liv Tyler | The Two Towers | Arwen |
| Peter Jackson | Kate Winslet | Heavenly Creatures | Pauline Parker |
| Peter Jackson | Melanie Lynskey | Heavenly Creatures | Juliet Hulme |
| Stanley Kubrick | Peter Sellers | Dr. Strangelove | Group Capt Mandrake |
| Stanley Kubrick | Peter Sellers | Dr. Strangelove | President Muffley |
| Stanley Kubrick | Peter Sellers | Dr. Strangelove | Dr. Strangelove |
| Terence Young | Sean Connery | From Russia with Love | James Bond |
| Val Guest | Peter Sellers | Casino Royale | James Bond |
| Val Guest | David Niven | Casino Royale | James Bond |

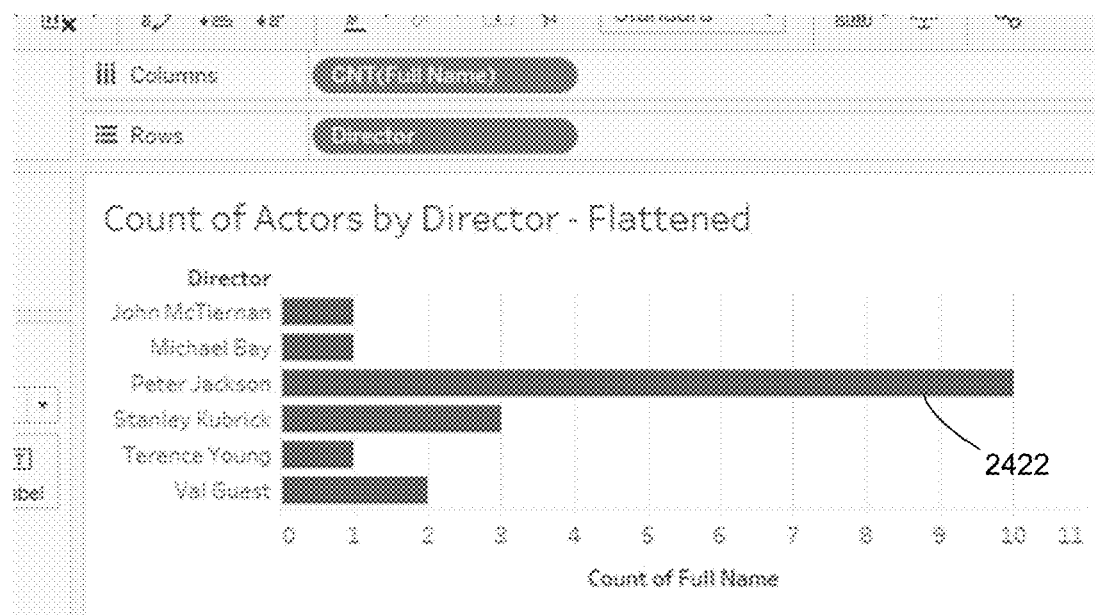

Figure 24D

Gross by Actor - Replicated — 2502

| FullName | MovieID | Gross |
|---|---|---|
| David Niven | 12 | $22,700,000.00 |
| John Rhys-Davies | 1 | $869,300,000.00 |
| John Rhys-Davies | 2 | $923,300,000.00 |
| John Rhys-Davies | 3 | $1,119,100,000.00 |
| John Rhys-Davies | 2 | $923,300,000.00 |
| John Rhys-Davies | 3 | $1,119,100,000.00 |
| Kate Winslet | 15 | $3,049,000.00 |
| Liv Tyler | 3 | $1,119,100,000.00 |
| Liv Tyler | 2 | $923,300,000.00 |
| Liv Tyler | 1 | $869,300,000.00 |
| Liv Tyler | 13 | $550,000,000.00 |
| Melanie Lynskey | 15 | $3,049,000.00 |
| Peter Sellers | 4 | $9,440,000.00 |
| Peter Sellers | 4 | $9,440,000.00 |
| Peter Sellers | 12 | $22,700,000.00 |
| Sean Bean | 16 | $225,000,000.00 |
| Sean Bean | 1 | $869,300,000.00 |
| Sean Bean | 2 | $923,300,000.00 |
| Sean Bean | 3 | $1,119,100,000.00 |
| Sean Connery | 6 | $200,512,000.00 |
| Sean Connery | 5 | $24,796,493.00 |

2520, 2510

Gross by Actor - Deduplicated — 2504

| FullName | MovieID | Gross |
|---|---|---|
| David Niven | 12 | $22,700,000.00 |
| John Rhys-Davies | 2 | $923,300,000.00 |
| John Rhys-Davies | 3 | $1,119,100,000.00 |
| John Rhys-Davies | 1 | $869,300,000.00 |
| Kate Winslet | 15 | $3,049,000.00 |
| Liv Tyler | 3 | $1,119,100,000.00 |
| Liv Tyler | 13 | $550,000,000.00 |
| Liv Tyler | 1 | $869,300,000.00 |
| Liv Tyler | 2 | $923,300,000.00 |
| Melanie Lynskey | 15 | $3,049,000.00 |
| Peter Sellers | 4 | $9,440,000.00 |
| Peter Sellers | 12 | $22,700,000.00 |
| Sean Bean | 16 | $225,000,000.00 |
| Sean Bean | 2 | $923,300,000.00 |
| Sean Bean | 1 | $869,300,000.00 |
| Sean Bean | 3 | $1,119,100,000.00 |
| Sean Connery | 5 | $24,796,493.00 |
| Sean Connery | 6 | $200,512,000.00 |

2522, 2524, 2512

Star Power: Gross by Actor — 2506

| FullName | Sum(Gross) |
|---|---|
| David Niven | $22,700,000.00 |
| John Rhys-Davies | $2,911,700,000.00 |
| Kate Winslet | $3,049,000.00 |
| Liv Tyler | $3,461,700,000.00 |
| Melanie Lynskey | $3,049,000.00 |
| Peter Sellers | $32,140,000.00 |
| Sean Bean | $3,136,700,000.00 |
| Sean Connery | $225,308,493.00 |

2532 — Actors by Movie – Duplicated

| Movies.FullName | Actors.FullName |
|---|---|
| Armageddon | Liv Tyler |
| Casino Royale | David Niven |
| Casino Royale | Peter Sellers |
| Dr. Strangelove | Peter Sellers |
| Dr. Strangelove | Peter Sellers |
| Dr. Strangelove | Peter Sellers |
| From Russia with Love | Sean Connery |
| Heavenly Creatures | Kate Winslet |
| Heavenly Creatures | Melanie Lynskey |
| Percy Jackson &... | Sean Bean |
| The Fellowship of the Ring | John Rhys-Davies |
| The Fellowship of the Ring | Liv Tyler |
| The Fellowship of the Ring | Sean Bean |
| The Hunt for Red October | Sean Connery |
| The Return of the King | John Rhys-Davies |
| The Return of the King | John Rhys-Davies |
| The Return of the King | Liv Tyler |
| The Two Towers | John Rhys-Davies |
| The Two Towers | John Rhys-Davies |
| The Two Towers | Liv Tyler |

2506 — Star Power: Gross by Actor

| FullName | Sum(Gross) |
|---|---|
| David Niven | $22,700,000.00 |
| John Rhys-Davies | $2,911,700,000.00 |
| Kate Winslet | $3,049,000,000.00 |
| Liv Tyler | $3,461,700,000.00 |
| Melanie Lynskey | $3,049,000,000.00 |
| Peter Sellers | $32,140,000.00 |
| Sean Bean | $3,136,700,000.00 |
| Sean Connery | $225,308,493.00 |

2536 — JOIN

2534 — Star Power by Movie – Duplicated

| Movies.FullName | Star Power: FullName | Star Power: Sum of Gross |
|---|---|---|
| Armageddon | Liv Tyler | $3,461,700,000.00 |
| Casino Royale | David Niven | $22,700,000.00 |
| Casino Royale | Peter Sellers | $32,140,000.00 |
| Dr. Strangelove | Peter Sellers | $32,140,000.00 |
| Dr. Strangelove | Peter Sellers | $32,140,000.00 |
| Dr. Strangelove | Peter Sellers | $32,140,000.00 |
| From Russia with Love | Sean Connery | $225,308,493.00 |
| Heavenly Creatures | Kate Winslet | $3,049,000,000.00 |
| Heavenly Creatures | Melanie Lynskey | $3,049,000,000.00 |
| Percy Jackson &... | Sean Bean | $3,094,300,000.00 |
| The Fellowship of the Ring | John Rhys-Davies | $2,911,700,000.00 |
| The Fellowship of the Ring | Liv Tyler | $3,461,700,000.00 |
| The Fellowship of the Ring | Sean Bean | $3,094,300,000.00 |
| The Hunt for Red October | Sean Connery | $225,308,493.00 |
| The Return of the King | John Rhys-Davies | $2,911,700,000.00 |
| The Return of the King | John Rhys-Davies | $2,911,700,000.00 |
| The Return of the King | Liv Tyler | $3,461,700,000.00 |
| The Two Towers | John Rhys-Davies | $2,911,700,000.00 |
| The Two Towers | John Rhys-Davies | $2,911,700,000.00 |
| The Two Towers | Liv Tyler | $3,461,700,000.00 |

Figure 25C

2534 — Star Power by Movie ~ Duplicated

| Movies Full Name | Star Power Full Name | Star Power (Sum of Gross) |
|---|---|---|
| Armageddon | Liv Tyler | $3,461,700,000.00 |
| Casino Royale | David Niven | $22,700,000.00 |
| Casino Royale | Peter Sellers | $32,140,000.00 |
| Dr. Strangelove | Peter Sellers | $32,140,000.00 |
| Dr. Strangelove | Peter Sellers | $32,140,000.00 |
| From Russia with Love | Sean Connery | $225,308,493.00 |
| Heavenly Creatures | Kate Winslet | $3,049,300,000.00 |
| Heavenly Creatures | Melanie Lynskey | $3,049,300,000.00 |
| Percy Jackson & ... | Sean Bean | $1,094,300,000.00 |
| The Fellowship of the Ring | John Rhys-Davies | $2,911,700,000.00 |
| The Fellowship of the Ring | Liv Tyler | $3,461,700,000.00 |
| The Fellowship of the Ring | Sean Bean | $1,094,300,000.00 |
| The Hunt for Red October | Sean Connery | $225,308,493.00 |
| The Return of the King | John Rhys-Davies | $2,911,700,000.00 |
| The Return of the King | John Rhys-Davies | $2,911,700,000.00 |
| The Return of the King | Liv Tyler | $3,461,700,000.00 |
| The Two Towers | John Rhys-Davies | $2,911,700,000.00 |
| The Two Towers | John Rhys-Davies | $2,911,700,000.00 |
| The Two Towers | Liv Tyler | $3,461,700,000.00 |

↓ 2550

2540 — Star Power by Movie ~ Deduplicated

| Movies Full Name | Star Power Full Name | Star Power (Sum of Gross) |
|---|---|---|
| Armageddon | Liv Tyler | $3,461,700,000.00 |
| Casino Royale | David Niven | $22,700,000.00 |
| Casino Royale | Peter Sellers | $32,140,000.00 |
| Dr. Strangelove | Peter Sellers | $32,140,000.00 |
| From Russia with Love | Sean Connery | $225,308,493.00 |
| Heavenly Creatures | Kate Winslet | $3,049,000,000.00 |
| Heavenly Creatures | Melanie Lynskey | $3,049,000,000.00 |
| Percy Jackson & ... | Sean Bean | $1,094,300,000.00 |
| The Fellowship of the Ring | John Rhys-Davies | $2,911,700,000.00 |
| The Fellowship of the Ring | Liv Tyler | $3,461,700,000.00 |
| The Fellowship of the Ring | Sean Bean | $1,094,300,000.00 |
| The Hunt for Red October | Sean Connery | $225,308,493.00 |
| The Return of the King | John Rhys-Davies | $2,911,700,000.00 |
| The Return of the King | Liv Tyler | $3,461,700,000.00 |
| The Two Towers | John Rhys-Davies | $2,911,700,000.00 |
| The Two Towers | Liv Tyler | $3,461,700,000.00 |

↓ 2552

2542 — Star Power by Movie ~ Aggregated

| Movies Full Name | Star Power (Sum of Gross) |
|---|---|
| Armageddon | $3,461,700,000.00 |
| Casino Royale | $54,840,000.00 |
| Dr. Strangelove | $32,140,000.00 |
| From Russia with Love | $225,308,493.00 |
| Heavenly Creatures | $6,098,000,000.00 |
| Percy Jackson & ... | $1,094,300,000.00 |
| The Fellowship of the Ring | $7,467,700,000.00 |
| The Hunt for Red October | $225,308,493.00 |
| The Return of the King | $6,373,400,000.00 |
| The Two Towers | $6,373,400,000.00 |

| Gross by Actor | |
|---|---|
| Actor | Gross |
| David Niven | $22,700,000.00 |
| John Rhys-Davies | $2,911,700,000.00 |
| Kate Winslet | $3,049,000.00 |
| Liv Tyler | $3,461,700,000.00 |
| Melanie Lynskey | $3,049,000.00 |
| Peter Sellers | $22,700,000.00 |
| Sean Bean | $1,094,300,000.00 |
| Sean Connery | $225,308,493.00 |

GENERATING DATA VISUALIZATIONS ACCORDING TO AN OBJECT MODEL OF SELECTED DATA SOURCES

RELATED APPLICATIONS

This application claims priority to U.S. Provisional Patent Application No. 62/748,968, filed Oct. 22, 2018, entitled "Using an Object Model of Heterogeneous Data to Facilitate Building Data Visualizations," which is incorporated by reference herein in its entirety.

This application is related to U.S. patent application Ser. No. 16/236,612, filed Dec. 30, 2018, entitled "Generating Data Visualizations According to an Object Model of Selected Data Sources," which is incorporated by reference herein in its entirety.

This application is related to U.S. patent application Ser. No. 15/911,026, filed Mar. 2, 2018, entitled "Using an Object Model of Heterogeneous Data to Facilitate Building Data Visualizations," which claims priority to U.S. Provisional Patent Application 62/569,976, filed Oct. 9, 2017, "Using an Object Model of Heterogeneous Data to Facilitate Building Data Visualizations," each of which is incorporated by reference herein in its entirety.

This application is also related to U.S. patent application Ser. No. 14/801,750, filed Jul. 16, 2015, entitled "Systems and Methods for using Multiple Aggregation Levels in a Single Data Visualization," and U.S. patent application Ser. No. 15/497,130, filed Apr. 25, 2017, entitled "Blending and Visualizing Data from Multiple Data Sources," which is a continuation of U.S. patent application Ser. No. 14/054,803, filed Oct. 15, 2013, entitled "Blending and Visualizing Data from Multiple Data Sources," now U.S. Pat. No. 9,633,076, which claims priority to U.S. Provisional Patent Application No. 61/714,181, filed Oct. 15, 2012, entitled "Blending and Visualizing Data from Multiple Data Sources," each of which is incorporated by reference herein in its entirety.

TECHNICAL FIELD

The disclosed implementations relate generally to data visualization and more specifically to interactive visual analysis of a data set using an object model of the data set.

BACKGROUND

Data visualization applications enable a user to understand a data set visually, including distribution, trends, outliers, and other factors that are important to making business decisions. Some data elements must be computed based on data from the selected data set. For example, data visualizations frequently use sums to aggregate data. Some data visualization applications enable a user to specify a "Level of Detail" (LOD), which can be used for the aggregate calculations. However, specifying a single Level of Detail for a data visualization is insufficient to build certain calculations.

Some data visualization applications provide a user interface that enables users to build visualizations from a data source by selecting data fields and placing them into specific user interface regions to indirectly define a data visualization. See, for example, U.S. patent application Ser. No. 10/453,834, filed Jun. 2, 2003, entitled "Computer Systems and Methods for the Query and Visualization of Multidimensional Databases," now U.S. Pat. No. 7,089,266, which is incorporated by reference herein in its entirety. However, when there are complex data sources and/or multiple data sources, it may be unclear what type of data visualization to generate (if any) based on a user's selections.

In addition, some systems construct queries that yield data visualizations that are not what a user expects. In some cases, some rows of data are omitted (e.g., when there is no corresponding data in one of the fact tables). In some cases, numeric aggregated fields produce totals that are overstated because the same data value is being counted multiple times. These problems can be particularly problematic because an end user may not be aware of the problem and/or not know what is causing the problem.

SUMMARY

Generating a data visualization that combines data from multiple tables can be challenging, especially when there are multiple fact tables. In some cases, it can help to construct an object model of the data before generating data visualizations. In some instances, one person is a particular expert on the data, and that person creates the object model. By storing the relationships in an object model, a data visualization application can leverage that information to assist all users who access the data, even if they are not experts.

An object is a collection of named attributes. An object often corresponds to a real-world object, event, or concept, such as a Store. The attributes are descriptions of the object that are conceptually at a 1:1 relationship with the object. Thus, a Store object may have a single [Manager Name] or [Employee Count] associated with it. At a physical level, an object is often stored as a row in a relational table, or as an object in JSON.

A class is a collection of objects that share the same attributes. It must be analytically meaningful to compare objects within a class and to aggregate over them. At a physical level, a class is often stored as a relational table, or as an array of objects in JSON.

An object model is a set of classes and a set of many-to-one relationships between them. Classes that are related by 1-to-1 relationships are conceptually treated as a single class, even if they are meaningfully distinct to a user. In addition, classes that are related by 1-to-1 relationships may be presented as distinct classes in the data visualization user interface. Many-to-many relationships are conceptually split into two many-to-one relationships by adding an associative table capturing the relationship.

Once a class model is constructed, a data visualization application can assist a user in various ways. In some implementations, based on data fields already selected and placed onto shelves in the user interface, the data visualization application can recommend additional fields or limit what actions can be taken to prevent unusable combinations. In some implementations, the data visualization application allows a user considerable freedom in selecting fields, and uses the object model to build one or more data visualizations according to what the user has selected.

In accordance with some implementations, a method of generates data visualizations. The method is performed at a computer having one or more processors and memory. The memory stores one or more programs configured for execution by the one or more processors. The computer receives a visual specification, which specifies a data source, a plurality of visual variables, and a plurality of data fields from the data source. Each of the visual variables is associated with a respective one or more of the data fields and each of the data fields is identified as either a dimension or a measure. From an object model of the data source, the computer identifies a minimal subtree that includes all of the dimension data fields and constructs a query from the minimal subtree that accesses the dimension data fields. The computer executes the query against the data source to retrieve a set of tuples. Each tuple includes a unique ordered combination of data values for the dimension data fields. For each tuple, the computer forms an extended tuple by appending aggregated data values corresponding to each of the measure data fields. The computer then builds and displays a data visualization according to the data fields in the extended tuples and according to the visual variables to which each of the data fields is associated.

In some implementations, the visual specification includes one or more additional visual variables that are not associated with any data fields from the data source.

In some implementations, the aggregated data values for the measure data fields are aggregated according to the dimension data fields.

In some implementations, the computer displays the data visualization in a graphical user interface for the computer. In some implementations, displaying the data visualization includes generating a plurality of visual marks, where each mark corresponds to a respective extended tuple. In some implementations, the graphical user interface includes a data visualization region and the computer displays the data visualization in the data visualization region.

In some implementations, each of the visual variables is one of: rows attribute, columns attribute, filter attribute, color encoding, size encoding, shape encoding, and label encoding.

In some implementations, the aggregated data values are computed using an aggregate function that is one of: SUM, COUNT, COUNTD, MIN, MAX, AVG, MEDIAN, ATTR, PERCENTILE, STDEV, STDEVP. VAR, and VARP.

In some implementations, the plurality of data fields are from a plurality of distinct tables in the data source.

In some implementations, the object model of the data source has a plurality of objects, and the plurality of data fields belong to two or more distinct objects of the plurality of objects.

In some implementations, the visual specification specifies a plurality of data sources, the visual specification specifies one or more data fields from each of the plurality of data sources, and the object model is an object model for the plurality of data sources.

In accordance with some implementations, a method of generating data visualizations is performed at a computer having one or more processors and memory. The memory stores one or more programs configured for execution by the one or more processors. The computer receives a visual specification, which specifies a data source, a plurality of visual variables, and a plurality of data fields from the data source. Each of the visual variables is associated with a respective one or more of the data fields and each of the data fields is identified as either a dimension or a measure. The computer executes a first query against the data source to form dimension tuples that comprise distinct ordered combinations of data values for the dimension data fields D. For each of the measure data fields, the computer: (i) forms a set S of dimensions consisting of the dimension data fields D and dimensions from a primary key for a table in the data source containing the respective measure; (ii) executes a respective query against the data source to retrieve intermediate tuples comprising the data fields in S and the respective measure, without aggregation; and (iii) aggregates the intermediate tuples according to the dimension data fields D to compute aggregate values for the respective measure. For each dimension tuple, the computer forms an extended tuple by appending the aggregated data values corresponding to each of the measure data fields. The computer then builds and displays a data visualization according to the data fields in the extended tuples and according to the visual variables to which each of the data fields is associated.

In some implementations, the visual specification further includes one or more additional visual variables that are not associated with any data fields from the data source.

In some implementations, the computer displays the data visualization in a graphical user interface for the computer. In some implementations, displaying the data visualization includes generating a plurality of visual marks, where each mark corresponding to a respective extended tuple. In some implementations, the graphical user interface includes a data visualization region and the computer displays the data visualization in the data visualization region.

In some implementations, each of the visual variables is one of: rows attribute, columns attribute, filter attribute, color encoding, size encoding, shape encoding, and label encoding.

In some implementations, the aggregated data values are computed using an aggregate function that is one of: SUM, COUNT, COUNTD, MIN, MAX, AVG, MEDIAN, ATTR, PERCENTILE, STDEV, STDEVP. VAR, and VARP.

In some implementations, the plurality of data fields are from a plurality of distinct tables in the data source.

In some implementations, the object model of the data source has a plurality of objects, and the plurality of data fields belong to two or more distinct objects of the plurality of objects.

In some implementations, the visual specification specifies a plurality of data sources, the visual specification specifies one or more data fields from each of the plurality of data sources, and the object model is an object model for the plurality of data sources.

In accordance with some implementations, a process generates data visualizations. The process is performed at a computer having one or more processors and memory storing one or more programs configured for execution by the one or more processors. The process receives a visual specification, which specifies one or more data sources, a plurality of visual variables, and a plurality of data fields from the one or more data sources. Each visual variable is associated with a one or more of the data fields and each of the data fields is identified as either a dimension d or a measure m. In some implementations, the visual specification is a data structure that is filled in based on user selections in the user interface. For example, a user may drag fields from a palette of data fields to the rows shelf, the columns shelf, or an encoding shelf (e.g., color or size encoding). Each of the shelves corresponds to a visual variable in the visual specification, and the data fields on the shelves are stored as part of the visual specification. In some instances, there are two or more data fields associated with the same shelf, so the corresponding visual variable has two or more associated data fields. When there are two or more data fields associated with a visual variable, there is typically a specified order. In some instances, the same data field is associated with two or more distinct visual variables. In general, an individual data visualization does not use all of the available visual variables. That is, the visual specification typically includes one or more additional visual variables that are not associated with any data fields from the one or more data sources. In some implementations, each of the visual variables is one of: rows attribute, columns attribute, filter attribute, color encoding, size encoding, shape encoding, or label encoding.

In many cases, measures are numeric fields and dimensions are data fields with a string data type. More importantly, the labels "measure" and "dimension" indicate how a data field is used.

For each measure m of the data fields, the process identifies a respective reachable dimension set R(m) consisting of all dimensions d, of the data fields, that are reachable from the respective measure m by a sequence of many-to-one relationships in a predefined object model for the one or more data sources. Note that the sequence can be of length zero, representing the case where the dimension d and the measure m are in the same class. In some implementations, a dimension d is reachable from a measure m when the dimension d and the measure m are in a same class in the predefined object model, or else the measure m is an attribute of a first class $C_1$ in the predefined object model, the dimension d is an attribute of an nth class $C_n$ in the object model, with n≥2, and there is a sequence of zero or more intermediate classes $C_2, \ldots, C_{n-1}$ in the predefined object model such that there is a many-to-one relationship between the classes $C_i$ and $C_{i+1}$ for each i=1, 2, . . . , n−1.

Note that there is also the trivial case where R(m)=∅, either because there are no dimensions associated with visual variables or there are some measures that cannot reach any of the dimensions. This is a valid reachable dimension set.

Building the reachable dimension sets results in a partition of the measures. Specifically, the relation ~ defined by $m_1 \sim m_2$ iff $R(m_1)=R(m_2)$ is an equivalence relation. In most cases there is only one partition (i.e., R(m) is the same for all of the measures) but in some instances, there is more than one partition.

For each distinct reachable dimension set R, the process forms a respective data field set S. The set S consists of each dimension in R and each measure m of the data fields for which R(m)=R. In general, each of the data field sets includes at least one measure. In some implementations, any data field sets with no measures are ignored. In some implementations, when a data field set S is identified that has no measures, the data visualization application raises an error. In some implementations, the data visualization application builds additional data visualizations for each of the data field sets S that has no measures (in addition to the data visualizations created for each of the data field sets S that does include one or more measures).

For each data field set S and for each measure m in the respective data field set S, the process rolls up values of the measure m to a level of detail specified by the respective dimensions in the respective data field set S. The process then builds a respective data visualization according to the data fields in the respective data field set S and according to the respective visual variables to which each of the data fields in S is associated.

In some implementations, building the respective data visualization includes retrieving tuples of data from the one or more data sources using one or more database queries generated from the visual specification. For example, for SQL data sources, the process builds an SQL query and sends the query to the appropriate SQL database engine. In some instances, the tuples include data aggregated according to the respective dimensions in the respective data field set S. That is, the aggregation is performed by the data source.

In general, the generated data visualization is displayed in a graphical user interface on the computer (e.g., the user interface for the data visualization application). In some implementations, displaying the data visualization includes generating a plurality of visual marks, where each mark corresponds to a respective tuple retrieved from the one or more data sources. In some implementations, the graphical user interface includes a data visualization region, and the process displays the data visualization in the data visualization region.

In some implementations, rolling up values of a measure m to a level of detail specified by the respective dimensions in the respective data field set S includes partitioning rows of a data table containing the measure m into groups according to the respective dimensions in the respective data field set S, and computing a single aggregated value for each group.

In some implementations, the single aggregated value is computed using one of the aggregate functions SUM, COUNT, COUNTD (count of distinct elements), MIN, MAX, AVG (mean average), MEDIAN, STDEV (standard deviation), VAR (variance), PERCENTILE (e.g., quartile), ATTR, STDEVP, and VARP. In some implementations, the ATTR( ) aggregation operator returns the value of the expression if it has a single value for all rows, and returns an asterisk otherwise. In some implementations, the STDEVP and VARP aggregation operators return values based on a biased population or the entire population. Some implementations include more or different aggregation operators from those listed here. Some implementations use alternative names for the aggregation operators.

In some implementations, data fields are classified as "dimensions" or "measures" based on how they are being used. A dimension partitions the data set, whereas a measure aggregates the data in each of the partitions. From an SQL mindset, the dimensions are elements in the GROUP BY clause, and the measures are the elements in the SELECT clause. Commonly, discrete categorical data (e.g., a field containing states, regions, or product names) is used for partitioning, whereas continuous numeric data (e.g., profits or sales) is used for aggregating (e.g., computing a sum). However, all types of data fields can be used as either dimensions or measures. For example, a discrete categorical field that contains product names can be used as a measure by applying the aggregate function COUNTD (count distinct). On the other hand, numeric data representing heights of people can be used as a dimension, partitioning people by height or ranges of heights. Some aggregate functions, such as SUM, can only be applied to numeric data. In some implementations, the application assigns to each field a default role (dimension or measure) based on the raw data type of the field, but allows a user to override that role. For example, some applications assign a default role of "dimension" to categorical (string) data fields and a default role of "measure" to numeric fields. In some implementations, date fields are used as dimensions by default because they are commonly used to partition data into date ranges.

The classification as dimensions or measures also applies to calculated expressions. For example, an expression such as YEAR([Purchase Date]) is commonly used as a dimension, partitioning the underlying data into years. As another example, consider a data source that includes a Product Code field (as a character string). If the first three characters of the Product Code encode the product type, then the expression LEFT([Product Code], 3) might be used as a dimension to partition the data into product types.

Some implementations enable users to specify multiple levels of detail using the interactive graphical user interface. Some examples use two levels of detail, but implementations typically allow an unlimited number of levels of detail. In some instances, data calculated according to aggregation at one level of detail is used in a second aggregation at a second level of detail. In some implementations, the data visualization includes a "visualization level of detail," which is used by default for computing aggregations. This is the level of detail that is visible in the final data visualization. Implementations also provide for level of detail expressions, which allow a user to specify a particular level of detail in a specific context.

Some implementations have designated shelf regions that determine characteristics of a desired data visualization. For example, some implementations include a row shelf region and a column shelf region. A user places field names into these shelf regions (e.g., by dragging fields from a schema region), and the field names define the data visualization characteristics. For example, a user may choose a vertical bar chart, with a column for each distinct value of a field placed in the column shelf region. The height of each bar is defined by another field placed into the row shelf region.

In accordance with some implementations, a method of generating and displaying a data visualization is performed at a computer. The computer has a display, one or more processors, and memory storing one or more programs configured for execution by the one or more processors. The process displays a graphical user interface on the display. The graphical user interface includes a schema information region that includes a plurality of fields from a database. The process receives user input in the graphical user interface to specify a first aggregation. The specification of the first aggregation groups the data by a first set of one or more fields of the plurality of fields and identifies a first aggregated output field that is created by the first aggregation. The process also receives user input in the graphical user interface to specify a second aggregation. In some instances, the specification of the second aggregation references the first aggregation. The second aggregation groups the data by a second set of one or more fields. The second set of fields is selected from the plurality of fields and the first aggregated output field. The second set of fields is different from the first set of fields. The process builds a visual specification based on the specifications of the first and second aggregations.

In some implementations, the process includes retrieving tuples of data from the database using one or more database queries generated from the visual specification. In some implementations, the tuples include data calculated based on the second aggregation. In some implementations, the process includes displaying a data visualization corresponding to the visual specification, where the data visualization includes the data calculated based on the second aggregation. In some implementations, the displayed data visualization includes multiple visual marks, with each mark corresponding to a respective tuple retrieved from the database. In some implementations, the graphical user interface includes a data visualization region and the process displays the data visualization in the data visualization region.

In some implementations, the graphical user interface includes a columns shelf and a rows shelf. In some implementations, the process detects user actions to associate one or more first fields of the plurality of fields with the columns shelf and to associate one or more second fields of the plurality of fields with the rows shelf. The process then generates a visual table in the data visualization region in accordance with the user actions. The visual table includes one or more panes, where each pane has an x-axis defined based on data for the one or more first fields associated with the columns shelf, and each pane has a y-axis defined based on data for the one or more second fields associated with the rows shelf. In some implementations, the process receives user input to associate the second aggregation with the columns shelf or the rows shelf.

In some implementations, the process retrieves tuples from the database according to the fields associated with the rows and columns shelves and displays the retrieved tuples as visual marks in the visual table. In some implementations, each operator for the first and second aggregations is one of SUM, COUNT, COUNTD, MIN, MAX, AVG, MEDIAN, ATTR, PERCENTILE, STDEV, STDEVP, VAR, or VARP.

In some instances, the first aggregated output field is used as a dimension and is included in the second set.

In some implementations, the first aggregated output field is used as a measure and the second aggregation applies one of the aggregation operators to the first aggregated output field. For example, in some instances, the second aggregation computes averages of values for the first aggregated output field.

In some implementations, the process displays a graphical user interface on a computer display. The graphical user interface includes a schema information region and a data visualization region. The schema information region includes multiple field names, where each field name is associated with a data field from the specified databases. The data visualization region includes a plurality of shelf regions that determine the characteristics of the data visualization. Each shelf region is configured to receive user placement of one or more of the field names from the schema information region. The process builds the visual specification according to user selection of one or more of the field names and user placement of each user-selected field name in a respective shelf region in the data visualization region.

In some implementations, the data visualization comprises a dashboard that includes a plurality of distinct component data visualizations. The visual specification comprises a plurality of component visual specifications, and each component data visualization is based on a respective one of the component visual specifications.

In some implementations, the data visualization characteristics defined by the visual specification include mark type and zero or more encodings of the marks. In some implementations, the mark type is one of: bar chart, line chart, scatter plot, text table, or map. In some implementations, the encodings are selected from mark size, mark color, and mark label.

In accordance with some implementations, a system for generating data visualizations includes one or more processors, memory, and one or more programs stored in the memory. The programs are configured for execution by the one or more processors. The programs include instructions for performing any of the methods described herein.

In accordance with some implementations, a non-transitory computer readable storage medium stores one or more programs configured for execution by a computer system having one or more processors and memory. The one or more programs include instructions for performing any of the methods described herein.

Thus methods, systems, and graphical user interfaces are provided for interactive visual analysis of a data set.

BRIEF DESCRIPTION OF THE DRAWINGS

For a better understanding of the aforementioned implementations of the invention as well as additional implementations, reference should be made to the Description of Implementations below, in conjunction with the following drawings in which like reference numerals refer to corresponding parts throughout the figures.

FIGS. 7A and 7B illustrate a bowtie set of relationships between four classes, and data visualizations that may be presented in this context, in accordance with some implementations.

FIG. 8 illustrates a very simple object model where a data visualization is created for a single class, in accordance with some implementations.

FIGS. 12A-12C illustrate user selection of one or more measures that are hierarchically above one or more selected dimensions, and corresponding data visualizations, in accordance with some implementations.

FIGS. 14A-14C and 15 illustrate user selection of measures from two or more distinct classes in an object model, with at least one hierarchical class connecting them, as well as data visualizations that may be generated for this scenario, in accordance with some implementations.

FIG. 16 provides pseudocode descriptions for determining what dimensions within an object model are reachable, in accordance with some implementations.

FIG. 17 is a screenshot of a user interface window for defining filters within a data visualization application, in accordance with some implementations.

FIGS. 18A-18C provide a flowchart of a process that uses an object model when building data visualizations, according to some implementations.

FIGS. 19A and 19B provide two examples of Object Model graphs, in accordance with some implementations.

FIG. 19C illustrates an object model graph in which not all of the dimensions are reachable from the root, in accordance with some implementations.

FIG. 19D illustrated an object model graph in which where are two distinct paths from one node to another node, in accordance with some implementations.

FIGS. 20A-20F provide a Snowflake example schema that can be used in tracking sales, in accordance with some implementations.

FIGS. 21A-21I extend the example of FIGS. 20A-20F to a tree that is not a snowflake, in accordance with some implementations.

FIGS. 22A-22I illustrate having Measures and Dimensions in Different Branches of a tree according to some implementations.

FIGS. 24A-24E illustrate using an object model to accurately produce counts for a data visualization, in accordance with some implementations.

FIGS. 25A-25C illustrate using an object model to accurately produce sums for a data visualization, in accordance with some implementations.

FIGS. 26A-26D and 27A-27I illustrate using an object model to apply filters in a data visualization, in accordance with some implementations.

Like reference numerals refer to corresponding parts throughout the drawings.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

Figure 1:
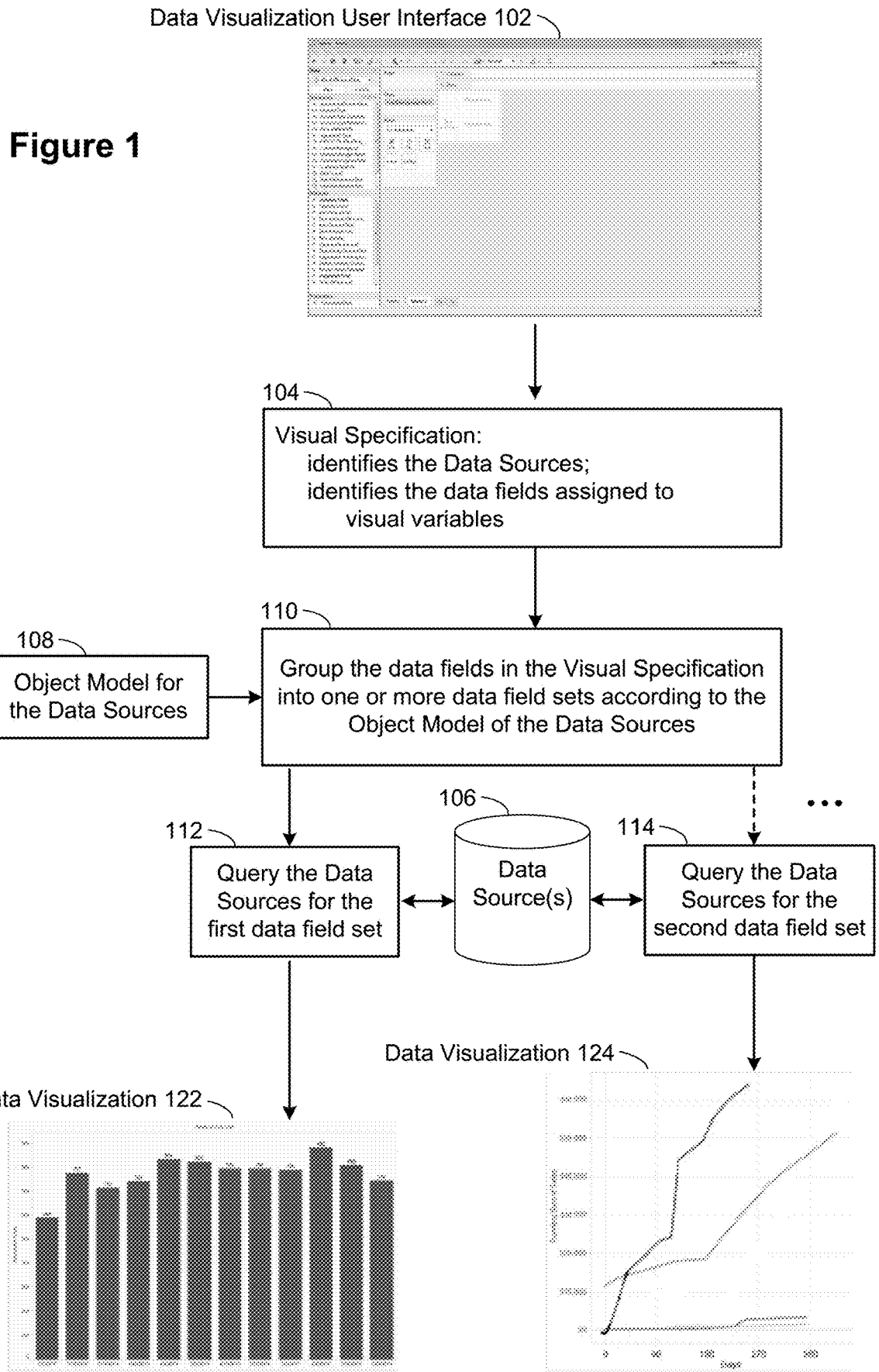
FIG. 1 illustrates conceptually a process of building a data visualization in accordance with some implementations.

Some implementations of an interactive data visualization application use a data visualization user interface 102 to build a visual specification 104, as shown in FIG. 1. The visual specification identifies one or more data source 106, which may be stored locally (e.g., on the same device that is displaying the user interface 102) or may be stored externally (e.g., on a database server or in the cloud). The visual specification 104 also includes visual variables. The visual variables specify characteristics of the desired data visualization indirectly according to selected data fields from the data sources 106. In particular, a user assigns zero or more data fields to each of the visual variables, and the values of the data fields determine the data visualization that will be displayed.

In most instances, not all of the visual variables are used. In some instances, some of the visual variables have two or more assigned data fields. In this scenario, the order of the assigned data fields for the visual variable (e.g., the order in which the data fields were assigned to the visual variable by the user) typically affects how the data visualization is generated and displayed.

Some implementations use an object model 108 to build the appropriate data visualizations. In some instances, an object model applies to one data source (e.g., one SQL database or one spreadsheet file), but an object model may encompass two or more data sources. Typically, unrelated data sources have distinct object models. In some instances, the object model closely mimics the data model of the physical data sources (e.g., classes in the object model corresponding to tables in a SQL database). However, in some cases the object model is more normalized (or less normalized) than the physical data sources. An object model groups together attributes (e.g., data fields) that have a one-to-one relationship with each other to form classes, and identifies many-to-one relationships among the classes. In the illustrations below, the many-to-one relationships are illustrated with arrows, with the "many" side of each relationship vertically lower than the "one" side of the relationship. The object model also identifies each of the data fields (attributes) as either a dimension or a measure. In the following, the letter "D" (or "d") is used to represent a dimension, whereas the latter "M" (or "m") is used to represent a measure. When an object model 108 is constructed, it can facilitate building data visualizations based on the data fields a user selects. Because a single data model can be used by an unlimited number of other people, building the object model for a data source is commonly delegated to a person who is a relative expert on the data source, As a user adds data fields to the visual specification (e.g., indirectly by using the graphical user interface to place data fields onto shelves), the data visualization application 222 (or web application 322) groups (110) together the user-selected data fields according to the object model 108. Such groups are called data field sets 294. In many cases, all of the user-selected data fields are in a single data field set 294. In some instances, there are two or more data field sets 294. Each measure m is in exactly one data field set 294, but each dimension d may be in more than one data field set 294. The process of building the data field sets 294 is described in more detail below with respect to FIGS. 10, 11, 13A-13C, 14A-14C, 15, 16, and 18A-18C.

The data visualization application 222 (or web application 322) queries (112) the data sources 106 for the first data field set 294, and then generates a first data visualization 122 corresponding to the retrieved data. The first data visualization 122 is constructed according to the visual variables 282 in the visual specification 104 that have assigned data fields 284 from the first data field set 294. When there is only one data field set 294, all of the information in the visual specification 104 is used to build the first data visualization 122. When there are two or more data field sets 294, the first data visualization 122 is based on a first visual sub-specification consisting of all information relevant to the first data field set 294. For example, suppose the original visual specification 104 includes a filter that uses a data field f. If the field f is included in the first data field set 294, the filter is part of the first visual sub-specification, and thus used to generate the first data visualization 122.

When there is a second (or subsequent) data field set 294, the data visualization application 222 (or web application 322) queries (114) the data sources 106 for the second (or subsequent) data field set 294, and then generates the second (or subsequent) data visualization 124 corresponding to the retrieved data. This data visualization 124 is constructed according to the visual variables 282 in the visual specification 104 that have assigned data fields 284 from the second (or subsequent) data field set 294.

Figure 2:
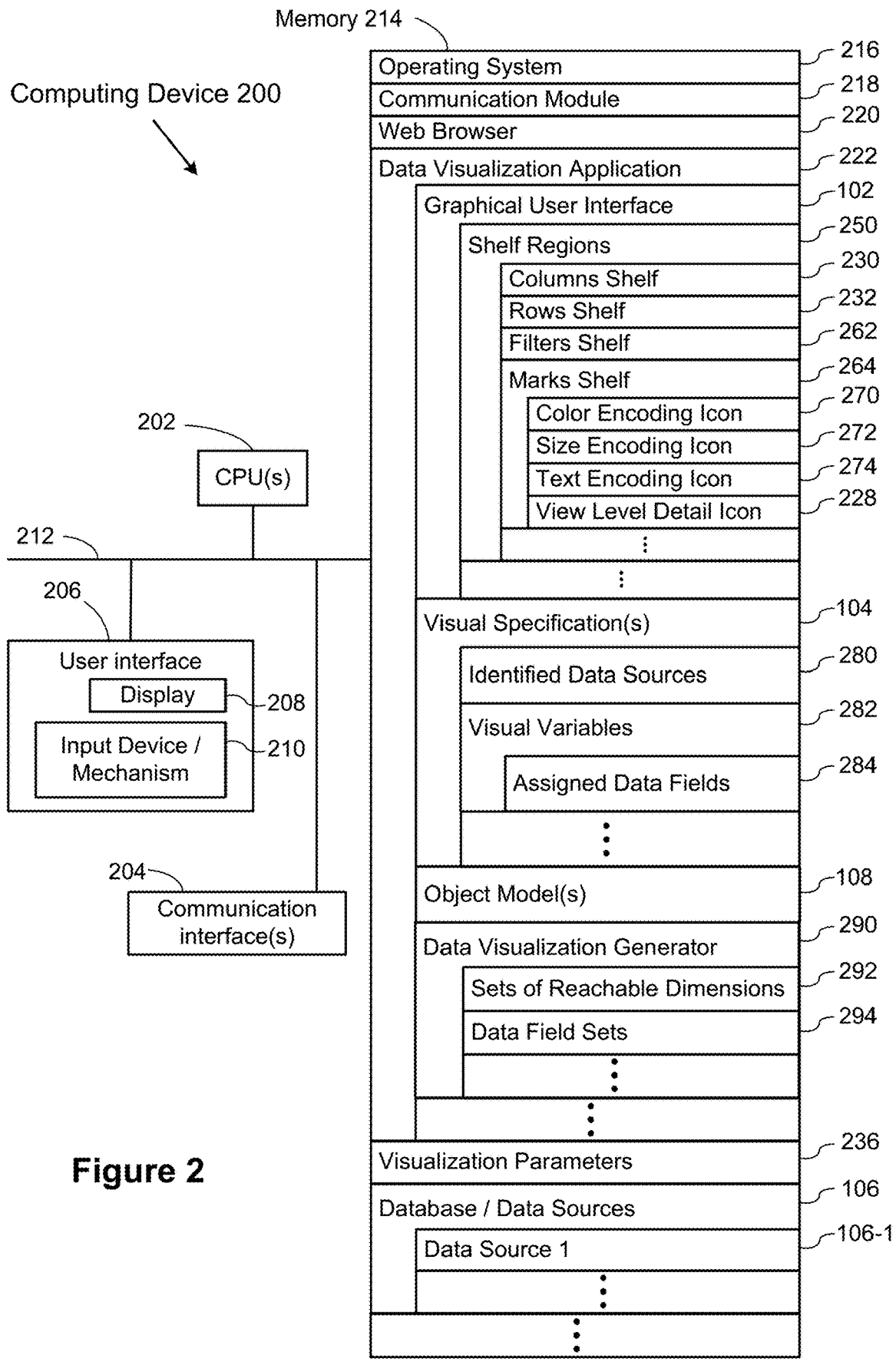
FIG. 2 is a block diagram of a computing device according to some implementations.

FIG. 2 is a block diagram illustrating a computing device 200 that can execute the data visualization application 222 or the data visualization web application 322 to display a data visualization 122. In some implementations, the computing device displays a graphical user interface 102 for the data visualization application 222. Computing devices 200 include desktop computers, laptop computers, tablet computers, and other computing devices with a display and a processor capable of running a data visualization application 222. A computing device 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components. A computing device 200 includes a user interface 206 comprising a display 208 and one or more input devices or mechanisms 210. In some implementations, the input device/mechanism includes a keyboard; in some implementations, the input device/mechanism includes a "soft" keyboard, which is displayed as needed on the display 208, enabling a user to "press keys" that appear on the display 208. In some implementations, the display 208 and input device/mechanism 210 comprise a touch screen display (also called a touch sensitive display). In some implementations, the display is an integrated part of the computing device 200. In some implementations, the display is a separate display device.

Figure 4:
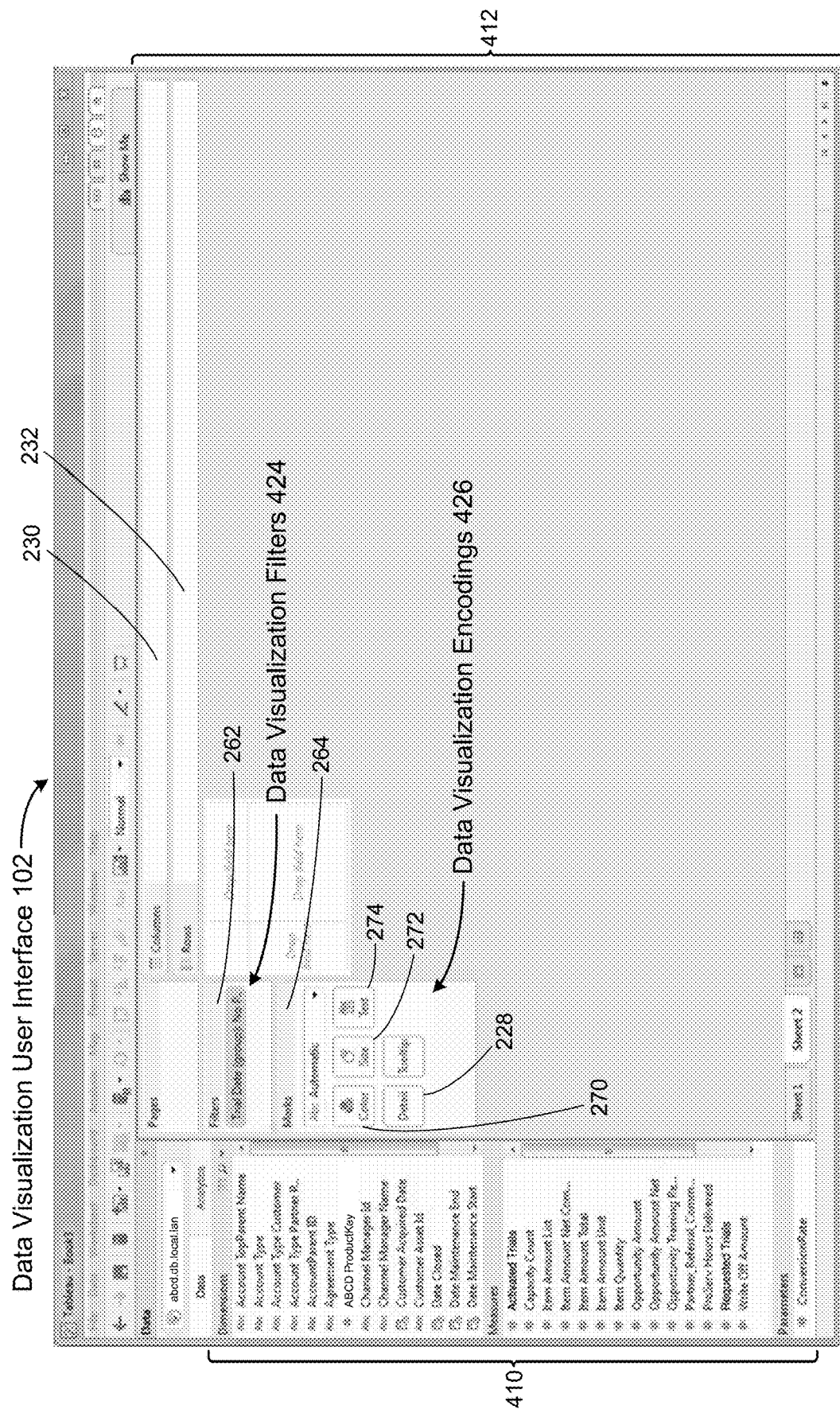
FIG. 4 provides an example data visualization user interface according to some implementations.

In some implementations, the memory 214 includes high-speed random-access memory, such as DRAM, SRAM, DDR RAM or other random-access solid-state memory devices. In some implementations, the memory 214 includes non-volatile memory, such as one or more magnetic disk storage devices, optical disk storage devices, flash memory devices, or other non-volatile solid-state storage devices. In some implementations, the memory 214 includes one or more storage devices remotely located from the CPUs 202. The memory 214, or alternately the non-volatile memory device(s) within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communication module 218, which is used for connecting the computing device 200 to other computers and devices via the one or more communication network interfaces 204 (wired or wireless) and one or more communication networks, such as the Internet, other wide area networks, local area networks, metropolitan area networks, and so on;
- a web browser 220 (or other client application), which enables a user to communicate over a network with remote computers or devices;
- a data visualization application 222, which provides a graphical user interface 102 for a user to construct visual graphics (e.g., an individual data visualization or a dashboard with a plurality of related data visualizations). In some implementations, the data visualization application 222 executes as a standalone application (e.g., a desktop application). In some implementations, the data visualization application 222 executes within the web browser 220 (e.g., as a web application 322);
- a graphical user interface 102, which enables a user to build a data visualization by specifying elements visually, as illustrated in FIG. 4 below;
- in some implementations, the user interface 102 includes a plurality of shelf regions 250, which are used to specify characteristics of a desired data visualization. In some implementations, the shelf regions 250 include a columns shelf 230 and a rows shelf 232, which are used to specify the arrangement of data in the desired data visualization. In general, fields that are placed on the columns shelf 230 are used to define the columns in the data visualization (e.g., the x-coordinates of visual marks). Similarly, the fields placed on the rows shelf 232 define the rows in the data visualization (e.g., the y-coordinates of the visual marks). In some implementations, the shelf regions 250 include a filters shelf 262, which enables a user to limit the data viewed according to a selected data field (e.g., limit the data to rows for which a certain field has a specific value or has values in a specific range). In some implementations, the shelf regions 250 include a marks shelf 264, which is used to specify various encodings of data marks. In some implementations, the marks shelf 264 includes a color encoding icon 270 (to specify colors of data marks based on a data field), a size encoding icon 272 (to specify the size of data marks based on a data field), a text encoding icon (to specify labels associated with data marks), and a view level detail icon 228 (to specify or modify the level of detail for the data visualization);

visual specifications 104, which are used to define characteristics of a desired data visualization. In some implementations, a visual specification 104 is built using the user interface 102. A visual specification includes identified data sources 280 (i.e., specifies what the data sources are), which provide enough information to find the data sources 106 (e.g., a data source name or network full path name). A visual specification 104 also includes visual variables 282, and the assigned data fields 284 for each of the visual variables. In some implementations, a visual specification has visual variables corresponding to each of the shelf regions 250. In some implementations, the visual variables include other information as well, such as context information about the computing device 200, user preference information, or other data visualization features that are not implemented as shelf regions (e.g., analytic features);

one or more object models 108, which identify the structure of the data sources 106. In an object model, the data fields (attributes) are organized into classes, where the attributes in each class have a one-to-one correspondence with each other. The object model also includes many-to-one relationships between the classes. In some instances, an object model maps each table within a database to a class, with many-to-one relationships between classes corresponding to foreign key relationships between the tables. In some instances, the data model of an underlying source does not cleanly map to an object model in this simple way, so the object model includes information that specifies how to transform the raw data into appropriate class objects. In some instances, the raw data source is a simple file (e.g., a spreadsheet), which is transformed into multiple classes;

a data visualization generator 290, which generates and displays data visualizations according to visual specifications. In accordance with some implementations, the data visualization generator 290 uses an object model 108 to determine which dimensions in a visual specification 104 are reachable from the data fields in the visual specification. For each visual specification, this process forms one or more reachable dimension sets 292. This is illustrated below in FIGS. 10, 11, 13A-13C, 14A-14C, 15, 16, and 18A-18C. Each reachable dimension set 292 corresponds to a data field set 294, which generally includes one or more measures in addition to the reachable dimensions in the reachable dimension set 292.

visualization parameters 236, which contain information used by the data visualization application 222 other than the information provided by the visual specifications 104 and the data sources 106; and zero or more databases or data sources 106 (e.g., a first data source 106-1), which are used by the data visualization application 222. In some implementations, the data sources can be stored as spreadsheet files, CSV files, XML files, flat files, JSON files, tables in a relational database, cloud databases, or statistical databases.

Each of the above identified executable modules, applications, or set of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. In some implementations, the memory 214 stores additional modules or data structures not described above.

Although FIG. 2 shows a computing device 200, FIG. 2 is intended more as functional description of the various features that may be present rather than as a structural schematic of the implementations described herein. In practice, and as recognized by those of ordinary skill in the art, items shown separately could be combined and some items could be separated.

Figure 3:
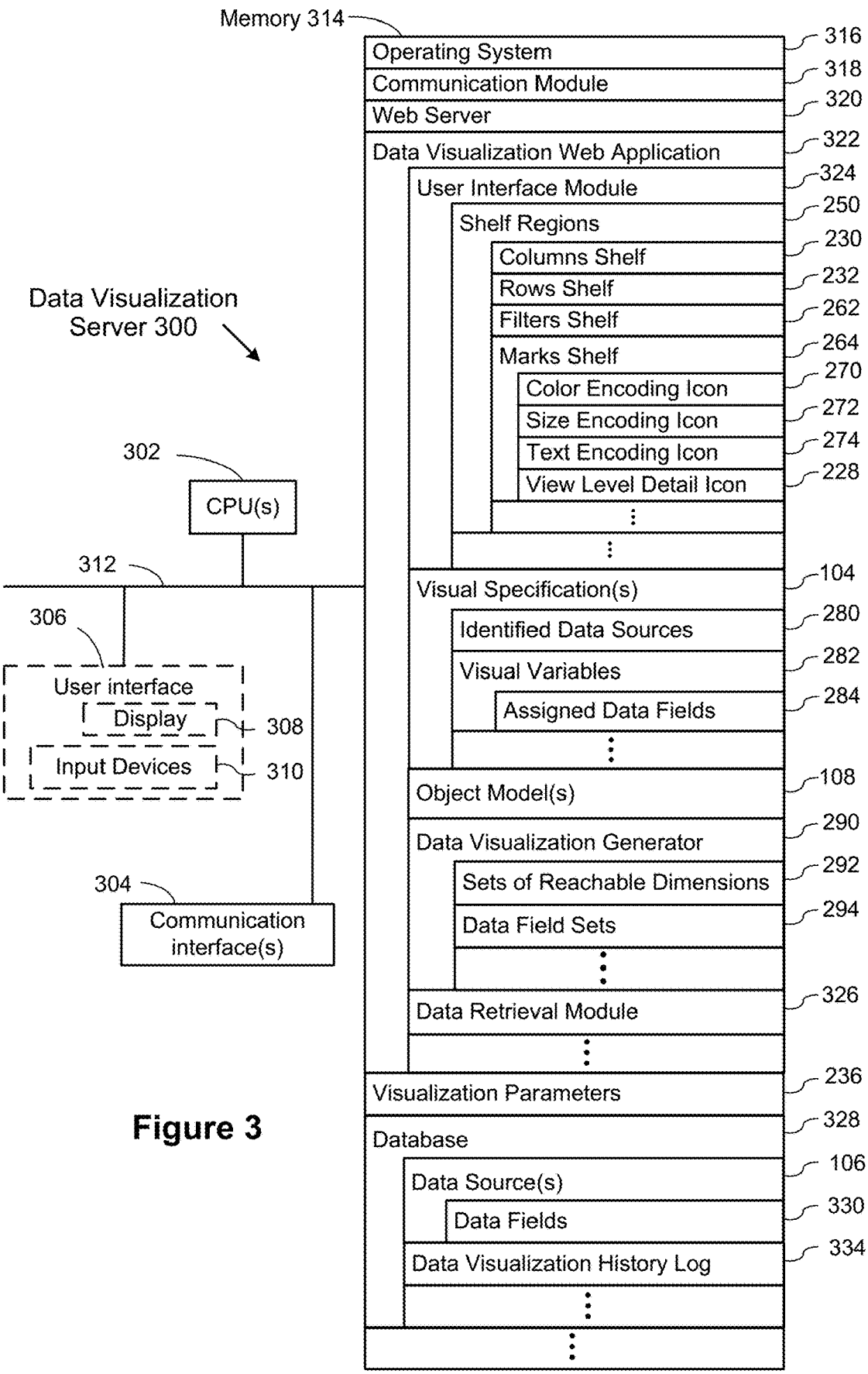
FIG. 3 is a block diagram of a data visualization server according to some implementations.

FIG. 3 is a block diagram of a data visualization server 300 in accordance with some implementations. A data visualization server 300 may host one or more databases 328 or may provide various executable applications or modules. A server 300 typically includes one or more processing units/cores (CPUs) 302, one or more network interfaces 304, memory 314, and one or more communication buses 312 for interconnecting these components. In some implementations, the server 300 includes a user interface 306, which includes a display 308 and one or more input devices 310, such as a keyboard and a mouse. In some implementations, the communication buses 312 includes circuitry (sometimes called a chipset) that interconnects and controls communications between system components.

In some implementations, the memory 314 includes high-speed random-access memory, such as DRAM, SRAM, DDR RAM, or other random-access solid-state memory devices, and may include non-volatile memory, such as one or more magnetic disk storage devices, optical disk storage devices, flash memory devices, or other non-volatile solid-state storage devices. In some implementations, the memory 314 includes one or more storage devices remotely located from the CPU(s) 302. The memory 314, or alternately the non-volatile memory device(s) within the memory 314, comprises a non-transitory computer readable storage medium.

In some implementations, the memory 314, or the computer readable storage medium of the memory 314, stores the following programs, modules, and data structures, or a subset thereof:

an operating system 316, which includes procedures for handling various basic system services and for performing hardware dependent tasks;

a network communication module 318, which is used for connecting the server 300 to other computers via the one or more communication network interfaces 304 (wired or wireless) and one or more communication networks, such as the Internet, other wide area networks, local area networks, metropolitan area networks, and so on;

a web server 320 (such as an HTTP server), which receives web requests from users and responds by providing responsive web pages or other resources;

a data visualization web application 322, which may be downloaded and executed by a web browser 220 on a user's computing device 200. In general, a data visualization web application 322 has the same functionality as a desktop data visualization application 222, but provides the flexibility of access from any device at any location with network connectivity, and does not require installation and maintenance. In some implementations, the data visualization web application 322 includes various software modules to perform certain tasks. In some implementations, the web application 322 includes a user interface module 324, which provides the user interface for all aspects of the web application 322. In some implementations, the user interface module 324 specifies shelf regions 250, as described above for a computing device 200;

the data visualization web application also stores visual specifications 104 as a user selects characteristics of the desired data visualization. Visual specifications 104, and the data they store, are described above for a computing device 200;

one or more object models 108, as described above for a computing device 200;

a data visualization generator 290, which generates and displays data visualizations according to user-selected data sources and data fields, as well as one or more object models that describe the data sources 106. The operation of the data visualization generator is described above with respect to a computing device 200, and described below in FIGS. 10, 11, 13A-13C, 14A-14C, 15, 16, and 18A-18C;

in some implementations, the web application 322 includes a data retrieval module 326, which builds and executes queries to retrieve data from one or more data sources 106. The data sources 106 may be stored locally on the server 300 or stored in an external database 328. In some implementations, data from two or more data sources may be blended. In some implementations, the data retrieval module 326 uses a visual specification 104 to build the queries, as described above for the computing device 200 in FIG. 2;

one or more databases 328, which store data used or created by the data visualization web application 322 or data visualization application 222. The databases 328 may store data sources 106, which provide the data used in the generated data visualizations. Each data source 106 includes one or more data fields 330. In some implementations, the database 328 stores user preferences. In some implementations, the database 328 includes a data visualization history log 334. In some implementations, the history log 334 tracks each time the data visualization renders a data visualization.

The databases 328 may store data in many different formats, and commonly includes many distinct tables, each with a plurality of data fields 330. Some data sources comprise a single table. The data fields 330 include both raw fields from the data source (e.g., a column from a database table or a column from a spreadsheet) as well as derived data fields, which may be computed or constructed from one or more other fields. For example, derived data fields include computing a month or quarter from a date field, computing a span of time between two date fields, computing cumulative totals for a quantitative field, computing percent growth, and so on. In some instances, derived data fields are accessed by stored procedures or views in the database. In some implementations, the definitions of derived data fields 330 are stored separately from the data source 106. In some implementations, the database 328 stores a set of user preferences for each user. The user preferences may be used when the data visualization web application 322 (or application 222) makes recommendations about how to view a set of data fields 330. In some implementations, the database 328 stores a data visualization history log 334, which stores information about each data visualization generated. In some implementations, the database 328 stores other information, including other information used by the data visualization application 222 or data visualization web application 322. The databases 328 may be separate from the data visualization server 300, or may be included with the data visualization server (or both).

In some implementations, the data visualization history log 334 stores the visual specifications 104 selected by users, which may include a user identifier, a timestamp of when the data visualization was created, a list of the data fields used in the data visualization, the type of the data visualization (sometimes referred to as a "view type" or a "chart type"), data encodings (e.g., color and size of marks), the data relationships selected, and what connectors are used. In some implementations, one or more thumbnail images of each data visualization are also stored. Some implementations store additional information about created data visualizations, such as the name and location of the data source, the number of rows from the data source that were included in the data visualization, version of the data visualization software, and so on.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 314 stores a subset of the modules and data structures identified above. In some implementations, the memory 314 stores additional modules or data structures not described above.

Although FIG. 3 shows a data visualization server 300, FIG. 3 is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a server 300 may be stored or executed on a computing device 200. In some implementations, the functionality and/or data may be allocated between a computing device 200 and one or more servers 300. Furthermore, one of skill in the art recognizes that FIG. 3 need not represent a single physical device. In some implementations, the server functionality is allocated across multiple physical devices that comprise a server system. As used herein, references to a "server" or "data visualization server" include various groups, collections, or arrays of servers that provide the described functionality, and the physical servers need not be physically collocated (e.g., the individual physical devices could be spread throughout the United States or throughout the world).

FIG. 4 shows a data visualization user interface 102 in accordance with some implementations. The user interface 102 includes a schema information region 410, which is also referred to as a data pane. The schema information region 410 provides named data elements (e.g., field names) that may be selected and used to build a data visualization. In some implementations, the list of field names is separated into a group of dimensions and a group of measures (typically numeric quantities). Some implementations also include a list of parameters. The graphical user interface 102 also includes a data visualization region 412. The data visualization region 412 includes a plurality of shelf regions 250, such as a columns shelf region 230 and a rows shelf region 232. These are also referred to as the column shelf 230 and the row shelf 232. In addition, this user interface 102 includes a filters shelf 262, which may include one or more filters 424.

As illustrated here, the data visualization region 412 also has a large space for displaying a visual graphic. Because no data elements have been selected yet in this illustration, the space initially has no visual graphic.

A user selects one or more data sources 106 (which may be stored on the computing device 200 or stored remotely), selects data fields from the data source(s), and uses the selected fields to define a visual graphic. The data visualization application 222 (or web application 322) displays the generated graphic 122 in the data visualization region 412. In some implementations, the information the user provides is stored as a visual specification 104.

In some implementations, the data visualization region 412 includes a marks shelf 264. The marks shelf 264 allows a user to specify various encodings 426 of data marks. In some implementations, the marks shelf includes a color encoding icon 270, a size encoding icon 272, a text encoding icon 274, and/or a view level detail icon 228, which can be used to specify or modify the level of detail for the data visualization.

Figure 5:
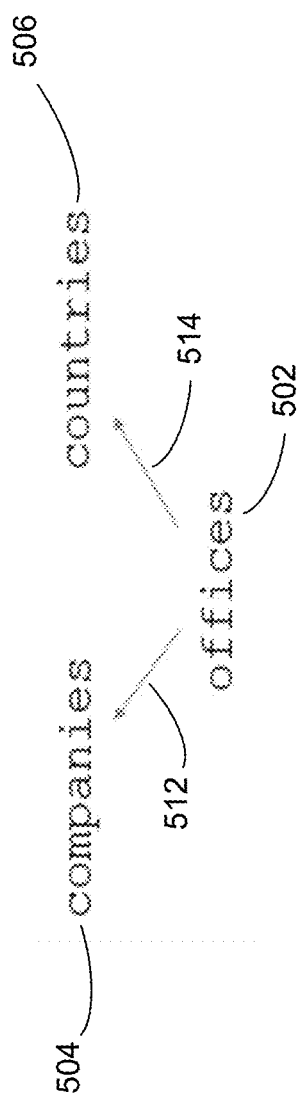
FIG. 5 illustrates a simple object model with three classes, in accordance with some implementations.

An object model can be depicted as a graph with classes as nodes and their many-to-one relationships as edges. As illustrated herein, these graphs are arranged so that the "many" side of each relationship is always below the "one side." For example, in FIG. 5, the offices class 502 has a many-to-one relationship 512 with the companies class 504, and the offices class 502 also has a many-to-one relationship 514 with the countries class 506. In this graph, companies may have multiple offices and countries may have multiple offices, but an individual office belongs to a single company and country. The object model in FIG. 5 is connected, but not all object models are connected. In general, the object model 108 for a data source 106 is built in advance. When a user later builds a data visualization, the structure of the object model 108 assists in the generation of proper data visualizations.

Typically, any pair of classes is joined by at most one path through the relationship graph. When multiple paths are possible, the user may need to specify which path to use, or unpivot the data set to combine two paths into one.

Some of the following figures illustrate various object models, and illustrate user selection of dimensions D and measures M within the object models. Based on the locations of the dimensions and measures within an object model, the data visualization generator 290 determines how many distinct data visualizations to generate and what to build. In this context, it is useful to define the concept of a dimension being reachable from another data field within an object model. Specifically, a dimension D is reachable from a data field when there is a sequence of many-to-one relationships that starts from the class containing the data field and ending with the class that contains the dimension. In addition, if a dimension D is in a class C, then the dimension D is reachable from all other data fields in the class C. In this case, there is a sequence of zero many-to-one relationships that starts with the data field and ends with the dimension.

With this definition of "reachable," it becomes possible to define the set of dimensions that are reachable from a given node in the graph. In particular, for each data field (dimension or measure) in a visual specification 104, the reachable set of dimensions 292 is all dimensions in the visual specification at the same level of detail (LOD) as the given data field or reachable by traversing up the graph from the data field.

For each data field, it is also useful to identify the reachable set of visualization filters. This includes all filters on dimensions that are reachable. Note that measure filters can be implicitly treated as dimension filters at the appropriate level of detail.

FIG. 16 provides pseudocode queries for determining the reachable dimensions for each data field (dimension or measure) within an object model.

For each data field, the set of reachable dimensions and reachable filters makes an implicit snowflake schema centered at the data field. This means there that there is a well-defined and unique way to apply filters to the data field and to aggregate measures. Displaying the results of each data field's query by itself makes it easy to interpret results.

In addition to making it easier for user to build desired visualizations, using reachable dimensions can increase the performance of data retrieval. The queries are faster because they only have to join in dimensions that are reachable through many-to-one relationships. This can be understood as a generalized form of aggressive join culling behavior. A query only has to touch tables that are strictly necessary to create the desired visualization.

For a data visualization that uses N data fields, the process can result in a theoretical maximum of N distinct queries. However, many of these will be redundant. The result of one query may be contained in the result of one or more other queries. In addition, queries that compute measures at the same level of detail can be combined. Therefore, this process usually runs fewer queries.

From a performance perspective, generating multiple independent queries instead of a single monolithic query through many-to-many joins has an additional advantage: the queries can be run in parallel. Because of this, some implementations are able to begin rendering the data visualization before all of the queries have returned their results.

Given the above query semantics, there are two primary challenges that arise: multiple levels of detail and multiple domains. First, the independent queries may produce results at different levels of detail. If the levels of detail nest (e.g. (State, City) with State), this isn't particularly problematic. The process can simply replicate the coarser LOD values to the finer LOD. This is more challenging when the LODs partially overlap (e.g. (State, City) and (State, ZIP)) or are disjoint (e.g. (State, City) and (Product, Subproduct)). Second, the independent queries may produce results with different domains. For example, computing SUM(Population) per State may return an entry for each of the 50 states (if the population table is complete for the United States). However, computing the SUM(Sales) per State only returns states for which there are sales transactions. If the sales table doesn't include transactions in 10 states, then the query will return results for only 40 states.

To address multiple levels of detail, the process starts by combining query results that are at the same level of detail into conglomerate result tables. The process also combines nested query results (those that are in a strictly subset/ superset LOD relationship). This results in duplication of the nested results, but is not harmful because it allows comparing totals to subtotals.

Even after combining all these cases together, there are instances with multiple result tables when the levels of detail are partially overlapping or disjoint. Implementations use various approaches for visualizing results in these instances In addition to addressing multiple levels of details, implementations address other scenarios as well. There are instances where a data field has two or more different domains of values. For example, the set of all states may be different from the set of states that have orders, which may be different from the set of states that have employees. The object model allows a single logical concept (e.g., "State") to have multiple domains associated with it.

Another scenario is when there are multiple root ("fact") tables. The existence of multiple fact tables can introduce many-to-many relationships and replication (duplication). In addition, multiple fact tables can alter how the joins are implemented. In many cases, a single fact table with a snowflake structure may be queried by laying out the join like a tree. However, with multiple fact tables, there is inherent ambiguity about which table to designate as the center of the snowflake, and joining in the tables in this way may not be a good visualization of the user's data model.

Figure 6:
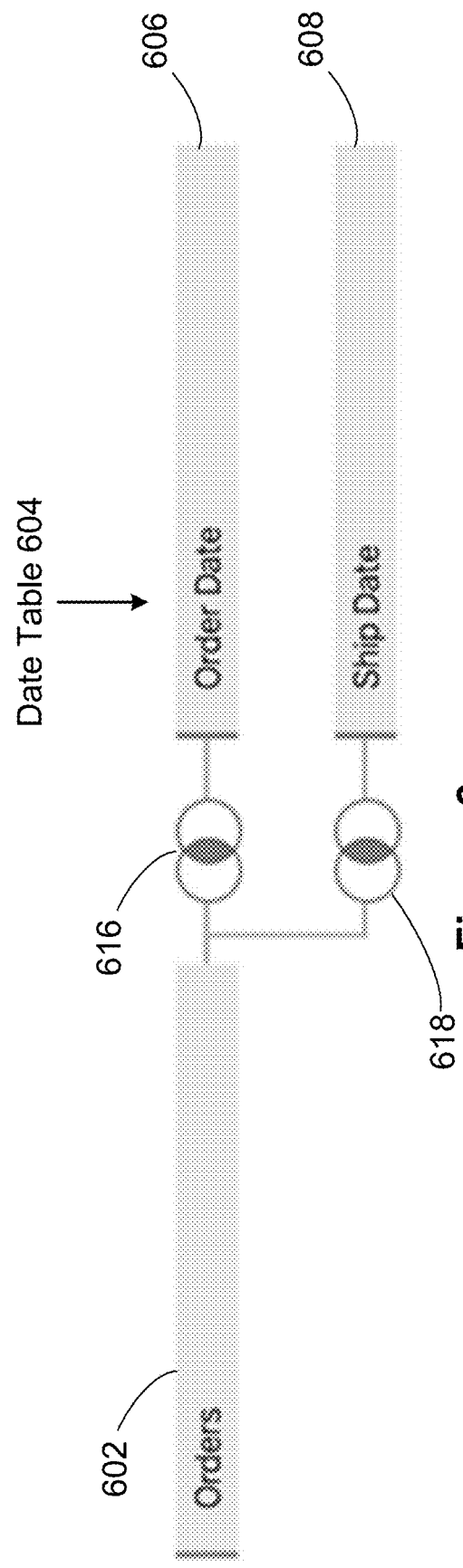
FIG. 6 illustrated a single class that has two distinct relationships with another class, in accordance with some implementations.

Another scenario occurs when one table has two or more references to the same table (and its subtree). For example, consider a scenario where each Order includes both an OrderDate and a ShipDate. There are various ways that this data could be structured. In a first case, the OrderDate and ShipDate are both data fields in the Order table itself. In this case, the data is easy to query. In a second case, there are separate OrderDate and ShipDate tables, so there are separate joins between the Orders table and each of these distinct tables. In a third case, OrderDate information and ShipDate information is consolidated into a single Date table 604, as illustrated in FIG. 6. In this case, there is a first subset 606 of the rows that correspond to order dates (e.g., having a date_type of "Order") and a second subset 608 of the rows that correspond to ship dates (e.g., having a date-type of "Ship"). In this scenario, the Orders table 602 has two joins to the same date table: a first join 616 to the rows representing order dates and a second join 618 to the rows representing ship dates.

The relationships between classes or database tables can also have a "bowtie" arrangement. The visualization in FIG. 7A uses Opportunity Amount, Case duration, Product, and Customer Name. To display this information uses two concatenated data visualizations 704 and 706, both having rows corresponding to Product 702. This utilizes a blend, with a data model (or object model) as illustrated in FIG. 7B. Each of the fact tables factCase 722 and factOpportunity 724 has an independent relationship to both the dimension table dimAccount 712 and the dimension table dimProduct 728. The four relationships 730 look like a bowtie. The colloquially named "bowtie" is the idea that two fact tables can both be related to two dimension tables, which forces a cross in their relationships.

Some implementations also address normalizing "flat" tables. For example, a data source (such as a data warehouse) may include data representing multiple conceptual classes. Some implementations use well-known normalization techniques to build an object model that represents meaningful classes.

In each object model diagram, the sources of dimensions and measures for the current visual specification 104 are labelled with "D" and "M". In the simplest case, there is a single class that includes all of the dimensions and measures from the current visual specification 104, as illustrated in FIG. 8. In this scenario, measures and dimensions come from the same class, and the computation semantics are trivial. The process rolls up the measures to the dimension level of detail. This results in a single table containing the dimensions and aggregated measures.

Creating a small multiple layout for this result table is not necessarily obvious because there are no modeled relationships between the attributes in a single class. However, the shelf model (rows 232 and columns 230) provides a set of heuristics to address this. Dimensions on the same shelf create hierarchical axes (e.g., as in FIG. 9B), whereas dimensions on different shelves create crossed axes. Multiple measures on the same axis are concatenated (as illustrated by the two columns 704 and 706 in FIG. 7A). Other shelves are used for creating marks and defining their visual appearance.

Figures 9A, 9B:
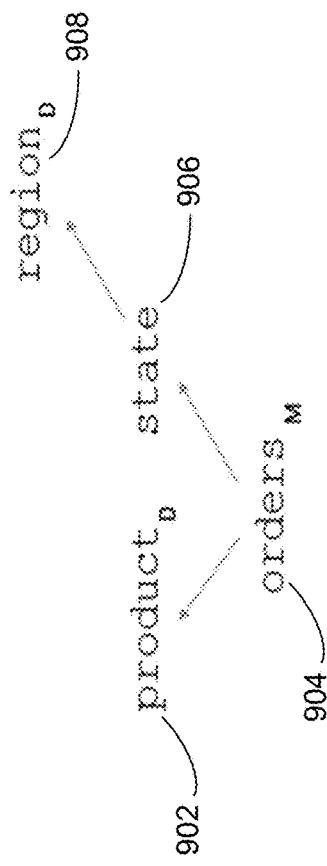
FIG. 9A-9C illustrate building data visualizations that include dimensions from two distinct classes that are not hierarchically nested, in accordance with some implementations.

In a snowflake model, measures come from a single class, as illustrated in FIG. 9A. Dimensions come from the same class or classes reachable by traversing up the relationship graph from the class of the measures. The process joins the dimensions to the class of the measures class along the relationship edges. The measures are aggregated up to the dimension level of detail. All of the other classes are ignored. For example, in FIG. 9A, all of the measures come from the orders table 904, and the data visualization has dimensions in both the product class 902 and the region class 908. The dimensions in the product class 902 and the region class 908 define the level of detail for aggregating the measures from the orders class 904. In this example, there are no dimensions or measures for the data visualization coming from the state class 906, so its data is not used. However, state class 906 may be needed in a query in order to connect the measures from the orders class 904 to the region class 908.

The object model indicates whether there is a nesting relationship or a crossing relationship between the dimensions, which is used in some implementations to determine the default behavior. In the example of FIG. 9A, the product and region are independent of each other, so they should be crossed in a small multiple layout regardless of whether or not they are on the same axis. However, some implementations enable a user to override the default behavior. For example, even when the model shows a cross relationship between independent dimensions, a user may want to nest purely based on the relationship defined by actual data values. Conversely, even when nesting makes sense, a user may want to show a crossed visualization and introduce blank spaces where there is no corresponding pairing between the nested dimensions.

Displaying crossed dimensions on the same axis is illustrated in FIG. 9B. In this case, the user has placed the two independent dimensions segment 920 and category 922 on the same shelf (the columns shelf 230). The user has placed the measure Sales 924 on the rows shelf 232, which is aggregated here using COUNT( ). The segment and category dimensions are independent, so by default they are crossed. The top column header 940 lists the segments and the lower column header 942 lists the categories. Because of the cross, each of the categories is displayed for each of the segments, and this would occur even if there was no data for some segment/category combinations. In some implementations, the user interface 102 addresses user interactions to handle the crossing. For example, in some implementations, selecting one header (e.g., the first furniture header 926) in a crossed axis results in selecting all of the corresponding data (e.g., the furniture data 930, 932, and 934 for all of the columns with the same furniture category).

Figure 9C:
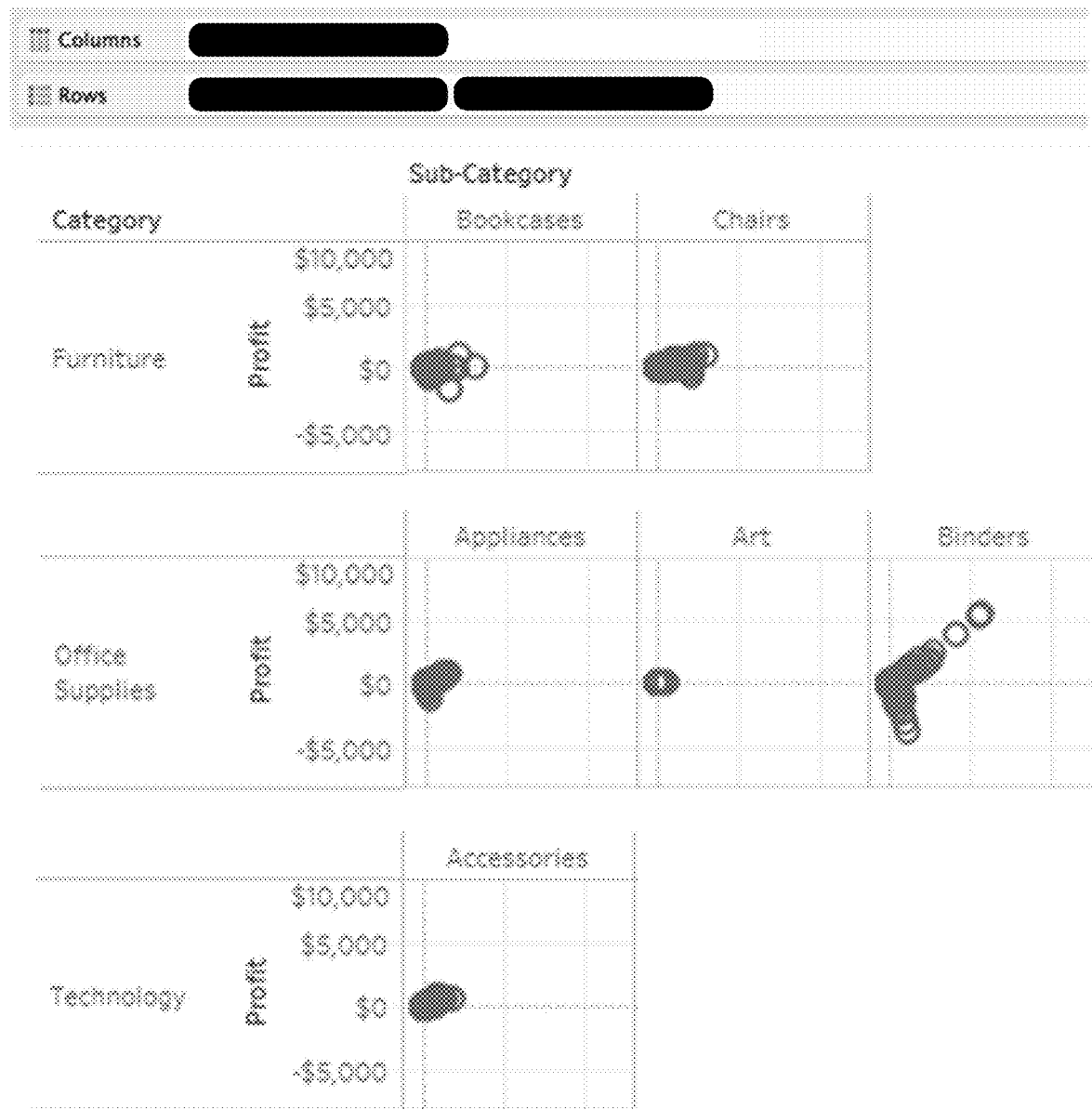

In some implementations, when there are nested dimensions on different axes, the display uses an alternative technique to show just the relevant combinations, as illustrated in FIG. 9C. In this case, the data field "sub-category" is nested under the data field "category," and these two data fields are on distinct axes. The sub-categories for each category are completely different (e.g., bookcases and chairs in the furniture category, but appliances, art, and binders in the office supplies category). Because of this, the display includes a separate set of column headers for each row in the data visualization. Sometimes this is referred to as a Trellis chart. It ensures that each sub-category is only shown within the appropriate category.

Figure 10:
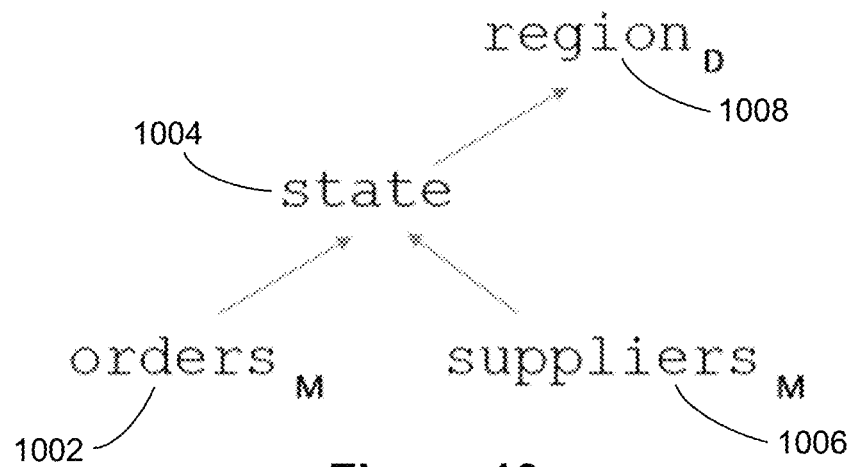
FIGS. 10 and 11 illustrate user selection of measures that are attributes of two or more distinct classes in an object model, in accordance with some implementations.

Blending is a generalization of the snowflake case in which measures can come from multiple classes. This is illustrated in FIG. 10. Dimensions are reachable from all measures through a single class (sometimes called the "join LOD"). In FIG. 10, the state class 1004 is the "join LOD".

If each measure is considered independently, this scenario is the same as a snowflake. Each measure can be rolled up to the dimension LOD independently. Then the aggregated measures can be joined together at the dimension LOD. For example, the measures from the orders table 1002 are aggregated according to the dimensions in the region class 1008, and the measures from the suppliers class 1006 are also aggregated according to the dimensions in the region class 1008. Because the measures from both the orders class 1002 and the suppliers class are aggregated at the same level of detail, result sets can be joined directly to form a single table at the dimension LOD.

If the data visualization has no dimensions (e.g., it is showing grand totals), then it is a trivial blending case because all (zero) dimensions can be reached from any measure. In this case, all measures are rolled up to the empty dimension LOD (i.e., one aggregate data value is computed for each measure) and the aggregates are displayed in a single visualization. This works even if the object model is not connected.

Figure 11:
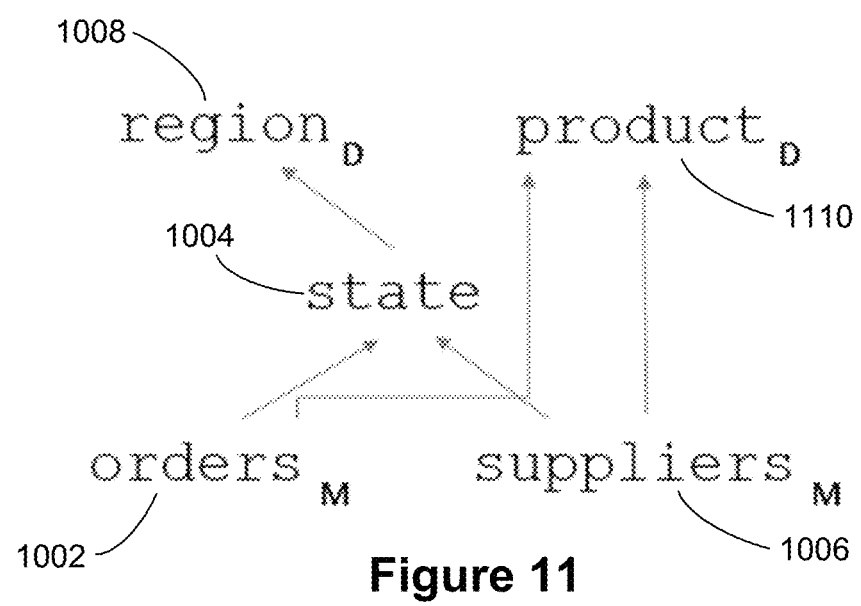

The restriction that all dimensions be reachable through the same class can be relaxed. As long as all dimensions are reachable from all measures by traversing up the graph, the process can use the same query semantics and visual layout as standard blending. This is illustrated in FIG. 11, which adds the product class 1110 to the data model shown in FIG. 10. In this example, the measures from both orders 1002 and suppliers 1006 can be rolled up according to the dimensions in the region class 1008 and the product class 1110 despite not going through a single join LOD.

Note that the relationship of the dimensions to each other (crossed or nested) is independent of the set of measures used, so the layout of the small multiple display can use the same rules as with simpler blending.

Sometimes a measure may be defined above a dimension in the object model, as illustrated in FIG. 12A. In this case, the measures in the region class 1208 (perhaps Population), will not be aggregated at all. Instead, the measure will be replicated (duplicated) to the dimension LOD (according to the dimensions in the orders class 1202 and the product class 1210) as an attribute. In effect, the data visualization application treats this measure as just another dimension.

To make this behavior clear to users, some implementations suppress the aggregation function on the corresponding pill on the rows shelf 232 or the columns shelf 230 as illustrated in FIG. 12C. Instead of showing SUM(Profit) 1250, the user interface shows Profit 1252. In some implementations, the user interface alters the appearance of the expression in other ways, such as visually deemphasize it. In addition, some implementations visually acknowledge the duplication in selections, such as the duplicated headers in crossed axes. For example, in FIG. 12B, all of the rows 1230 in the data visualization show the same value for the category sales (there is only one data value), and the rows are highlighted together when viewed.

More challenging level-of-detail issues arise when not all of the dimensions are reachable from all of the non-attribute measures. For example, consider the object model in FIG. 13A, which has a company class 1302 and a country class 1304, but no relationship defined between them. This is not as strange as it may seem, because a user does not have to define a relationship between two objects before the objects can be used.

Figures 13A, 13B:
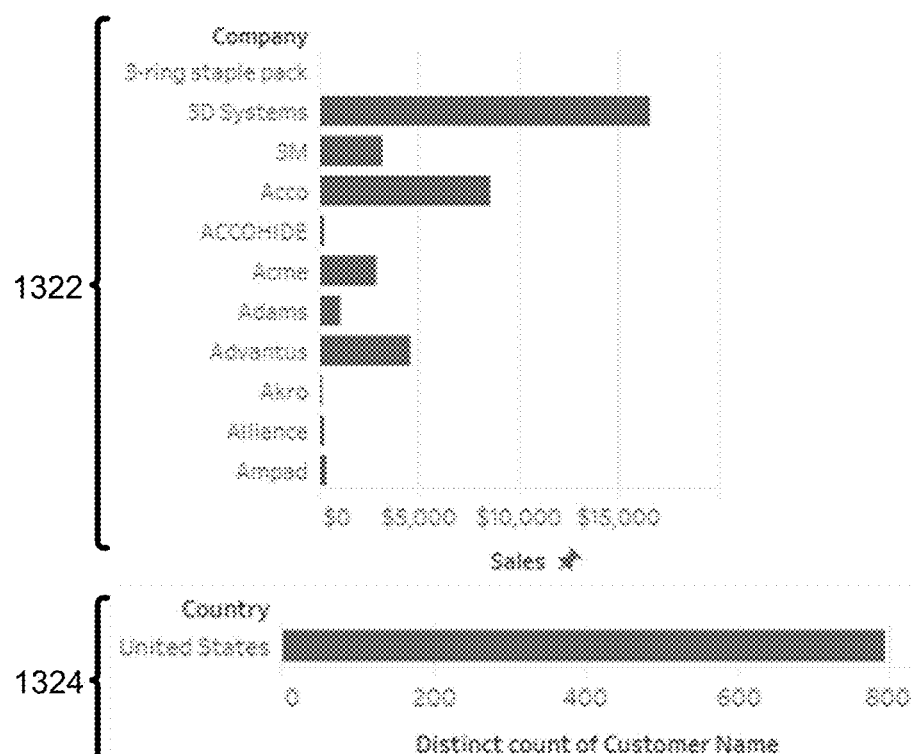
FIGS. 13A-13D illustrate user selection of measures and dimensions from two or more classes in a data model that are not connected in the model, and corresponding data visualizations that may be generated, in accordance with some implementations.
Figure 13C:
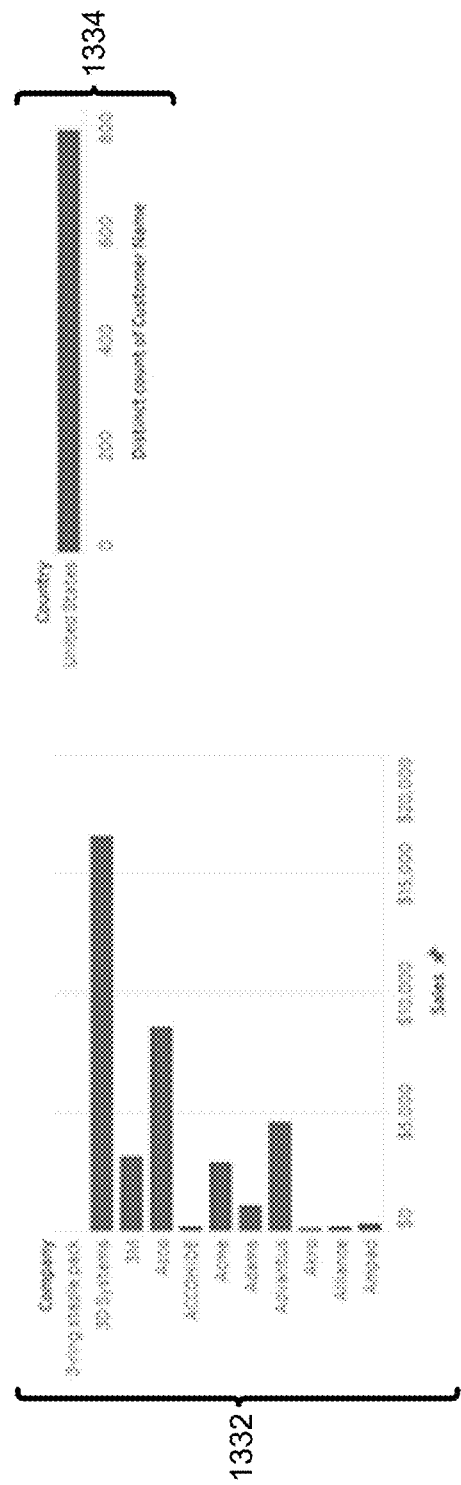
Figure 13D:
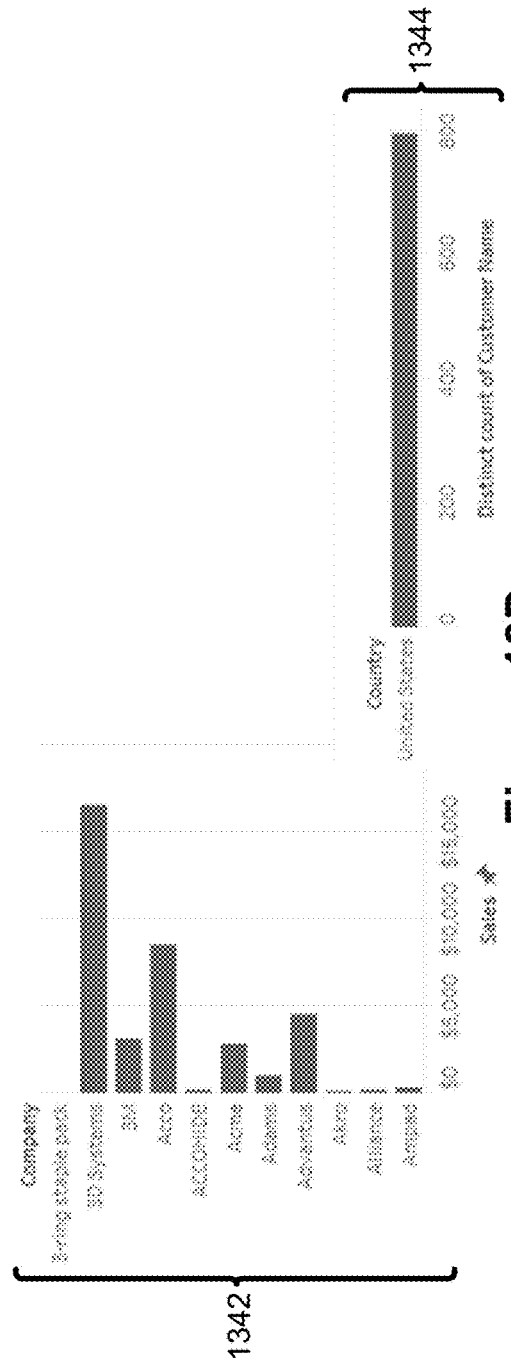

In some implementations, this results in two vertically concatenated data visualizations 1322 and 1324, as illustrated in FIG. 13B. In some implementations, the two distinct data visualizations are concatenated horizontally, as illustrated in FIGS. 13C and 13D. In FIG. 13C, the tops of the two visualizations 1332 and 1334 are horizontally aligned. In FIG. 13D, the bottoms of the two data visualizations 1342 and 1344 are horizontally aligned. Note that the plots in FIGS. 13C and 13D do not share an axis.

In some implementations, when there are multiple data visualizations, one visualization is shown at a time, allowing users to flip through them. To help users understand which fields are used to make a visualization, some implementations gray out the unused fields or filters when the corresponding visualization is not shown or does not have the focus.

In some instances, the dimensions and measures are linked via a many-to-many relationship, as illustrated in FIG. 14A. In this example, the dimensions and measures from the customers class 1402 are connected via a many-to-one relationship with the state class 1406. Similarly, the dimensions and measures from the companies class 1404 are connected by a many-to-one relationship with the state class 1406.

This case is very similar to blending, except that dimensions have been included from both of the two bottom classes 1402 and 1404. The result is that the dimensions from the companies class 1404 are not reachable from the measures in the customers class 1402 and vice versa. This case is similar to the disconnected graph case in FIG. 13A, except that the additional state class 1406 has been added.

In some scenarios, some implementations combine the blending and disconnected behaviors, showing independent data visualizations for customers and companies, nested within state, as illustrated in FIG. 14B. As show in FIG. 14B, the state dimensions are reachable from both the customers class 1402 and the companies class 1404, so the overall visualization is aligned by state 1420. For example, the partial data visualization in FIG. 14B shows data for Alabama 1422 and Arizona 1424. Within each horizontal region for a state, there is a listing of companies 1426, together with visual marks 1428 representing sales for each company. In addition, each horizontal state region also has a list of customer names 1430, together with visual marks 1432 (e.g., bars) representing profit for each of these individual customers. This illustrates partial alignment based on the shared dimension(s) from the state class 1406.

FIG. 14C illustrates a data visualization that some implementations create using a different selection of data fields from the same object model shown in FIG. 14A. For FIG. 14C, a user has selected the measure sales from the customers class 1402, and has selected the measure sales from the companies class 1404 as well. However, the user has not selected any dimensions from either of these two classes. Because the dimension state is reachable from all of the measures, there is a single data visualization with each of the measures rolled up to state. However, with the two fact tables, and limited sales, the question arises about which states to show. In some implementations, the default behavior is to perform a full outer join, showing each of the states, and both the company sales and the customer sales for each of the states (blank indicates zero). For example, in FIG. 14C, Alabama has no sales 1450 for either companies or customers. On the other hand, California has both company sales 1452 and customer sales 1454. Some states have only one or the other, such as Florida having only company sales 1456 and Illinois having only customer sales 1458. In some implementations, the user can select what data is displayed (e.g., omitting states that have no data from either the customers class 1402 or the companies class 1404). In some implementations, the states with no activity for either companies or customers are omitted by default.

FIG. 15 illustrates a scenario that is the same as FIG. 14A, except that the dimension from the state class 1506 has been omitted. Because of the object model, it is known that the customers class 1502 and the companies class 1504 have a many-to-many relationship through the state class 1506. However, the user has not asked for state to be included in the visualization.

In this scenario, some implementations simply ignore the link through state and produce the same visualization as in the disconnected scenario (FIGS. 13A-13D). This approach has the advantage that a transition from not having state in the data visualization to having state included is somewhat natural. A user starts out with two independent lists, then adding state would create two independent lists for each state.

Some implementations address this scenario in another way. Some implementations produce separate visualizations but automatically highlight linking behavior on state. In some cases, this is meaningful. For example, if customers could be served by companies in the same state, then clicking on a customer in the customer list would highlight companies in their state that could serve them. Conversely, clicking on a company would highlight customers they can serve. On the other hand, when there is no such interesting semantics, highlighting companies in the same state as some customer may be a distracting or counterproductive default. This type of cross highlighting can also be computationally expensive, so making it a default behavior is not practical for implementations on devices having limited computational resources.

Based on these examples, some implementations perform the following steps based on the selected dimensions and measures and the corresponding object model. First, the process partitions the measures in the visual specification 104 by the set of dimensions reachable from each (creating one or more reachable dimension sets 292). Second, for each set of measures that can reach the same set of dimensions, the process rolls up the measures to the dimension level of detail. Each reachable dimension set 292 together with its corresponding measures forms a data field set. 294. Third, the process creates a separate data visualization for each data field set 294 using the visual variable mappings associated with the dimensions and measures in the data field set. The process ignores all other mappings.

Some implementations also address the situation illustrated in FIG. 14B. In that case, there are independent Customer and Company lists nested inside of State. In this case it is useful to nest the separate visualizations in a common dimension. Similar scenarios arise where it is useful to display one set of measures as a subtotal or grand total interleaved with or in the margin of the display of another set of measures.

Some implementations prevent a user from getting into a scenario with multiple visualization by restricting them to one of the easier scenarios above. For example, some implementations limit users to the blending scenario by requiring them to pick the "join LOD" object for each sheet and then disabling dimensions not reachable by going up the graph from the join LOD and measures not reachable by going down the tree.

In blending it is not always clear which way the many-to-one relationships go. Blending gives correct and useful results when a many-to-one relationship goes the way that is expected. When it does not go as expected, a "*" is displayed. Some implementations take a similar approach to the object model issues here. For example, instead of making independent lists, some implementations show the cross product of the lists and duplicate the measures. This is described in more detail below.

How filters apply is closely related to the domain issue. Filters should definitely apply down the relationship graph (from one to many). In the object model of FIG. 5, a filter on companies should apply to offices as well. Filtering up the graph (e.g., if a filter removes all offices in the UK, should the UK be filtered too?) is more questionable.

In some implementations, each filter has an assigned LOD, and it is applied at that level of detail.

In some implementations, when the process above would lead to two or more distinct data visualizations, the process performs a natural join of all the conglomerate result sets to produce a single crossed result table. This conglomerate is a single table, so it can be laid out in the usual way. This is an extended form of data blending, as described in more detail below. This approach duplicates data, but the duplication happens after aggregation, so it is less likely to be analytically wrong.

To help users understand how a particular field was computed, when a user clicks on a pill in a shelf region, some implementations gray out all the fields and filters that are unreachable from that pill. Hover text for the pill indicates, for example, that, "SUM(Sales) was computed for each State, filtered by Ship Date (1 dimension and 2 filters were not used)".

This approach potentially duplicates a lot of data. This can result in lots of data marks, which may cause rendering performance problems. However, the duplication is done after all the computations are done, so query time is not impacted. The duplication of data may cause some confusion to users. Some implementations address this issue by interactively highlighting duplicated data in the visualization for the user. Alternatively, some implementations avoid automatically stacking data when it is known that it is duplicated. When viewing data, some implementations show the separate result sets to help the user understand the level of detail of each data point.

Some implementations combine data blending with an object model for building data visualizations. Data blending is an ad hoc data integration feature, which allows users to easily connect to multiple disparate data sources and build visualizations that use data from all of them. This enables users to answer common business analytic questions when relevant data may be stored in variety of locations, such as Tableau Server, corporate data warehouses, spreadsheet files, and CSV files, Data blending eliminates the distinction between primary and secondary data sources. In data blending, there is no user visible distinction between primary and secondary data sources. One important implication of this symmetry is that users will be able to blend "chains" of data sources together (e.g., A blended with B blended with C), permitting the creation of non-star schemas.

Data blending provides full outer join semantics instead of being limited to left join semantics between the primary data source and all secondary data sources. Thus, the domain of the analysis is not limited by the set of entries in the primary data source. In data blending, the default is to always show all data from all data sources. Users are able to control this behavior through filters and/or settings in the data source relationships. Additionally, related fields are treated interchangeably, always showing the entire coalesced domain, regardless of which data source it is from. For example, if two distinct tables are joined on a State data field, then the State data field from either table can be used in the same way. If users want to limit the domain to one of the input data sources, they can drop a related field on the filtering shelf and get a special filter dialog option that permits multi-selecting the data sources that contribute to the domain.

Data blending eliminates the need to manage link state in the schema viewer. The links in the schema viewer allow users to control the level of detail at which the blended data sources are joined. In data blending, the need for per-sheet link icons is eliminated due to the outer join semantics. Users will still need to specify data source relationships, but the UI for this makes this easier.

Data blending supports all calculations and data modeling concepts everywhere. All calculations work on all data sources, because there is not source that is designated as primary in data blending. In particular, non-additive aggregates, such as COUNTD and MEDIAN, work on all data sources; dimensions from all data sources partition the view using row level data (no ATTR aggregation is used by default); cross data source calculations work on row-level data and can be used as dimensions; geocoding is done for data from all data sources and the results can be used as dimensions in the visualization; and sets, groups, bins, combined fields, and LOD expressions work consistently regardless of which data source they come from.

Data blending provides rich data source relationships. In data blending, users can blend on geocoding results (and in some implementations users can blend with table calculations). Further, users can specify a richer set of relationship operators, such as spatial inclusion, along with more standard operators such as < and ≠.

It is useful to compare the ad hoc process of data blending to joins performed in data integration. There are at least three parts of data integration that relate to data blending. First, data integration semantics typically require joins to occur at the beginning of the data processing pipeline. This has a number of undesirable results that are better solved with data blending.

The user experience for data integration starts in a data modeling tool. Users have to make complex decisions like which database tables to include in their data source and which join types to use before they can see their data. In contrast, data blending allows users to incrementally build up the set of tables they use in their analysis and define relationships only when necessary. Some implementations even infer some default relationships for them. This aspect of data blending is the default experience in some implementations. Users only have to define specific joins in rare scenarios where, for example, the duplicating behavior of joins is actually desirable.

Joining before aggregation duplicates data, which often makes aggregates incorrect. This can sometimes be avoided using LOD expressions to undo the duplication. On the other hand, in data blending, the behavior of joining after aggregation solves a much wider range of analytic scenarios and is a better default. Further, it is generally much more efficient to execute joins after aggregation.

Joins change the user's data. Inner, left, and right joins filter the input data, changing the domain of the user's data. Left, right, and outer joins introduce NULLs into fields, which can also be very confusing, especially if there are already NULLs in the data. By delaying the joins to later in the pipeline and by not exposing the details of the joins to the user, data blending has flexibility to provide better behavior by default.

For the above reasons, some implementations provide a user interface where blending semantics are the default. Specifying concrete joins in the data source definition is permitted, but this would become an advanced scenario to cover a smaller fraction of data integration use cases.

A second way to compare data integration with data blending is the join diagram UI in the data prep window. Some implementations of data blending utilize the same basic join diagram.

The third way to compare data integration and data blending is with respect to data federation. Some implementations of data blending use data federation. This means that blending computations can be moved to where federation is performed (e.g., the Tableau data engine).

In data blending, all data sources behave essentially like "primary" data sources. An important implication of this design is that when there is a many-to-many relationship between dimensions from multiple data sources, the data visualization generator 290 may visually duplicate measures across multiple marks. This is as intended. In fact, this is exactly the way LOD expressions work. If two LOD expressions compute aggregates that are coarser than the visualization LOD, each of them is duplicated across all of the marks.

One important point to note is that with blending semantics, the joins can introduce duplicate marks, but the aggregate values are still meaningful. In contrast, joins in data integration duplicate the data first, frequently resulting in meaningless aggregate values and duplicated marks. Blending semantics is thus the default behavior.

Geocoding can be applied to both tables first to allow for blending on spatial types that result from geocoding. This is treated like blending on any other calculation.

Densification is applied after data blending. Using full outer join semantics avoids the need to apply densification first because all data is pulled from both data sources.

When using data blending, all related fields have a "Use selected data sources" option 1702 that replaces the "Use All" option, as illustrated in FIG. 17. Here, users can specifically select which data source domains should be coalesced to make the related field's domain.

General filters on related fields are applied at the row level to all related tables over the domain of the related field (which is the union of the input field domains).

Condition and Top N filters on related fields are treated like non-related field filters on the table containing the fields used in the sorting calculation.

Filters on non-related fields are always applied to the source table at the row level.

Filters on non-related fields are computed on the source table and then the table is rolled up to the related field level to get the related field domain that passes the filter. This filter is then applied to remove values that didn't pass the filter. Importantly, it is not used to remove values that exist in a related table, but don't exist in the source table.

Some implementations generate a query tree for the database queries. At a high level, some implementations use the following pattern to generate the queries for a visualization:

- apply data source filters to each data source.
- evaluate data source-specific calculations, including geocoding.
- use the defined blending relationships to create a join tree across the filtered data sources. Default to using outer joins wherever the user hasn't explicitly specified not to. Insert the evaluation of cross data source calculations where necessary in the tree (if a cross data source calculation is used as a relationship field, it will need to be evaluated in the middle of the join tree). Fields related by equality are coalesced into a single field.
- apply dimension filters. Importantly, filters that don't explicitly exclude "unmatched" values are assumed to keep them.
- for each data source, select the distinct combinations of data relationship fields and visualization dimensions from that data source. The result is a table that maps from that data source's relationship fields ("the join LOD") to the LOD of the visualization.
- join this table back to the corresponding data source and apply a "group by" to roll the result up to the visualization LOD. All aggregates are directly rolled up from row level to the visualization LOD.
- join all of the resulting tables together on the visualization LOD columns to make the visualization data table.
- apply measure filters followed by the rest of the standard query pipeline.

For LOD expressions, filters with aggregate conditions or Top N, subqueries are generated that replicate pieces of the above tree.

While the above pattern specifies the general process for building the query tree for any blending scenario, further optimizations may be applied that translate this to a much more efficient form.

To enable optimizations, some implementations include metadata that tracks functional dependencies between data fields in each table. In some implementations, this information is available from primary key information in the data source or from calculated field relationships. For extracted data sets, some implementations have previously analyzed the table during extraction and made this metadata available to the query pipeline.

Some implementations also use inclusion dependencies, such as primary key/foreign key information. For tables from the same SQL connection, some implementations get this information from the database metadata. In other cases, a user provides this information.

Some implementations learn these metadata properties from past queries, such as from a data visualization history log 334.

In some implementations, data blending uses federation instead of doing blending as a special case stage in the data interpreter. Data blending is implemented as an AQL (Analytical Query Language) logical tree that is compiled to a federated tree using a query pipeline (with some appropriate optimization extensions).

In some implementations, the federated tree is ultimately executed primarily in the Tableau Data Engine. To make spatial analytic scenarios possible, some implementations move geocoding to the Tableau Data Engine as well.

Some implementations include various performance optimizations. In some implementations, the optimizations include:

- splitting MIN/MAX/SUM/COUNT across levels of detail so that these aggregates can be requested in the first query, without needing a second pass.
- if the inclusion dependencies are known, full outer joins that don't increase the size of the domain can be simplified or removed
- if some functional dependencies are known, the process can avoid a roll up that does not do anything.
- some existing optimizations can be generalized. In particular, filter push down can improve performance.

One assumption for blending is that the process can create a table that maps from a data source's row level data to the dimensions in the view (e.g. the set of marks). This is sometimes called the "join table" in some implementation of data blending. To enable primary table behavior for all data sources in data blending, the process sends a corresponding join table to each data source that has aggregates in play.

Conceptually, the join table maps from the related columns of a data source to the dimensions in play in the data visualization. This can be simplified by instead creating a table that maps from the related columns to a mark index (e.g., a unique integer for each combination of dimension values). This avoids the need to send dimensions to data sources. The dimension values may be long, resulting in complex queries. And if the dimension values are strings (which is common), the process can run into collation issues when moving data between data sources. A mark index avoids these problems.

Given a join table that maps from the related columns to the mark index, the process can join it to the remote database in a number of ways. If the related columns functionally determine the mark index (which is the most common scenario), the process can convert the join into a simple case expression as long as there are not too many cases. If the related columns do not functionally determine the mark index, the process can convert the join table into a table literal, as long as the database supports table literals (e.g., SQL Server or Postgres) and there are not too many rows in the table. The process can create a temporary table on the remote database and join with it there. This works only if the user has permissions to create temporary tables. Finally, the process can pull the remote data source into the Tableau Data Engine and do the join there.

Figure 18B:
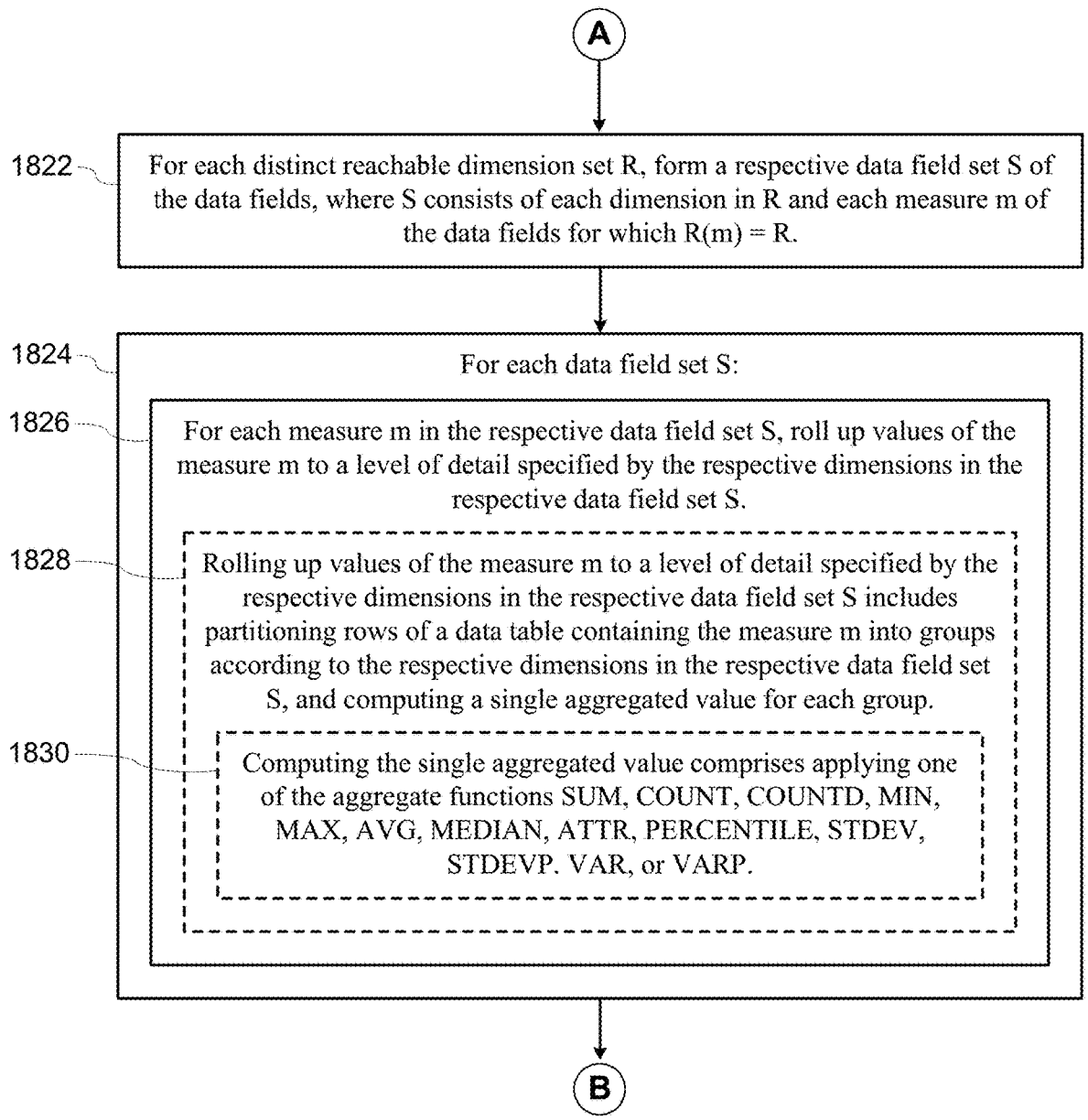
Figure 18C:
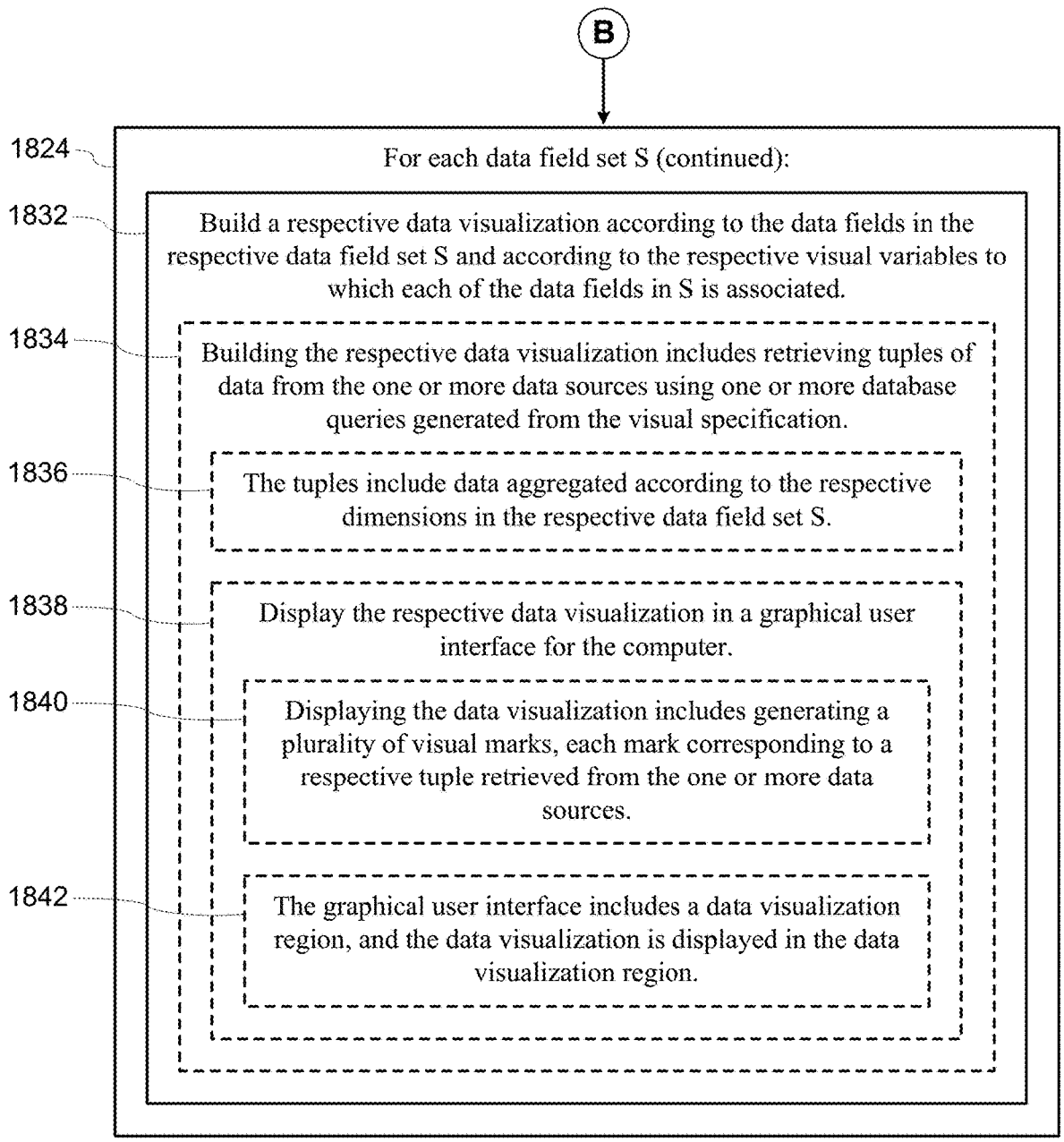

FIGS. 18A-18C provide a flowchart of a process 1800 for generating (1802) data visualizations according to some implementations. The method is performed (1804) at a computing device 200 having one or more processors and memory. The memory stores (1806) one or more programs configured for execution by the one or more processors.

The process receives (1808) a visual specification 104, which specifies one or more data sources 106, a plurality of visual variables 282, and a plurality of data fields 284 from the one or more data sources 106. Each of the plurality of visual variables 282 is associated (1810) with a respective one or more of the data fields 284, and each of these assigned data fields 284 is either a dimension d or a measure m. Typically, the visual specification 104 includes (1812) one or more additional visual variables that are not associated with any data fields 330 from the one or more data sources 106. In some implementations, each of the visual variables 282 is (1814) one of: rows attribute, columns attribute, filter attribute, color encoding, size encoding, shape encoding, or label encoding.

For each measure m of the data fields, the process identifies (1816) a respective reachable dimension set R(m) 292 consisting of all dimensions d, of the data fields, that are reachable from the respective measure m by a sequence of many-to-one relationships in a predefined object model for the one or more data sources. The sequence may be of length 0, representing the case where the dimension and the measure are in the same class. In some implementations, a dimension d is reachable (1820) from a measure m when the dimension d and the measure m are in a same class in the predefined object model, or else the measure m is an attribute of a first class $C_1$ in the predefined object model, the dimension d is an attribute of an nth class $C_n$ in the object model, with n≥2, and there is a sequence of zero or more intermediate classes $C_2, \ldots, C_{n-1}$ in the predefined object model such that there is a many-to-one relationship between the classes $C_i$ and $C_{i+1}$ for each i=1, 2, ..., n−1.

For each distinct reachable dimension set R 292, the process forms (1822) a respective data field set S 294 of the data fields, where S consists of each dimension in R and each measure m of the data fields for which R(m)=R.

For each (1824) of the data field sets S 294, the process generates a respective data visualization. First, for each measure m in the respective data field set S, the process rolls up (1826) values of the measure m to a level of detail specified by the respective dimensions in the respective data field set S. In some implementations, rolling up values of the measure m to a level of detail specified by the respective dimensions in the respective data field set S includes (1828) partitioning rows of a data table containing the measure m into groups according to the respective dimensions in the respective data field set S, and computing a single aggregated value for each group.

Typically, the operator that computes the single aggregation is (1830) one of: SUM, COUNT, MIN, MAX, or AVERAGE. In some implementations, the keywords CNT and AVG are used instead of COUNT and AVERAGE. Some implementations provide additional aggregation operators. For example, some implementations provide an ATTR( ) aggregate operator. For each group, the ATTR( ) operator determines if all of the values in the group are the same. If so, the ATTR( ) operator returns that unique value for the group; otherwise, the ATTR( ) operator returns "*", indicating that there are multiple values for the group. In some implementations, the single aggregation operator is (1830) one of: SUM, COUNT, COUNTD, MIN, MAX, AVG, MEDIAN, ATTR, PERCENTILE, STDEV, STDEVP, VAR, and VARP.

For each (1824) data field set S 294, the process also builds (1832) a respective data visualization according to the data fields in the respective data field set S 294 and according to the respective visual variables 282 to which each of the data fields in S is associated. In some implementations, building the respective data visualization includes (1834) retrieving tuples of data from the one or more data sources 106 using one or more database queries generated from the visual specification 104. In some implementations, these tuples include (1836) data aggregated according to the respective dimensions in the data field set S 294.

In some implementations, the process displays (1838) the respective data visualization in a graphical user interface 102 for the computing device 200. In some implementations, displaying the data visualization includes (1840) generating a plurality of visual marks, each mark corresponding to a respective tuple retrieved from the one or more data sources. In some implementations, the graphical user interface 102 includes a data visualization region 412, and the data visualization is displayed in the data visualization region.

Some data visualization applications take the required fields for a data visualization (a "Viz"), which may be specified in the data visualization user interface 102, and extract a flat, denormalized table from the Data Source that contains these elements. By flattening out the data, the data model may duplicate data from some of the separate tables in the underlying Data Source. When aggregation functions are run on this data model, the aggregations of these measures may be affected by these duplicates, giving surprising (i.e., unexpected and/or undesired) results.

Another problem with the flat model is it introduces possible inefficiencies. In many cases, the user can get the expected calculation using LOD calculations, which cover the entire flat result table to make correct aggregations. Since the table is flat, filtering also occurs across the entire result table, even if the relevant field is in a single, small sub-table.

Disclosed implementations address these and other issues. Objects in the Object Model are collections of data that can be referenced by a primary key. They might be an SQL table, a region of a spreadsheet, or an SQL stored procedure. Synthetic Objects may also be created to merge Object Models or resolve ambiguities in the data relations. Each Object can be characterized in the Object Model by its list of columns, which columns make up the Primary Key, and which columns are used as Foreign Keys. In some cases, only a subset of the fields can be used as Dimensions in a Viz.

The Object Model for a system of data is a graph relating the various objects in many-to-one relationships from Foreign Keys to Primary Keys. The edges are directed, from the Many (Foreign Key) side to the One (Primary Key) side. It is important that the Object Model graph be singly-connected and contain no cycles, so that the paths through the graph are unambiguous. The overall shape of this graph is a polytree.

The Object Model Engine creates AQL Models from the Object Model Perspective and the Abstract Query from the Viz.

Processing a query for a Viz uses a Perspective within the Object Model. A Perspective is a sub-tree for the Viz, and it defines the set of fields (those on the sub-tree) that can be used as Dimensions in the Viz.

When the Object Model Engine examines the fields in the Viz, it separates the fields into values that are aggregated (the "Measures"), and the other values that determine the Level of Detail for the Viz (the "Dimensions"). FIGS. 19A and 19B provide two examples of Object Model graphs that are supported. An "M" in a box indicates that the object corresponding to the box has one or more measures. A "D" in a box indicates that the object corresponding to the box has one or more dimensions. Looking at the supported models, there is a root node for the objects containing dimensions. For example, the root node in FIG. 19A is the node 1902. In FIG. 19B, the root node is the node 1912. Note that there are other nodes in FIG. 19B before the root node, but they have no dimensions. With this structure, all of the nodes with dimensions are reachable from the root node by a sequence of foreign key to primary key relationships (as indicated by the arrows in FIGS. 19A and 19B).

FIG. 19C is similar to FIG. 19B, but has an additional node 1924, which is not reachable from the root node 1922. In some implementations, where there is a node (such as the node 1924) that is not reachable from the root, all of the fields at the unreachable node are treated as measures or attributes.

FIG. 19D illustrates another problematic case where there are two distinct paths 1936 and 1938 between two nodes. Some implementations do not support this case because it would require an arbitrary selection of one path, causing unpredictable results.

Given a set of fields and a Perspective that is valid for that set, the Object Model Query processor modifies the data query in the AQL model. The Model is then further processed by the query pipeline, and the data queries are further optimized for efficiency. The Object Model Engine follows these steps.

Step 1. Identify the Dimension fields from the set. A "select distinct" query using these dimensions defines the Level of Detail for the Object Model Query Result. Find the minimal sub-tree in the Object Model that includes these dimension fields, and identify the root of that subtree. (If there is no subtree, then this is not a valid perspective for the fields.) The Dimension Query Tree is the sub-tree that contains all of the Dimensions. Next, form a sub-query that SELECTs these Dimensions over the Dimension Query Tree. Because this uses INNER JOINs, the Domain will be only those rows where every Dimension has a non-NULL value. Some implementations use UNIONs to bring in rows with empty columns. Finally, apply Dimension Filters if there are any.

Step 2. For each aggregated Measure, add the primary key of the Measure's object to the Dimensions identified in Step 1. Find the minimal subtree of these fields, as in Step 1. For calculations that include only scalar fields, treat those fields the same way. For calculations that are using only aggregated fields, treat those fields as aggregated measures (except for the final aggregation applied to aggregated measures). Execute a Distinct sub-query against these fields and the (non-aggregated) measure itself. This gives a result set in which each Measure record is replicated/copied/included at the level of detail (LOD) of the overall query. Evaluate the calculations, treating the result as another aggregated Measure for the rest of the query. Next, remove the primary key of the Measure's object from the query, and create a sub-query aggregating over the Measure's aggregation function, grouping by the remaining Dimensions. This gives a result set with a key consisting of the Dimensions and another field with the Measure aggregated distinctly to the LOD of these Dimensions. Evaluate the result of calculations with only aggregated fields. These evaluations should result in new aggregated Measure fields for the rest of the query.

Step 3. JOIN the Measure sub-queries together ON the Dimensions. When the Domain query includes empty facts, these JOINs can be partial OUTER JOINs to preserve the Domain from Step 1. Finally, apply Measure filters to the result of this query.

This approach defines a query where the result set has these properties:

The set of Dimensions makes a multi-column key for the result set. This set defines the Domain of the result and establishes which rows will be in the result set.

Each aggregated Measure is aggregated in isolation, exactly to the level of detail of the Domain. Measures that have moved to the left are replicated to the LOD. Measures that have moved to the right are aggregated.

Filters and Calculations become artifacts in the produced AQL Model. In general, they will be placed in the tree with the object that defines the right level of detail for the effect. The Object Model Query process does not change the order of execution of calculations or filters. That is handled by the AQL execution pipeline.

Snowflakes and trees are common examples of object models. In the Object Model, objects are the basic building blocks. To be an object, a subquery on the data source is:

Normalized with respect to the measures in the query. Each row represents different measurements for all of the fields that are used as measures in the Viz. Note that normalization of the dimension fields is not necessary.

If the object is at the root of an Object Model tree, no foreign key can refer to it. In these cases, the object may not need to have a primary key for the purposes of this query process.

The basic task of authoring an Object Model is to connect the objects in the Data Source into one (possibly among many) tree (along the Dimensions), where the edges are many-to-one relationships between the objects. A tree-like join graph ensures that the query will be unambiguous. Many-to-one relationships ensure that there will not be measure duplication in the node objects of the join tree.

A Snowflake is a special case of a tree where all of the measures are in the root object. These are particularly easy to transform in the Object Model, as no special care for aggregation functions needs to be handled. The Object Model does not change the semantics of queries on these data sets, but it is frequently more efficient.

Figure 20A:
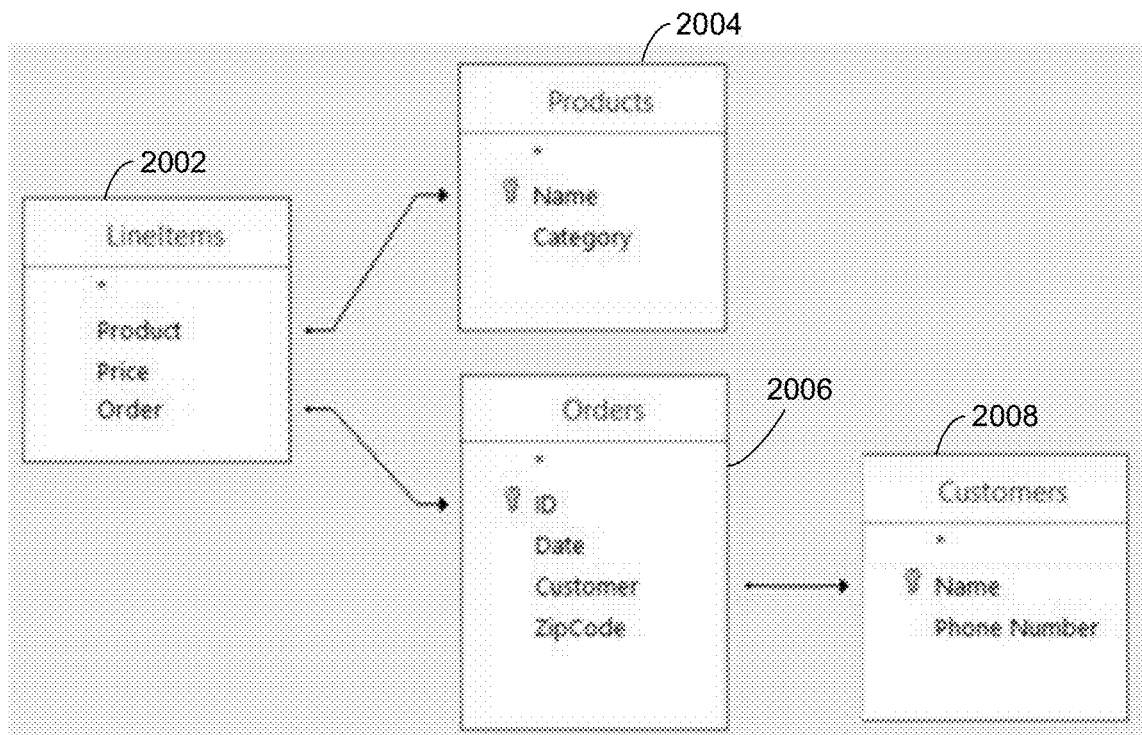
Figure 20B:
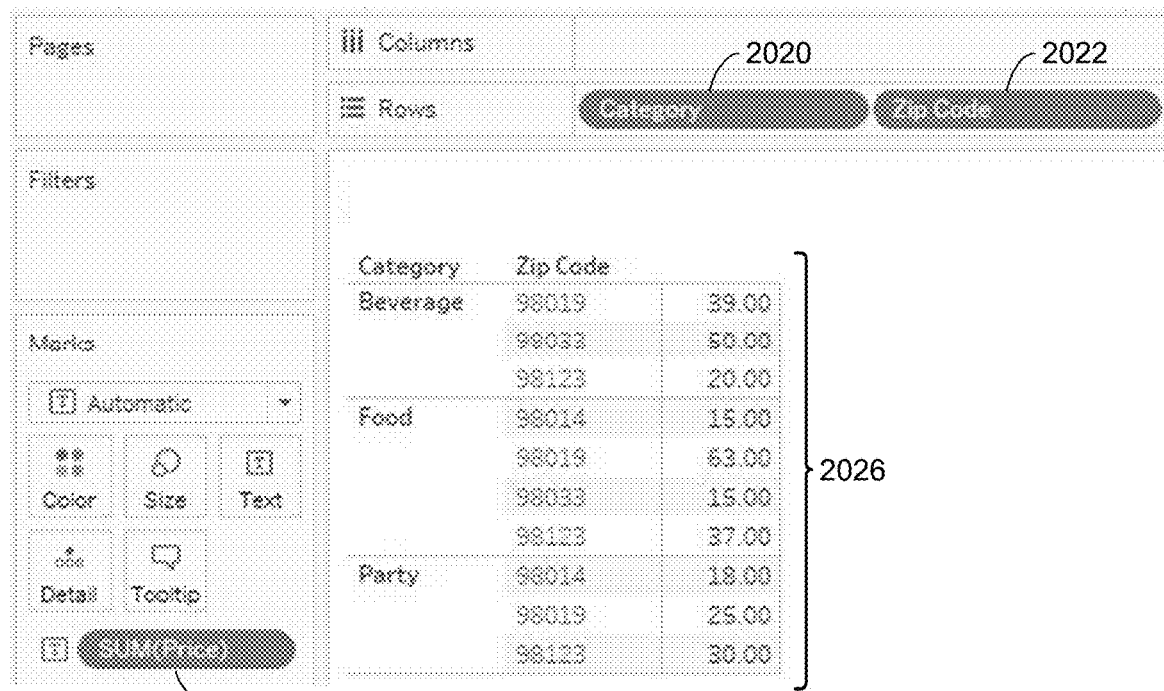

FIGS. 20A-20F provide a Snowflake example that can be used in tracking sales. FIG. 20A shows the relevant database tables LineItems 2002, Products 2004, Orders 2006, and Customers 2004. If a data analyst creates a Viz to total prices by Product Category and Order ZipCode, the process joins information from the LineItems 2002, Products 2004, and Orders 2006 tables. As shown in FIG. 20B, the user has placed the data fields category 2020 and ZipCode 2022 on the Rows shelf, and the SUM(price) 2024 is designated as a text field. This creates a text table 2026, and uses a query like the one shown in FIG. 20C.

Even though the query in FIG. 20C is accurate and efficient, it is instructive to apply the Object Model transformations. Step 1 of the Object Model Engine isolates the keys that will used to index the query results, as illustrated in FIG. 20D. This creates a distinct row for each unique combination of product Category and order ZipCode. Step 2 of the process aggregates the measure (Price) against the keys as illustrated in FIG. 20E. This computed a distinct value SUM(LineItems.Price) for each distinct combination of Category and ZipCode.

Finally, in Step 3, the Object Model engine joins the two results together, as illustrated by the query in FIG. 20F. This new query does not change the semantics of the query. In some instances, this new query allows for more efficient filtering and handling "show empty fields" cases. The Query Pipeline can optimize this query into something similar to the class query or better, especially since it has the Object Model information.

Figure 21A:
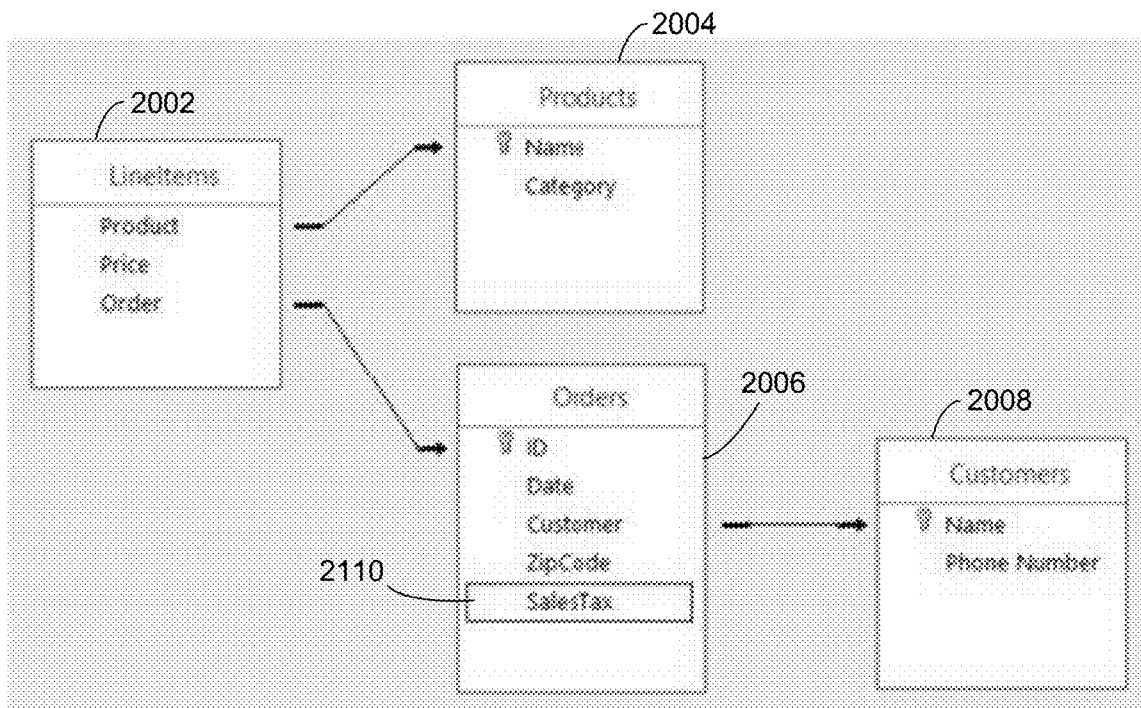

FIGS. 21A-21I extend the previous example to a tree that is not a snowflake. As shown in FIG. 21A, the schema now includes SalesTax 21110 in the Orders table 2006. Note that this is the logical location for the SalesTax 2110 because the sales tax is computed once per order.

Figure 21B:
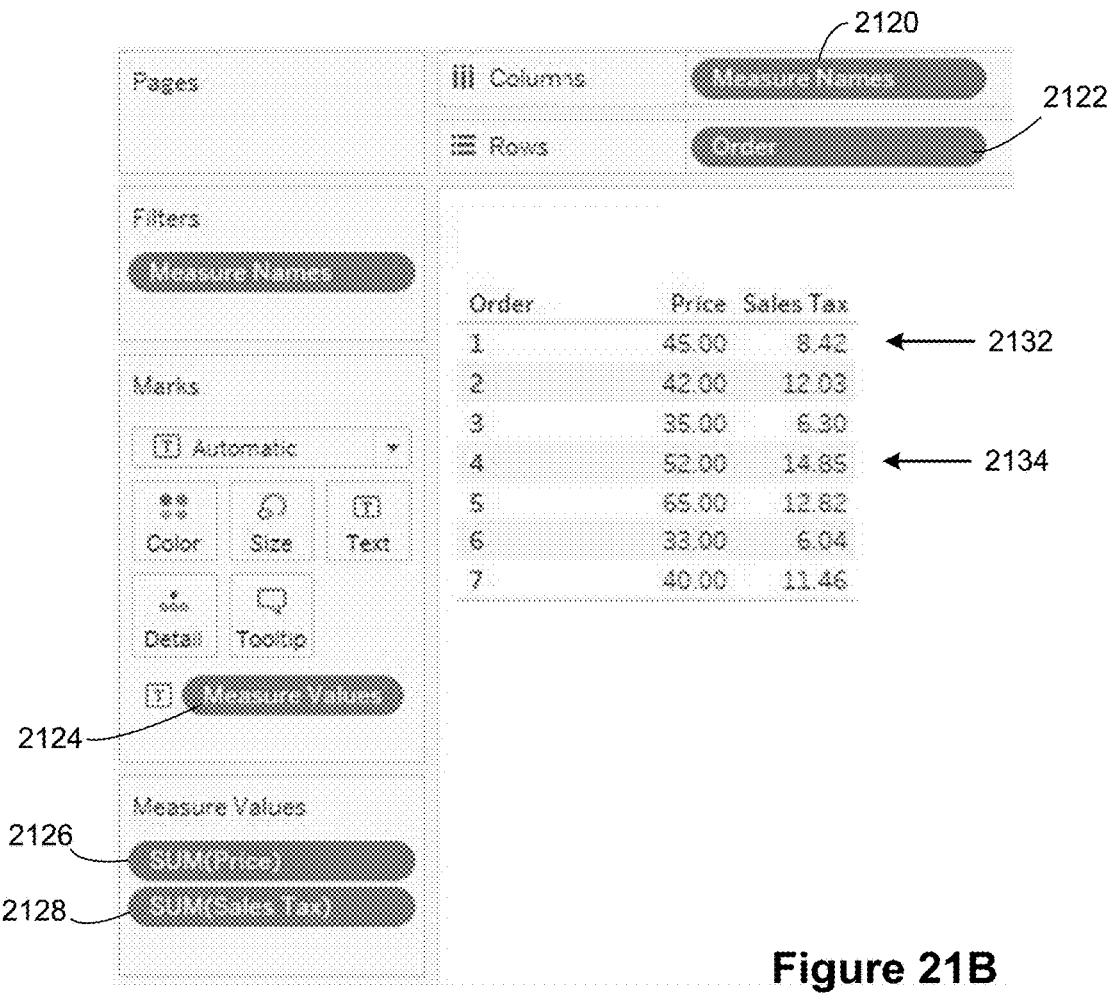

As shown in FIG. 21B, the user has placed the two measures SUM(Price) 2126 and SUM(Sales Tax) 2128 into the Measure Values, and the Measure Values 2124 have been assigned to Text encoding. In addition, the user has placed the data field Order 2122 on the Rows shelf and the Measure Names field 2120 on the columns shelf. It is useful to look at the data for rows 2132 and 2134 in the data visualization created using a typical query as shown in FIG. 21D. Although the price totals are correct, the Sales Tax amounts are overstated. The queried data is shown in FIG. 21C. Because it sums both the Price and the SalesTax fields at the Order level, the Sales Tax is duplicated on each order whenever there is more than one line item.

It is useful to see how the steps of the Object Model engine resolve this issue. Step 1 of the Object Model Engine uses the simple query shown in FIG. 21E, giving a separate row for each Order.ID. Because there are two measures, there are queries in Step 2. Retrieving the Price information uses the query in FIG. 21F, and the Sales Tax information uses the query in FIG. 21G. In both cases, they correctly compute the aggregate value at the proper LOD (i.e., by Order.ID).

Step 3 joins these three subqueries together, getting the different levels of detail right for the two measures, as illustrated in FIG. 21H. Note that this uses a partial outer join to keep all of the orders in the Viz, even those with no line items.

FIGS. 22A-22I illustrate having Measures and Dimensions in Different Branches of a tree, and demonstrate the need for the more complex implementation provided by the Object Model engine. FIG. 22A shows a small portion of a database schema for movies and actors, and the relationships between them, including an Actors table 2206, a Movies table 2204, and an Appearances table 2202. Note that the relationship between actors and movies is Many-to-Many. In addition, a single actor can appear in multiple roles within a single movie. The Appearances table 2202 is thus used to account for the complex relationship between Movies 2204 and Actors 2206. A simple join of these tables produces the result set shown in FIG. 22B. (The actual dollar amounts have been replaced with smaller round numbers to simplify the presentations.)

From this simple database of Movies and Actors, a person might ask how much the movies that an actor has appeared in have grossed, using this Viz shown in FIG. 22C. Here, the user has placed the data field FullName 2222 on the Rows shelf and placed the data field SUM(Gross) 2224 on the text encoding icon. Note that there is some double counting for each actor, as shown in the graphic 2226: Peter Sellers was actually only in two movies, for a total gross of $2,000, and John Rhys-Davies was in three movies, for a total gross of $3,000. These incorrect results were generated by a typical query, as shown in FIG. 22D.

With the Object Model, on the other hand, the process proceeds in the usual way. Step 1 of the Object Model process generates a list of distinct actors, as shown in FIG. 22E. In Step 2, the process first determines gross at a level of detail defined by both the Actor's FullName and the Movie.ID (which is more granular than the level of detail of the Viz). This is illustrated in FIG. 22F. Next, the intermediate table is aggregated at the LOD of the Viz, as illustrated in FIG. 22G.

Finally, Step 3 combines the two queries as expected, this time using an INNER JOIN to get only the actors who have been in movies. The query to combine the results is shown in FIG. 22H. The resulting visualization is shown in FIG. 22I. As seen here, the visualization 2236 has the correct data.

Calculated fields in a Viz can be treated similarly to other fields, even if the source data for the calculation are not all drawn from a single object. When the calculations are based on a single object, they are collected at the appropriate Level of Detail and calculated at that level, then aggregated up in the usual way.

When calculations use fields from different objects, there are two cases:

Non-aggregated fields treated as scalars are replicated/copied/included to a single LoD. The Object Model engine establishes an LOD for all of these scalars at the root of the sub-tree that includes them, if possible.

Aggregate functions in calculations are aggregated at the LOD of the Viz, as aggregation functions on a Measure would be.

Figure 23:
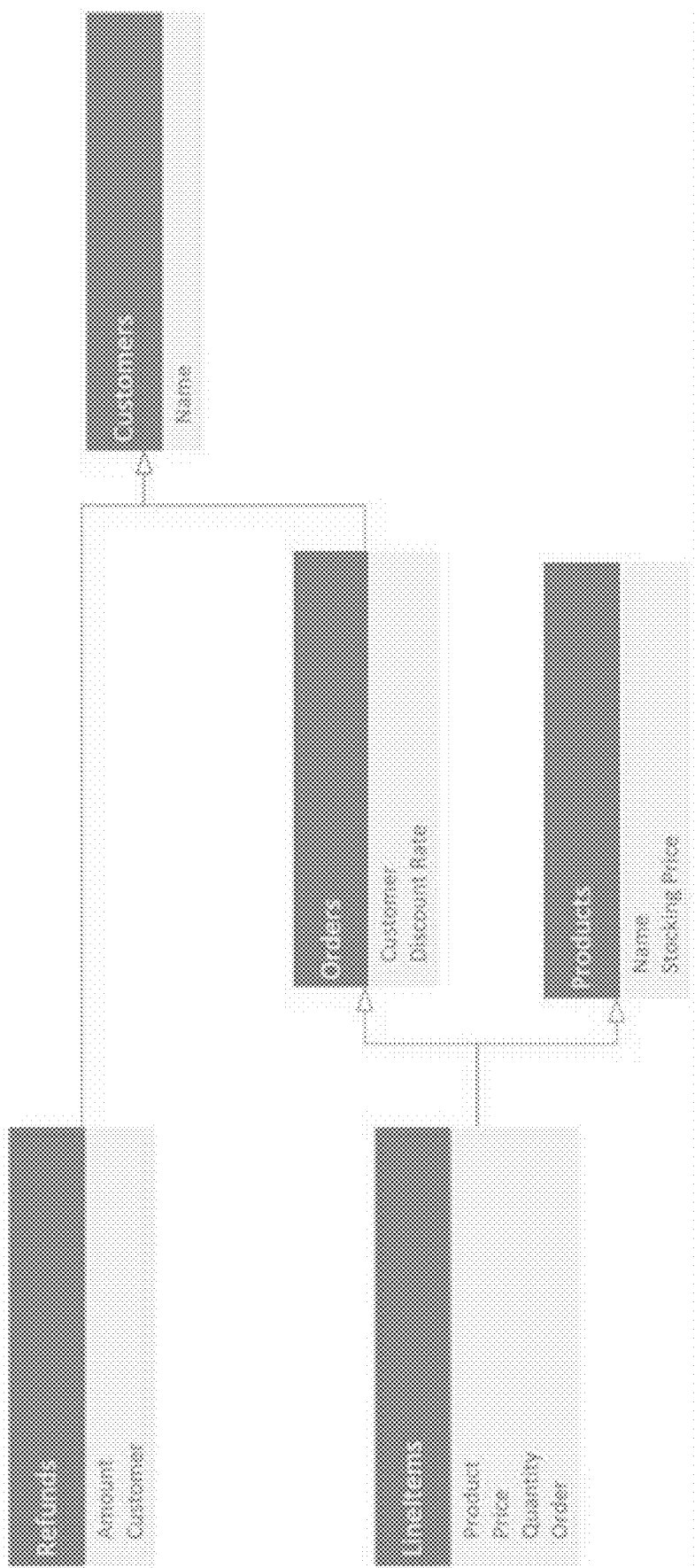
FIG. 23 provides a simple model for line items and orders according to some implementations.

Consider a simple Line Items/Orders model as illustrated in FIG. 23. The calculation of Extension=[Price]*[Quantity] is calculated at the LOD of the LineItems table. It acts just like another field available on that table.

Now, if each Customer has a Discount Rate that can be applied to his or her purchase, the calculation: Discounted Extension=([Price]*[Quantity])*(1−[Discount Rate]) makes sense at the LOD of the LineItems table as well. In general, the unaggregated fields are collected to the root of the sub-tree that contains them for the calculation. In this way, even a complicated calculation such as Line Item Profit= (([Price]*(1−[Discount Rate])−[Stocking Price])*[Quantity] is calculated at the LOD of LineItems, which is "correct." Note that some simple calculations that cannot be connected by a sub-tree in the Object Model don't make sense in the Object Model Engine. For example, consider Net Sales= [Refunds.Amount]−[Discounted Extension]. There is no LOD where this calculation is useful.

Calculations are often aggregated within the Viz definition. In these cases, the Object Model treats them as measures at the LOD of their common sub-tree root, and aggregates them according to the Viz LOD.

Aggregated calculations (where all measures in the calculation are aggregated) are calculated at the LOD of the Viz as well. Consider two calculations: Extension=[Price]* [Quantity] and SumOfExtension=Sum([Extension]). The two Measure pills, SUM(Extension) and AGGR(SumOfExtension) give the same results in any particular Viz.

For calculations that combine aggregations and scalars, the Object Model engine processes them in steps. First, the scalars are collected to the appropriate LOD, then the aggregations are aggregated to that same LOD. The calculations can be performed at that LOD. Any additional aggregations from the Viz are done at that point. For example, in the expression Discounted Extension=Sum ([Price]*[Quantity])*(1−[Discount Rate]), the [Discounted Extension] is calculated at the LOD of [Discount Rate], which is in the Orders object.

Many calculations involve If-Then statements, such as this calculation involving a parameter:

```
Sale Extension = IF ([Sale Discount] > [Discount Rate]) THEN
    ([Price] * [Quantity]) * (1 − [Sale Discount])
ELSE
    ([Price] * [Quantity]) * (1 − [Discount Rate])
END
```

Parameters don't belong to any Object, and are constants for any LOD. This calculation would have an LOD at the LineItems Object. It is necessary that both branches of the IF-THEN-ELSE statement have the same LOD, so that this calculation can be analyzed independently of the specific data.

Because the object model usually consists of INNER JOINs, filters can be applied at the object level, directly in the subquery for that object. This results in an efficient query with no semantic change over the previous models.

Some implementations give the user a "Show All Records" choice on a per-object level. This has an effect on the Domain of the Dimensions established in the first part of the Query. Originally the Dimension query was specified as if using INNER JOINs, which do not allow for rows with missing links. One solution is to use a combination of LEFT and RIGHT JOINs. Consider the schema shown in FIG. 20A.

Suppose the user has requested to Show All Records for the Customers Object. Some implementations add the extra Customers to the initial Dimension Domain query with a UNION.

These implementations then RIGHT JOIN it into Orders, and then into LineItems to start creating the domain that includes all Customers. In some implementations, the query is separated into sub-queries to avoid ambiguity. If the Customers object has a many-to-one relationship with any other objects, each part of the Perspective is captured in a sub-query, then another sub-query can be created to LEFT JOIN the Customers object to these. A nesting of RIGHT JOIN sub-queries up to the LOD of the Dimension Domain is then applied. Every other sub-tree is collected into its own sub-query, with a RIGHT JOIN from the original spine to the new sub-query. This provides an unambiguous overall query that promotes all of the Dimensions from the Customers Object to the domain of the query. An alternative approach to composition uses a JOIN to sub-queries with show-all objects in each via a FULL OUTER JOIN.

The Object Model engine improves the ability to get correct aggregation calculations without spurious duplication of measure data. This works by using the shape of the data (including the many-to-one relationships between tables) to control replication and deduplication in semantically correct ways. The query created by the Object Model engine is broken up into the components that first replicate the necessary data to a single table, then de-duplicate it (i.e., remove the spurious duplication) prior to the aggregation of the measures.

Figure 24A:
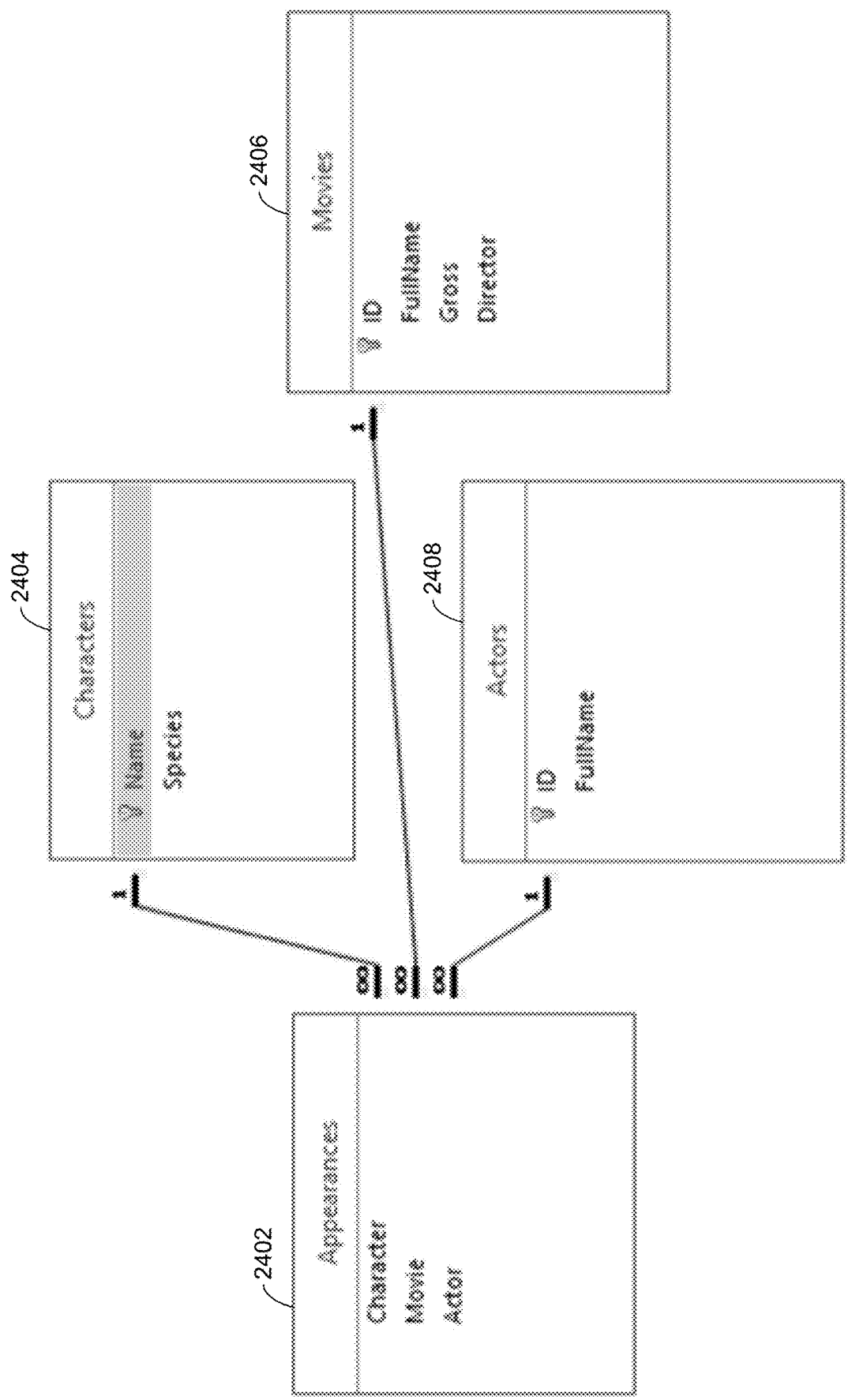

FIG. 24A shows the shape of an example data source. This data source tracks the Actors 2408 who play the Characters 2404 in Movies 2406. These pieces of data are all connected by the Appearances 2402, which is an instance of a specific actor playing a specific character in a specific movie. There is a lot of chance for duplication in this data source because Actors play in many Movies, and Movies have many Actors. In addition, the same Actor may play more than one Character within a single Movie.

Figure 24B:
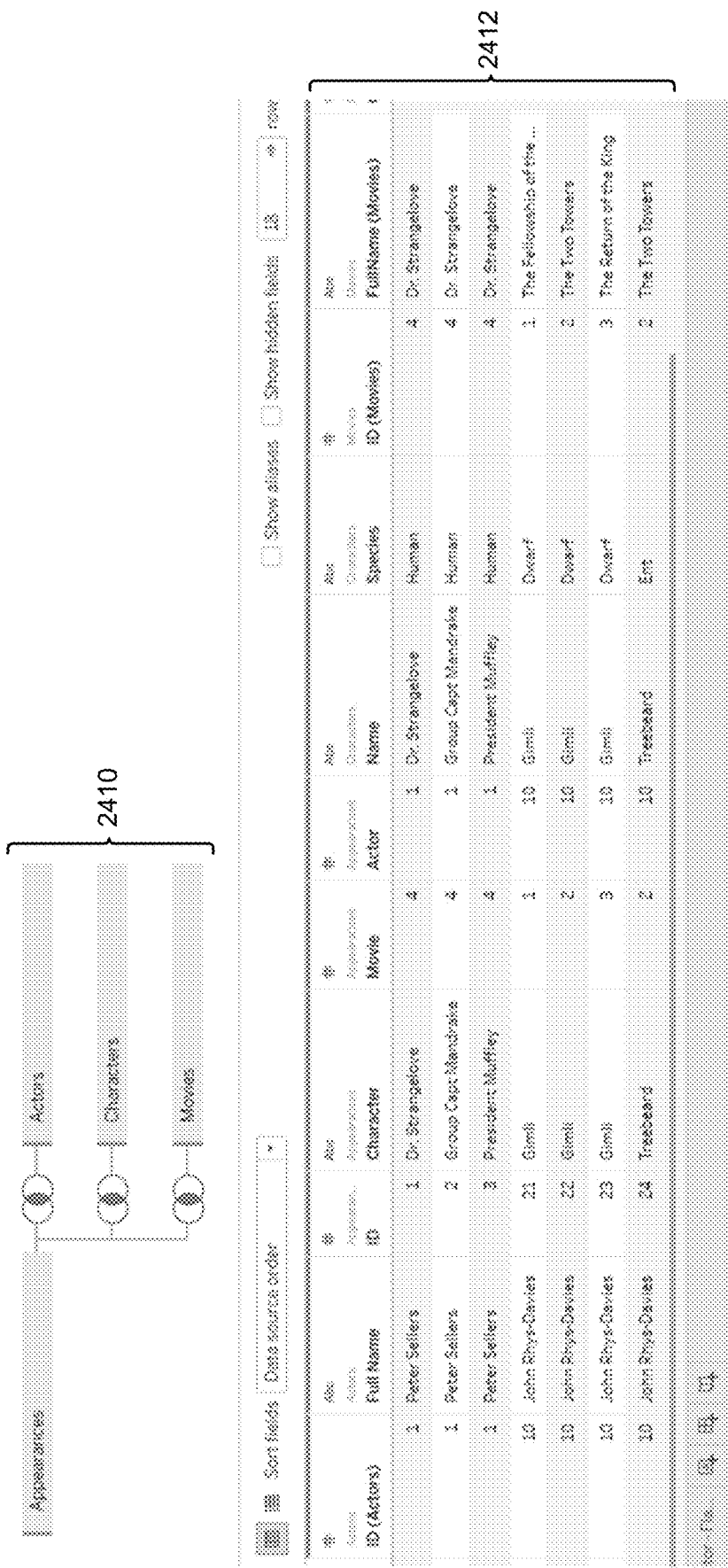

Joining these four tables together would produce a flat set of rows, as illustrated in FIG. 24B. Suppose that a user wants to create a Viz showing how many Actors each director has worked with. Note that a single Actor may have multiple roles and/or movies with each director. Looking at the director Peter Jackson, we should see that he has directed four actors across four movies (within this limited sample). However, FIG. 24C shows that there are ten rows 2420 where Peter Jackson is paired with an actor. The data visualization in FIG. 24D shows a bar 2422 corresponding to 10 actors, which is overstated. In this visualization, there is duplication both between Movies (e.g., Liv Tyler in Peter Jackson movies) and within Movies (e.g., John Rhys-Davies as Gimli and Treebeard). The query based on the flattened table has counted the same data multiple times.

Figure 24E:
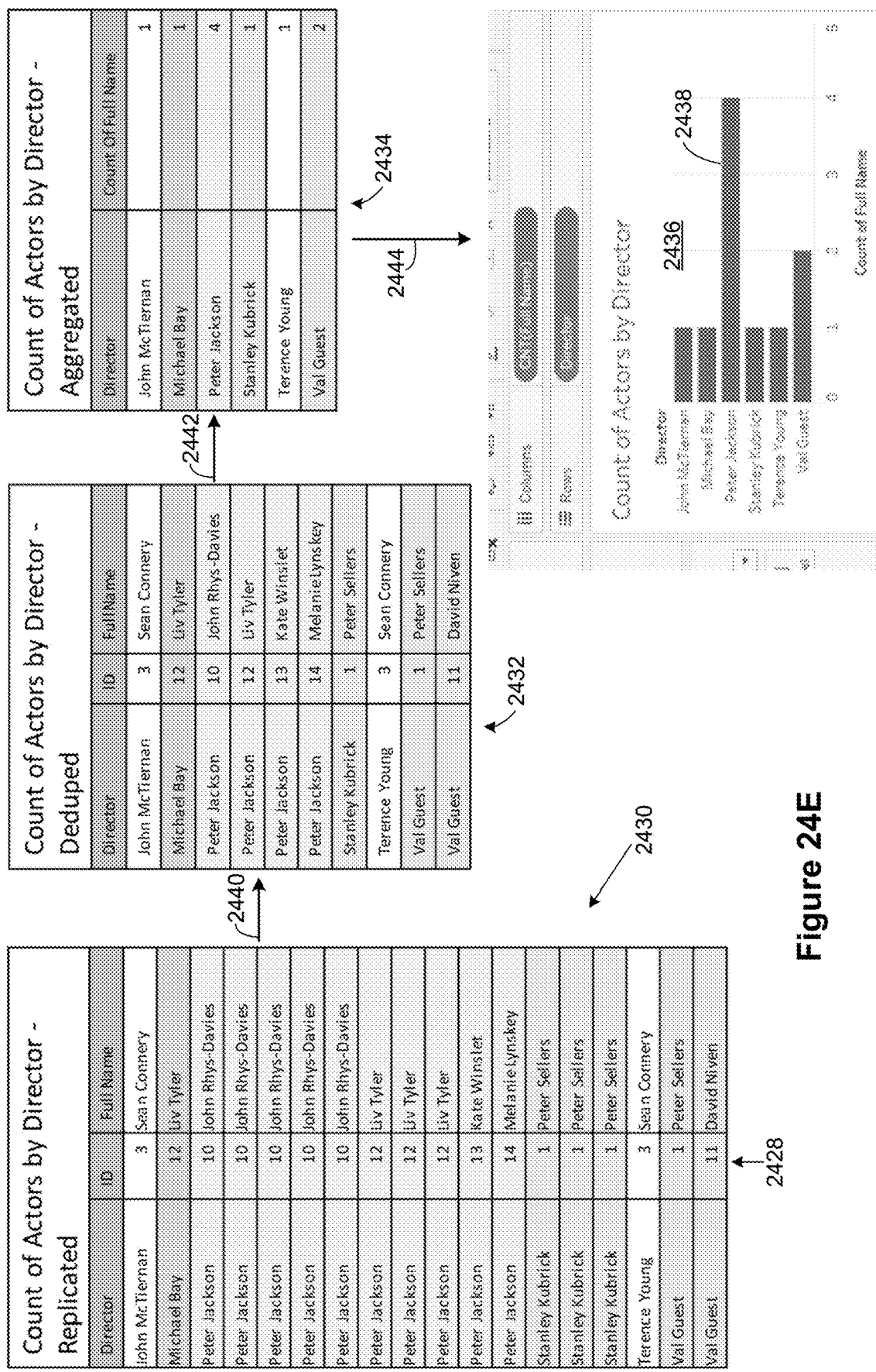

FIG. 24E illustrates using the Object Model engine on the same data source to compute the correct results. For the Object Model query, the primary key 2428 of the Actors Object 2408 is added to the SELECTION of Director and Actors.FullName to create the initial director/actor results 2430. This is used in the deduplication step. Note: most Objects (all but the Object at the root of the Object Model tree) have a Primary Key. This is a field (or set of fields taken together) that is guaranteed to be unique within the Object. The Primary key acts as an index to each row in the Object.

Next, grouping (2440) by the Dimensions (Director) and the Primary Key of the measure (Actors.ID) eliminates the duplication to produce a deduped director/actor result set 2432. Each (Director, Actor) pair appears only once in this intermediate table 2432.

The primary key of the measure's Object is guaranteed to be unique, so using this in the grouping produces the proper results (e.g., even if there are multiple actors with the same name). In this example, there are not duplicate Full Names for any of the Actors, but a real data set likely would.

Finally, the data is aggregated (2442) by Director to get a count of Actors per directors in an aggregated result set 2434. The aggregated result set is used to build (2444) the data visualization 2436, which includes a bar 2438 for Peter Jackson, which has the proper count.

FIGS. 25A-25C illustrate using the Object Model engine to produce correct Level of Detail (LOD) calculations. Suppose a user wants to see the total "Star Power" of a Movie. In this example, "Star Power" is approximated for each Actor as the Gross receipts that each Actor's Movies have made. Then the Star Power for a Movie is the Sum of the Star Power for all of the Actors in the Movie. This example uses the data source as shown in FIG. 24A.

A user could calculate the Star Power for each Actor with an LOD calculation as Star Power={FIXED [Actor.Fullname]: Sum([Gross])}. However, to avoid duplication, this LOD calculation should be calculated via the Object Model semantics.

As shown in FIG. 25A, the first step is to join the Movies table 2406, the Appearances table 2402, and the Actors table 2408 to create a first result set 2502. This first result set 2502 has multiple rows 2520 for the actor John Rhys-Davies, including multiple rows for the same movie. Next, the Object Model engine de-duplicates (2515) the rows from the first result set 2502 to create the second result set 2504. In the second result set 2504, there are only three rows 2522 for the actor John Rhys-Davies. In the second result set 2504, an actor is only paired with a movie one time. Finally, the Object Model engine aggregates (2512) the data from the second result set by Actor to compute a SUM(gross) for each Actor in the third result set 2506 (the "Star Power"). This LOD calculation effectively creates a new Object with a primary key of the Target LOD (e.g., FullName) and a Measure of the Aggregation (e.g., Sum(Gross)).

FIG. 25B illustrates joining (2536) the Start Power result set 2506 with a table 2532 that correlates Movies and Actors. This creates a result set 2534 of star power for movies, but has some duplicated rows. In FIG. 25C, the Object Model engine de-duplicates (2550) the intermediate result set 2534 to form a de-duplicated result set 2540. Finally, the Object Model engine aggregates (2552) the de-duplicated result set to compute a start power total for each movie in the final result set 2542.

Figure 26A:
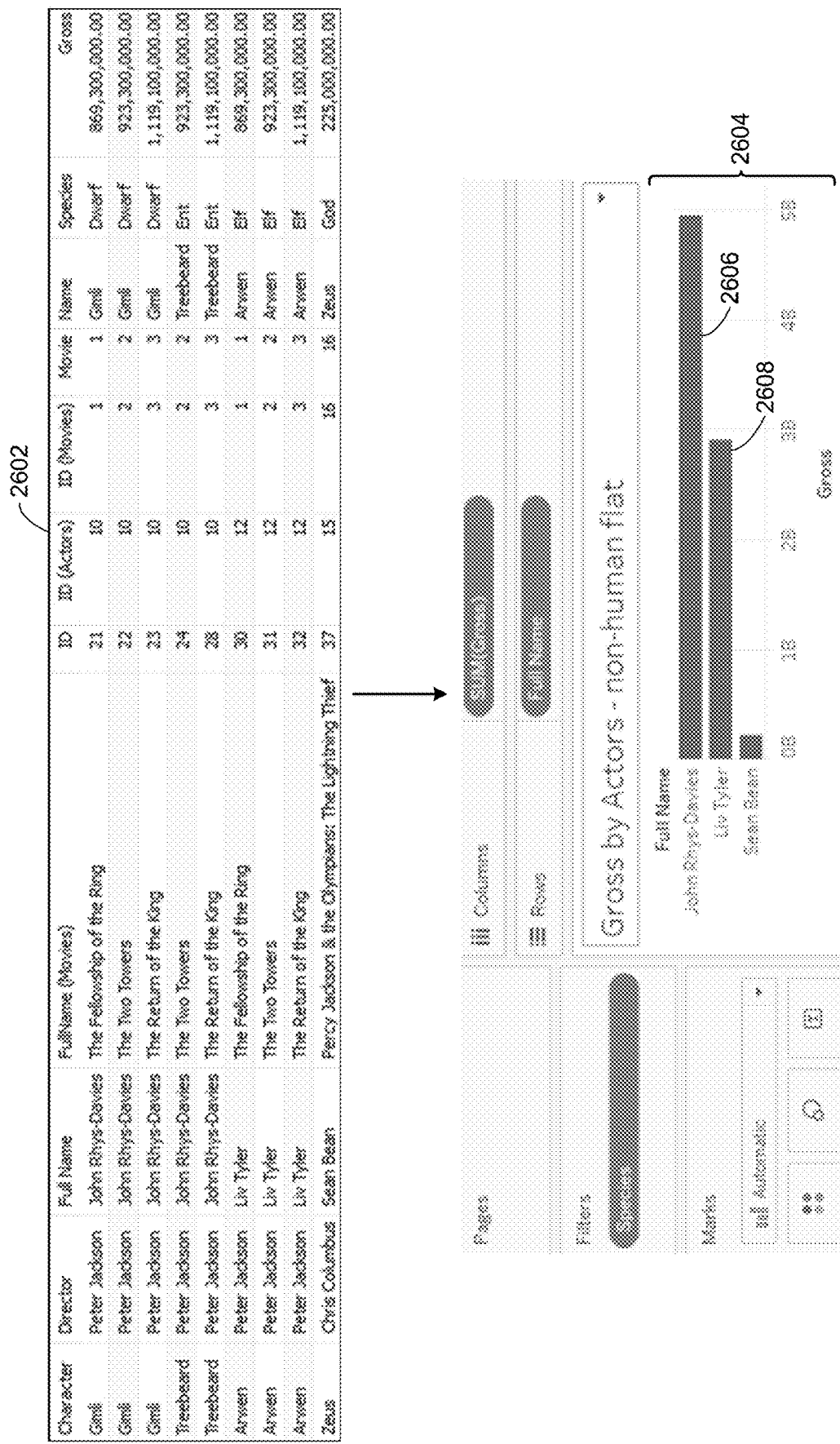

FIGS. 26A-26D illustrate how the Object Model engine accurately handles adding filters to a Viz, and uses the data Object Model shown in FIG. 24A. Suppose a user wants to see the total Gross receipts that each Actor's Movies have made, but only for movies where the Actor played non-human characters. This has the potential to create duplication problems. For example, FIG. 26A illustrates a data visualization 2604 created based on a flattened data set 2602. Using this flattened data set, some of the sums are overstated. For example, John Rhys-Davies and Liv Tyler were both in the same Lord of the Rings movies, but because John Rhys-Davies played multiple non-humans, his amount is larger. This is illustrated by the bars 2606 and 2608 in the data visualization 2604.

Figure 26B:
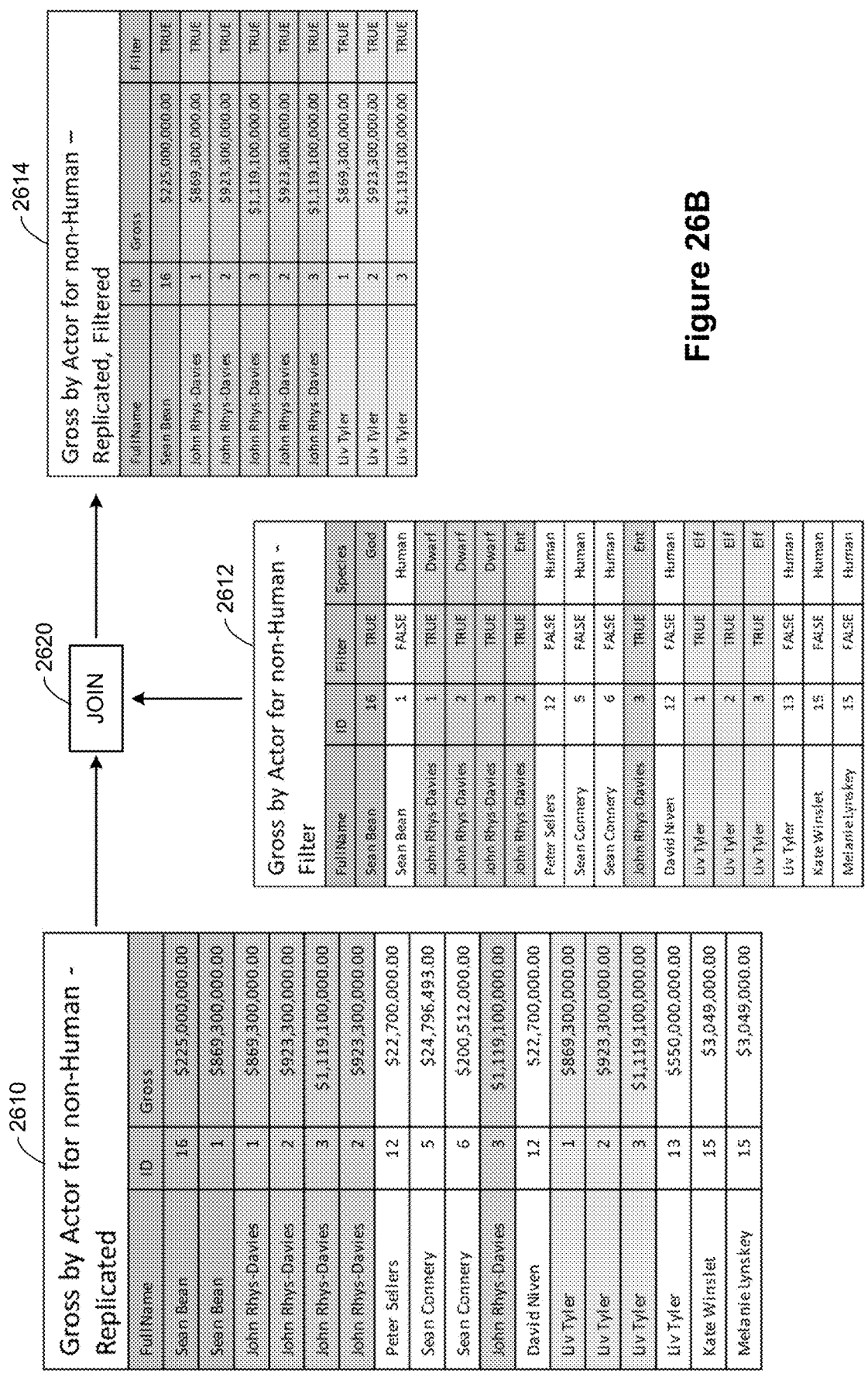

In FIG. 26B, the gross data 2610 for each (Actor, Movie) combination is joined (2620) to filter data 2612 to create a filtered, but duplicated result set 2614. The Object Model engine builds the gross data result set for the measure "Gross," which includes the dimension (Actors.FullName), the measure (Movies.Gross), and the primary key of the measures Object (Movies.ID). The Filter can be thought of as its own query. It uses the same columns that the measure query would use (the Viz dimensions plus the primary key of the measure, which are Actors.FullName and Movies.ID). However, instead of the measure column, the Object Model engine adds the filter calculation (and all of the fields it needs to be calculated). Here, the filter calculation is Species < > "Human," which returns TRUE for Elves, Ents, Swarves, and Gods. The appropriate fields were added to both the Replicated Query and the Filter, they can be joined row for row. The Object Model engine can also JOIN on Filter=TRUE, eliminating rows for Human characters. Note, however, that John Rhys-Davies still has some duplication.

Figure 26C:
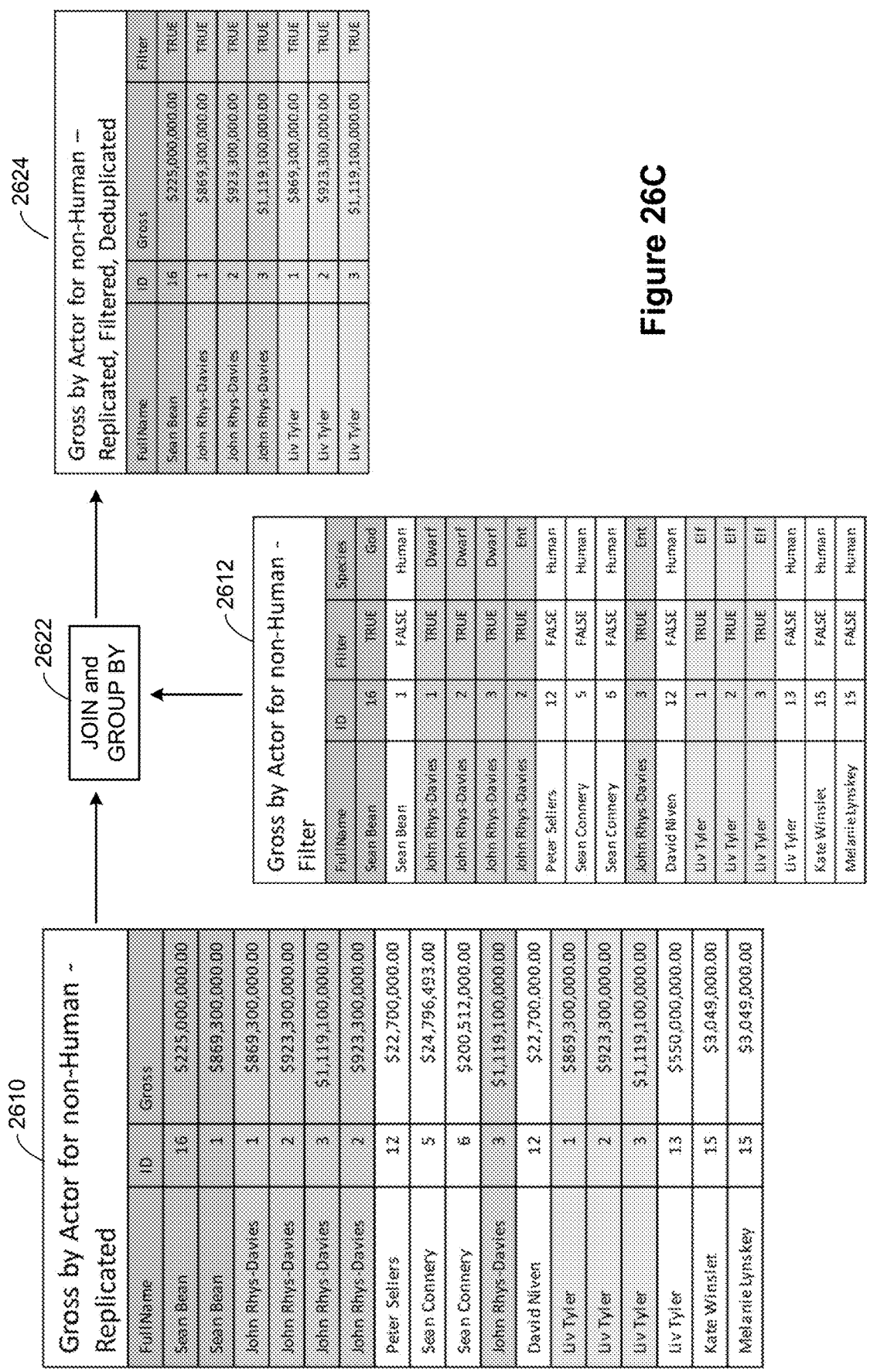

The duplication noticed in the final result set 2614 in FIG. 26B can be eliminated by applying a GROUP BY with the JOIN, as illustrated in FIG. 26C. In FIG. 26C, the JOIN+ GROUP BY operation 2622 produces a final result set 2624 without duplication. The GROUP BY has removed the duplicates. The three Lord of the Rings movies are each counted only once for both Liv Tyler and John Rhys-Davies. (Sean Bean's appearance in The Fellowship of the Ring was removed by the filter before the GROUP BY.) The Aggregation can now be calculated correctly.

Figure 26D:
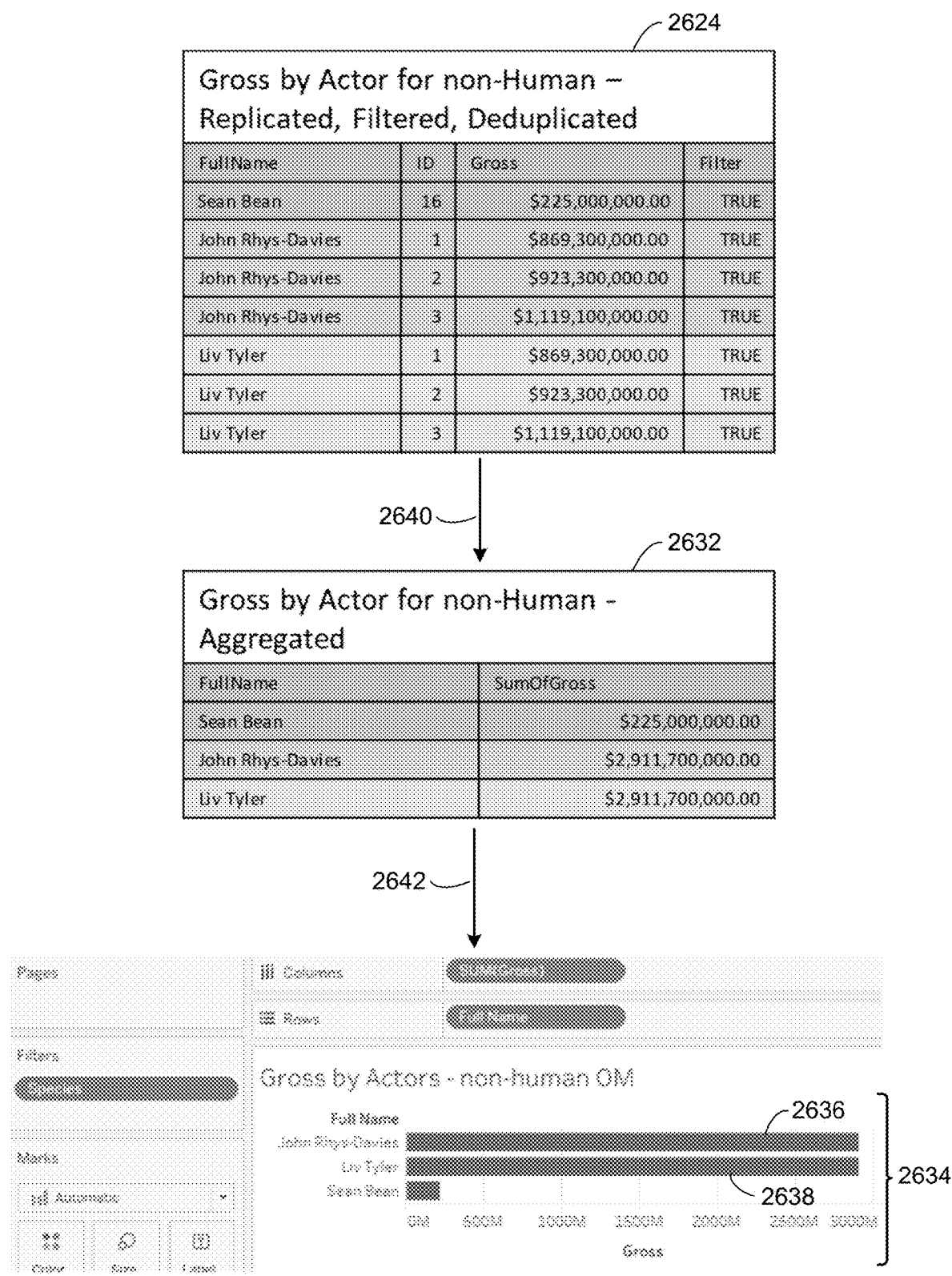

In FIG. 26D, the final result set 2624 from FIG. 26C is aggregated (2640) to form a result set 2632, which is used (2642) in the data visualization 2634. Note that the bars 2636 and 2638 for John Rhys-Davies and Liv Tyler have the same size, as they should be.

Figure 27B:
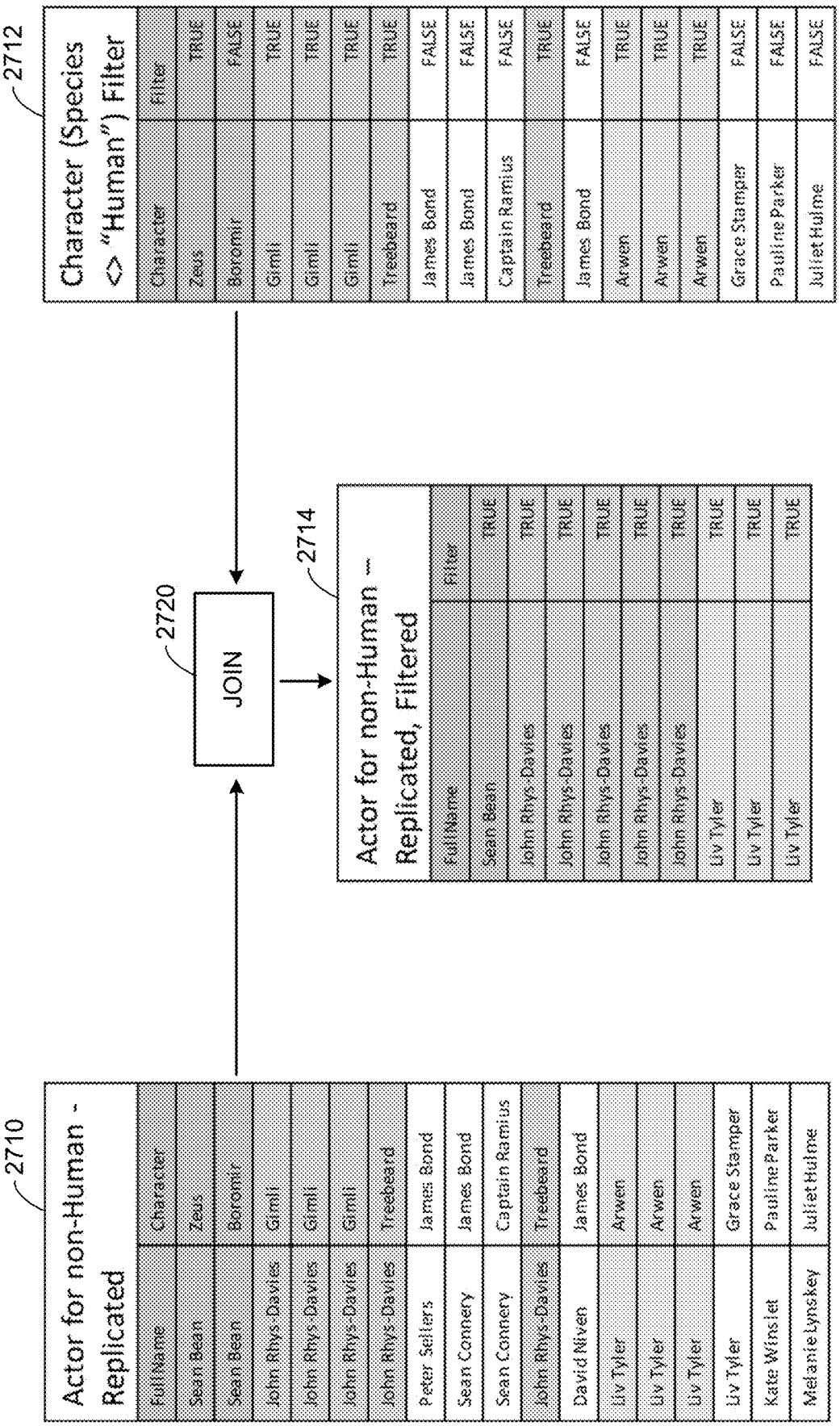
Figure 27C:
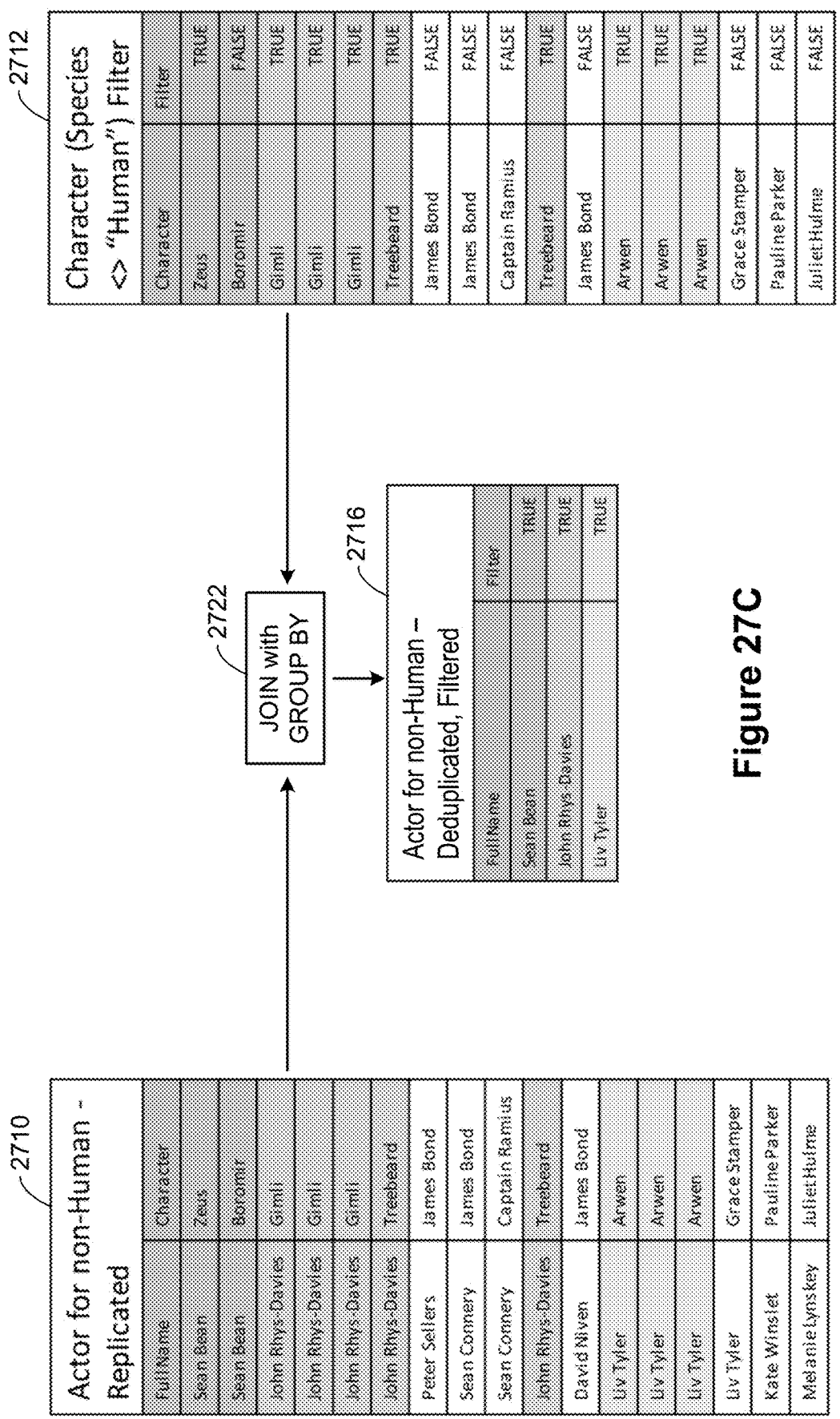

FIGS. 27A-27I provide an additional example of using the Object Model engine to apply a filter. Consider Data-Source filters that might be on Objects or Fields that are not in the metadata that the DataServer exposes. For example, suppose Character is a "hidden" Object and Species < > "Human" is a hidden DataSource filter. The client's Viz is asking for Gross by Actor name. The client doesn't know about the filter on Species < > "Human". If the filter were not applied, the result would be as shown in FIG. 27A. But this clearly includes appearances by Actors appearing as Human. Note that the two objects explicitly mentioned in the Viz are Actors and Movies. We also need to consider the object that joins them together, which is Appearances.

In FIG. 27B, the Object Model engine performs a JOIN 2720 between the replicated non-Human actor table 2710 and the character filter table 2712 to form an intermediate result set 2714 that is filtered, but has replicated data. In FIG. 27B, the same operation is performed, but uses a JOIN with GROUP BY operation 2722 in order to form an intermediate result set 2716 that is filtered and de-duplicated.

Figure 27D:
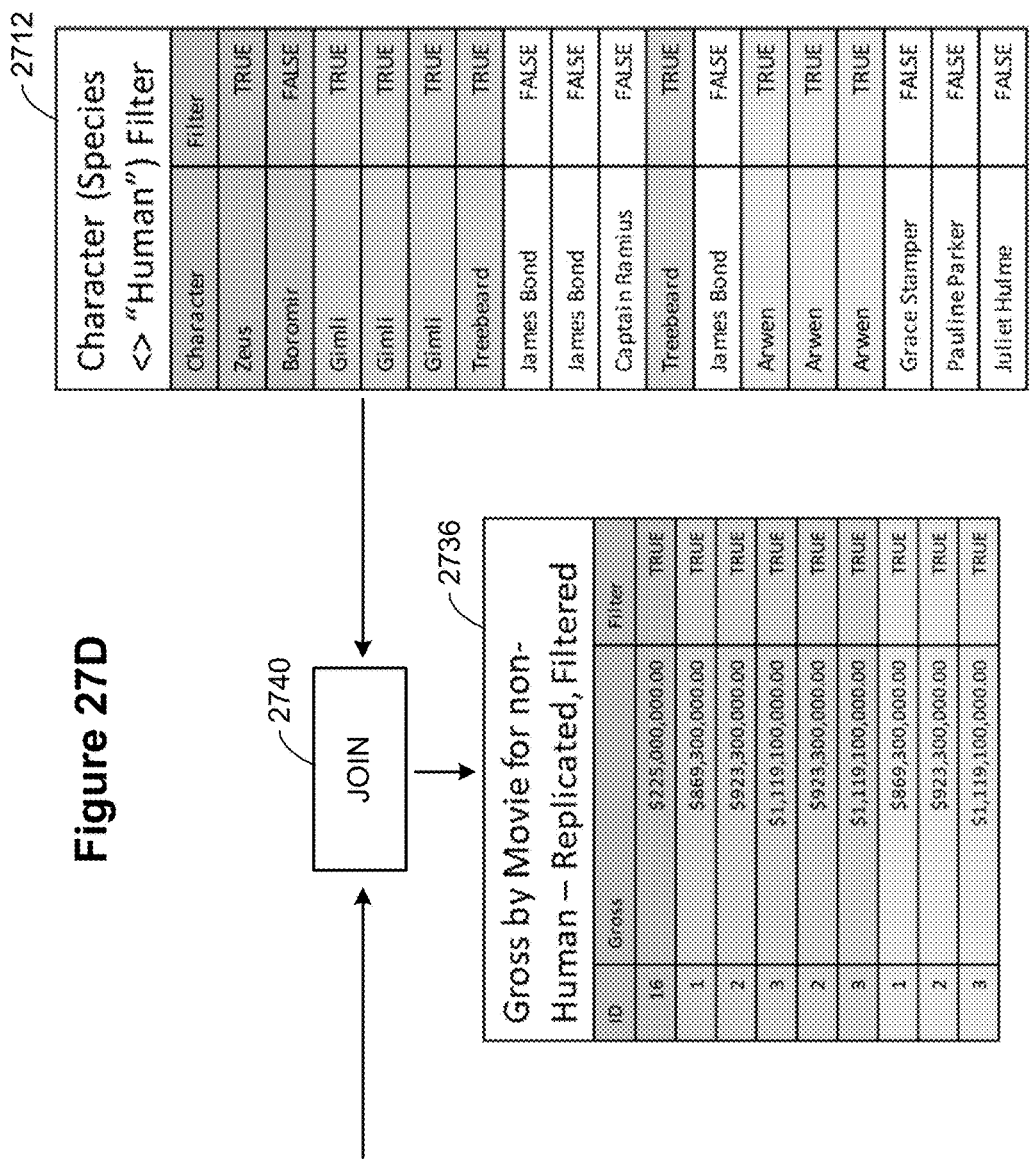
Figure 27E:
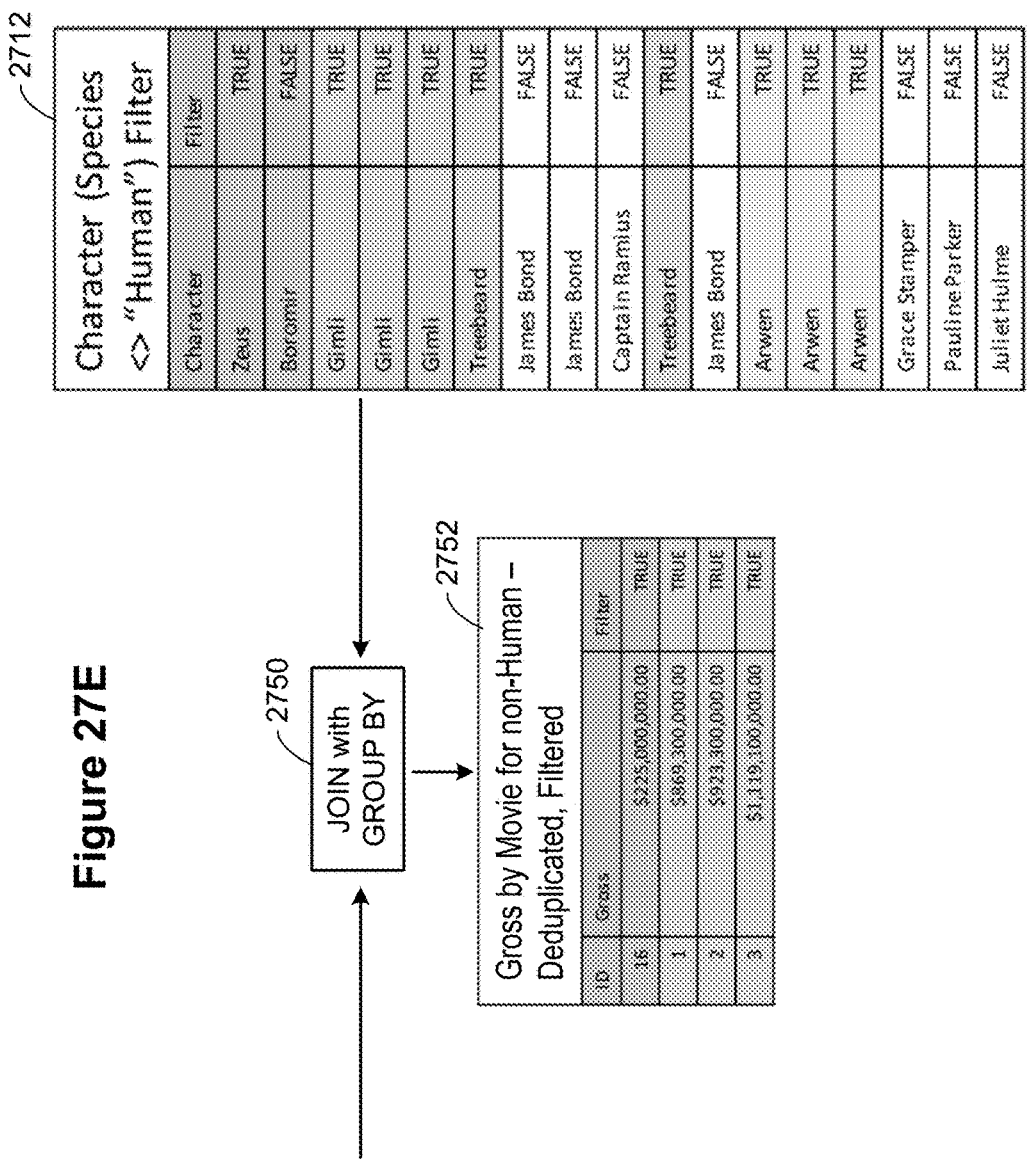

FIG. 27D illustrates applying the filter to the movie result set 2732 by JOINing 2740 the character filter table 2712 to the Movie result set 2732. This produces a movie intermediate result set that is filtered, but has replicated data. As with the Actors query, the duplication can be eliminated by applying a JOIN with GROUP BY 2750, as illustrated in FIG. 27E. This produces an intermediate movie result set 2752 that is both filtered and de-duplicated.

Figure 27F:
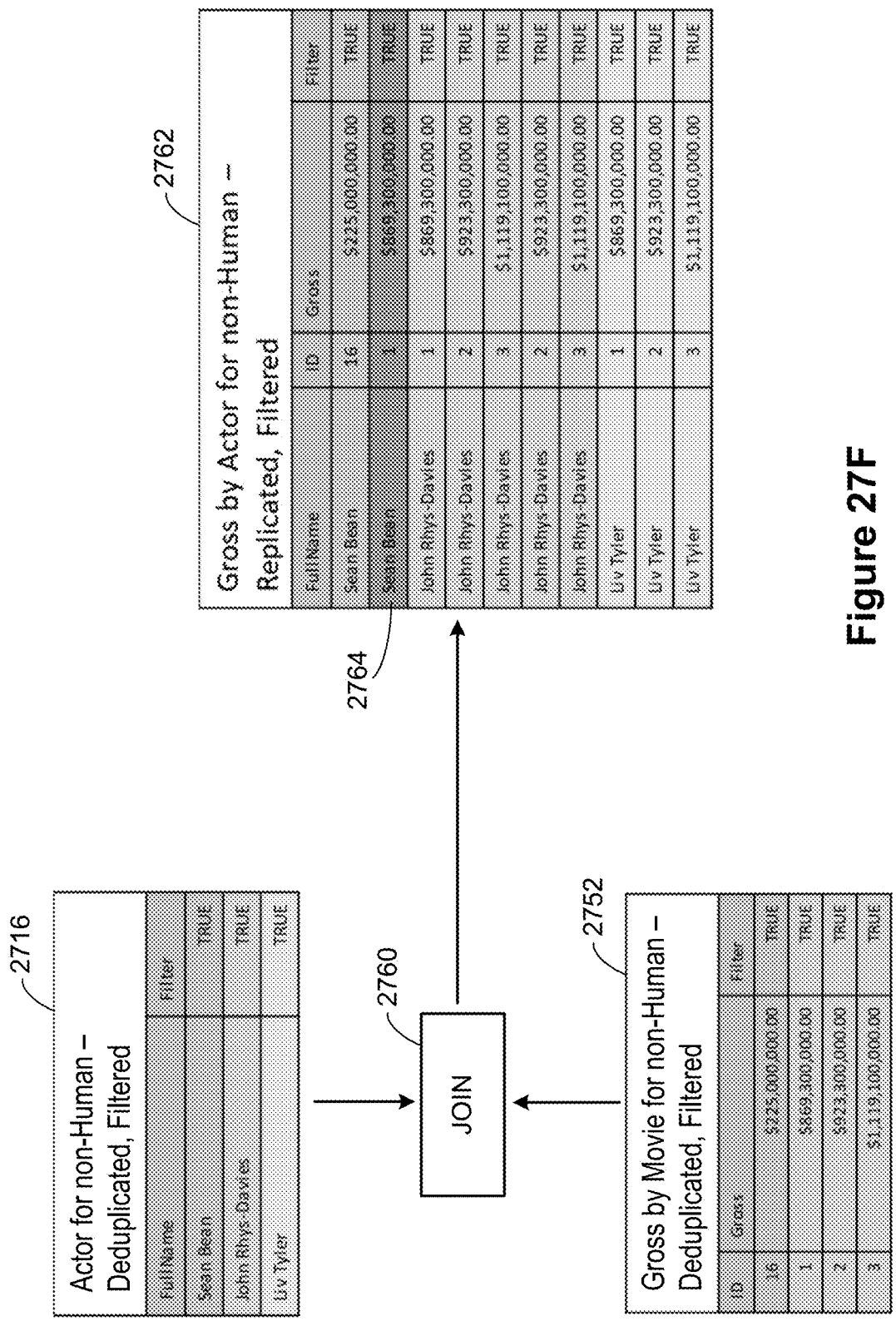

FIG. 27F shows applying a JOIN 2760 to the Actor intermediate result set 2716 and the Movie intermediate result set 2752, which produces a final result set 2762 that is filtered. However, this technique produced an extra row 2764. Separating the Actor and Movie queries has led to a false inclusion of Sean Bean's appearance in The Fellowship of the Ring. He has played a non-Human (Zeus), and The Fellowship of the Ring did have non-Humans, but his appearance in The Fellowship of the Ring was as Boromir, a human.

Figure 27G:
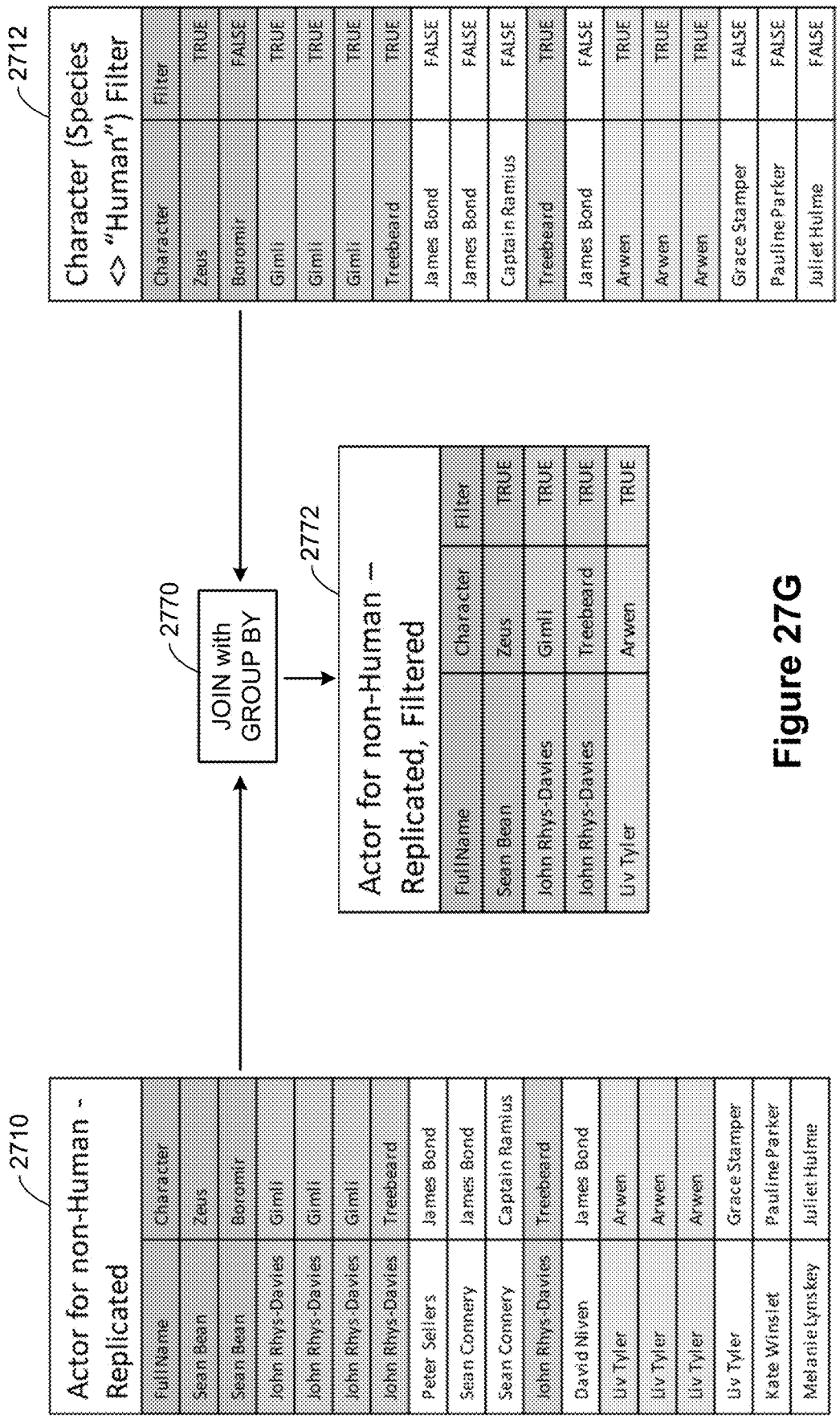
Figure 27H:
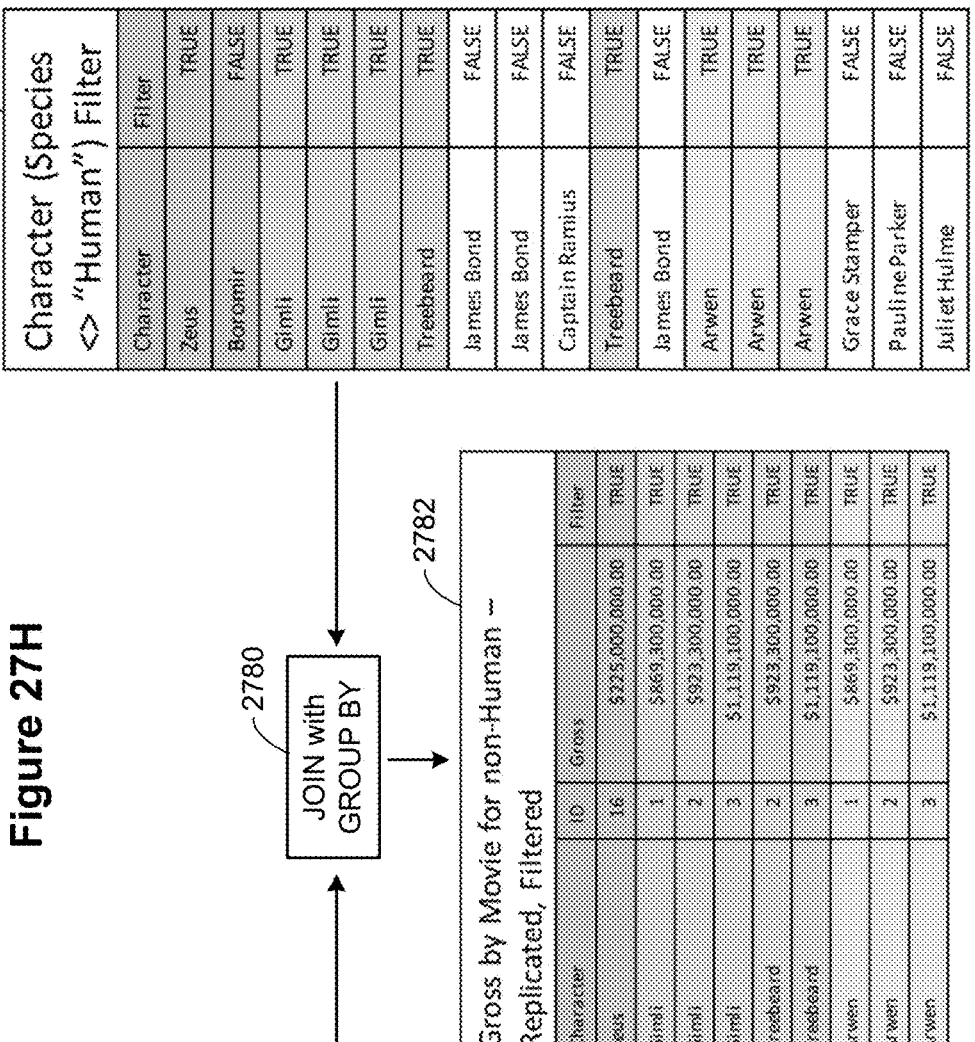
Figure 27I:
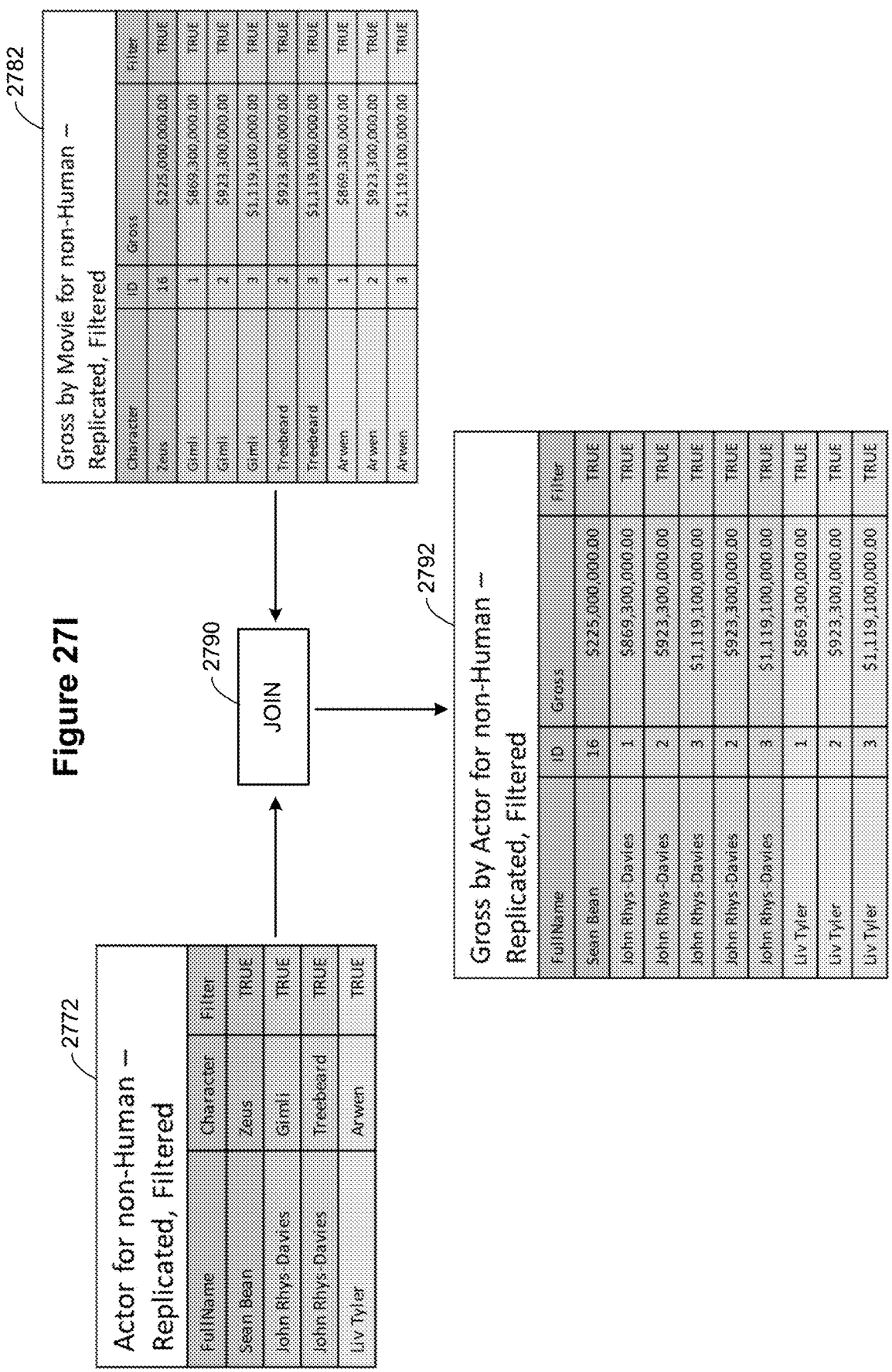

FIGS. 27G-27I illustrate an alternative process used by the Object Model engine to address this issue. In FIG. 27G, the Object Model engine performs a JOIN with GROUP BY 2770 between the character filter table 2712 and an initial table 2710 that has the characters played by each actor. This produces an intermediate result set 2772, which is filtered and has the characters played by each actor. In FIG. 27H, the Object Model engine performs a JOIN with GROUP BY 2780 between the character filter 2712 and a table 2732 that correlates gross with movie characters. This produces an intermediate result set 2782 that is filtered, and correlates Gross with the movie characters.

Finally, in FIG. 27I, the object Model engine applies a JOIN between the filtered actors and the filtered movies (according to the character played), to produce a final correct result set 2792. Note that this result set does not include the extraneous row 2764 seen in the table 2762 in FIG. 27F. Here the JOIN between the two tables included not only information in Appearances, but also on their own Character columns. This eliminated Boromir from the end result.

Mandatory filters are always applied as inner joins to the Viz, whereas optional filters are applied when they are applicable to the Viz (e.g., when a filter is "in" the same sub-tree of the object model as the fields of the Viz). In some implementations, the Object Model engine takes the dimensions and measures of the Viz, finds their Least Common Ancestor in the Object Model, and finds the Least Common Ancestor of all of the fields in the filter. If one of these Objects is a direct ancestor of the other, then the filter is applicable to the Viz. For example, consider the filter Species < > "Human", which is optional. For computing a count of Actors by Director, the filter on Species < > "Human" is applicable. On the other hand, for computing the sum of Gross by Director, the filter on Species < > "Human" is not applicable.

When there are multiple measures, there is the issue of whether they should be coordinated. Some implementations choose a single solution, and others provide the user with a configurable option. For example, A Species filter would remove rows for Directors/Actors combinations where the actor is playing a human.
Should those same rows be removed for Directors/Gross combinations?
If so, then the Gross portion of the Viz will look different from how it would look in a stand-alone Viz.
If not, then the Gross portion and the Actors portion will be considering different movies, and would possibly have different domains.

Figure 28A:
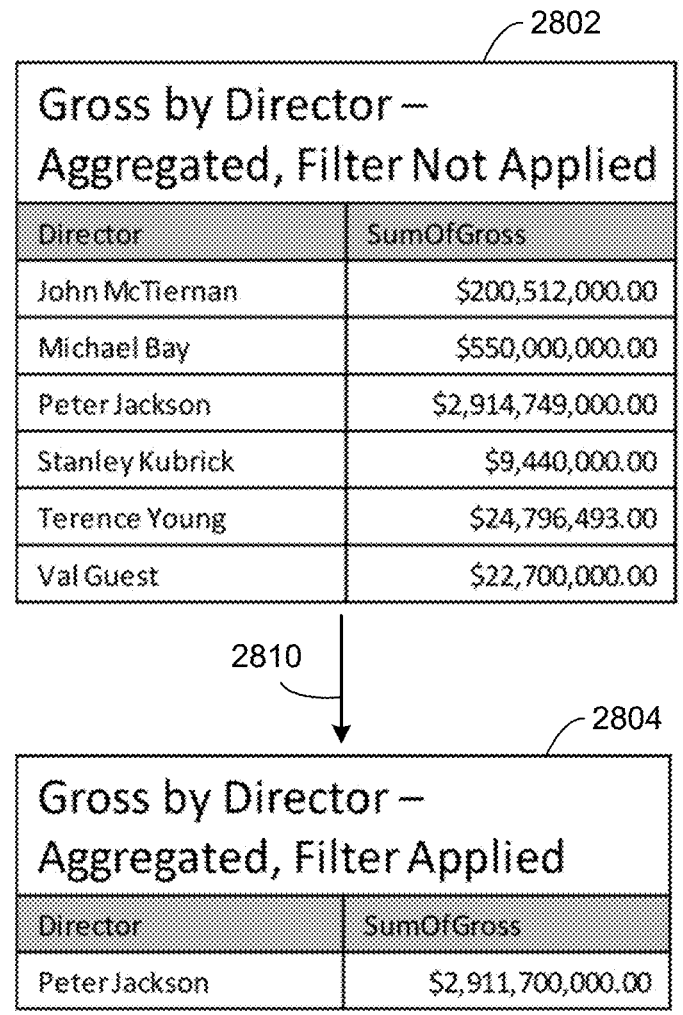
FIGS. 28A-28C illustrate using an object model to apply multiple filters in a data visualization, in accordance with some implementations.
Figure 28B:
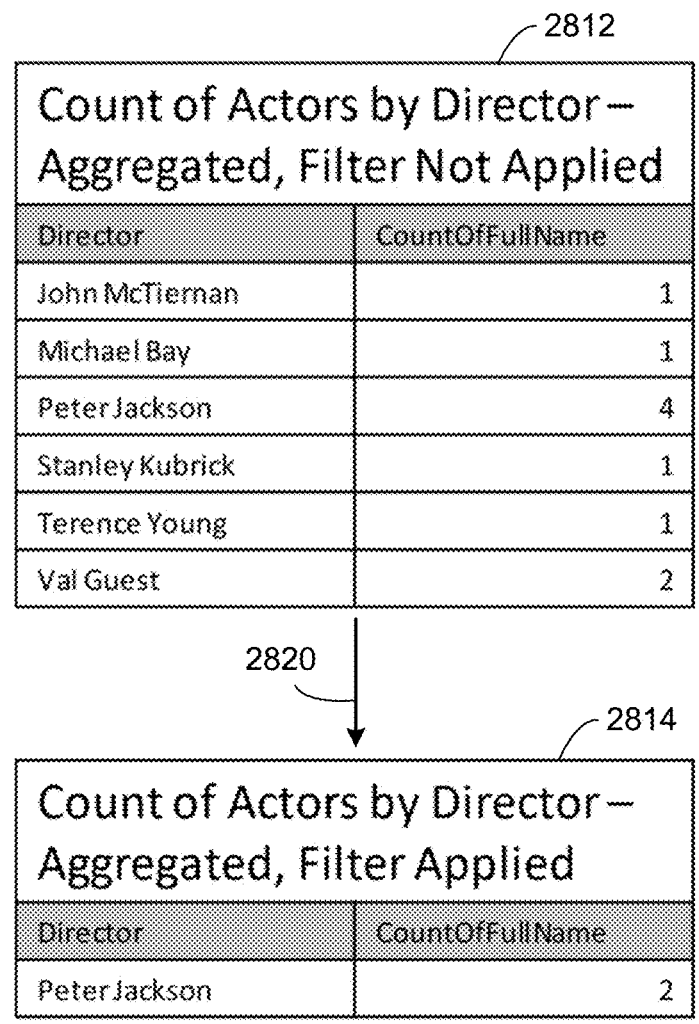
Figure 28C:
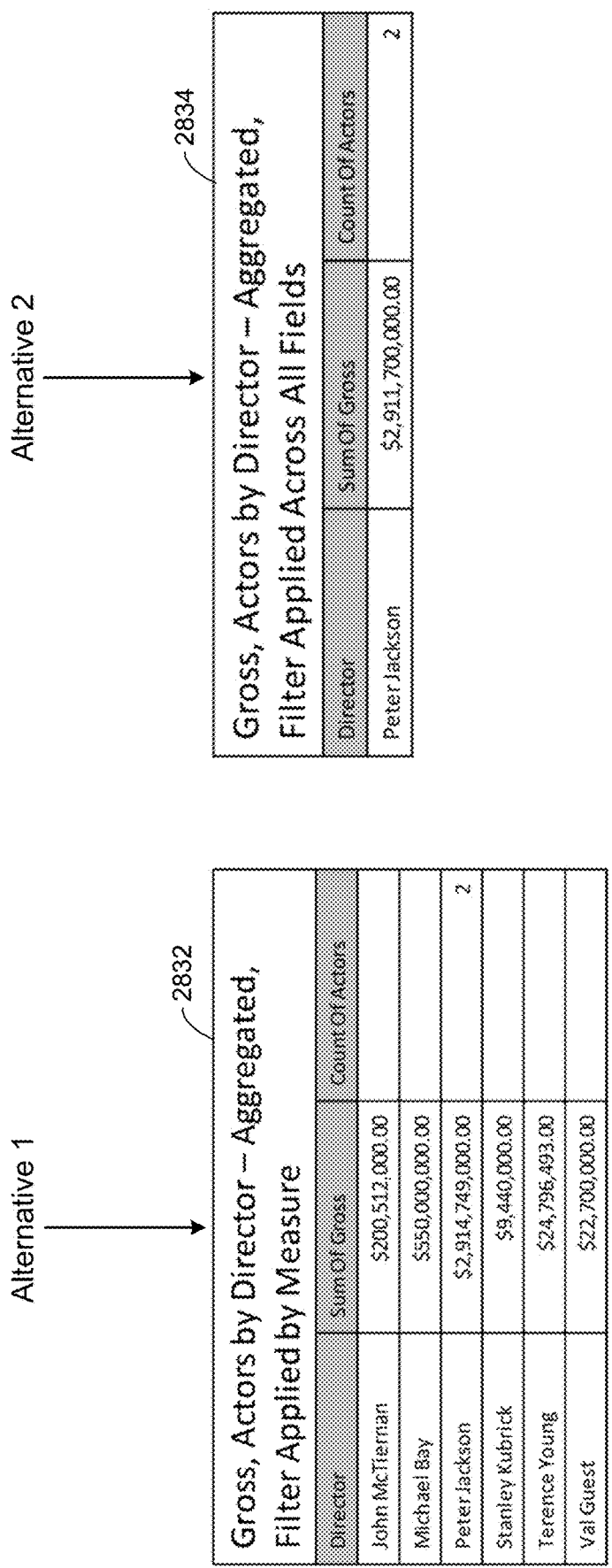

These issues are illustrated in FIGS. 28A-28C. In FIG. 28A, the first table 2802 has aggregated data, and the filter is not applied. If the filter is applied (2810), the result set 2804 has only a single row, and the data from that single row does not match the corresponding row in the first result set. Similarly, in FIG. 28B, the unfiltered first result set 2812 has six rows. If the data is filtered (2820), the result set 2814 has only a single row, and the count is different from the first result set.

FIG. 28C illustrates comparing two result sets 2832 and 2834 that apply the filters differently. In the first result set 2832, the filter is applied by measure, whereas in the second result set 2834, the filter is applied across all fields.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of generating data visualizations, comprising:
    at a computer having a display, one or more processors, and memory storing one or more programs configured for execution by the one or more processors:
    receiving a visual specification, which specifies a data source, a plurality of visual variables, and a plurality of data fields from the data source, wherein each of the visual variables is associated with a respective one or more of the data fields and each of the data fields is identified as either a dimension data field or a measure data field;
    identifying an object model of the data source, each object in the object model having a respective primary key;
    from the object model, identifying a minimal subtree that includes all of the dimension data fields;
    constructing a query from the minimal subtree that accesses the dimension data fields, the minimal subtree including a root node and all other objects in the minimal subtree are reachable from the root node by a sequence of relationships between primary keys and foreign keys of objects in the object model;
    executing the query against the data source to retrieve a set of tuples, each tuple in the set of tuples comprising a unique ordered combination of data values for the dimension data fields and forming a distinct data row in a data table for generating a data visualization;
    for each measure data field, extending the set of tuples by inserting an additional column in the data table whose values are aggregated data values corresponding to the respective measure data field; and
    building and displaying the data visualization according to the data fields in the extended set of tuples and according to the visual variables to which each of the data fields is associated.

2. The method of claim 1, wherein the visual specification further includes one or more additional visual variables that are not associated with any data fields from the data source.

3. The method of claim 1, wherein the aggregated data values corresponding to each measure data field are aggregated according to the dimension data fields.

4. The method of claim 1, further comprising displaying the data visualization in a graphical user interface for the computer.

5. The method of claim 4, wherein displaying the data visualization comprises generating a plurality of visual marks, each of the visual marks corresponding to a respective extended tuple.

6. The method of claim 4, wherein the graphical user interface includes a data visualization region, the method further comprising displaying the data visualization in the data visualization region.

7. The method of claim 1, wherein each of the visual variables is selected from the group consisting of: rows attribute, columns attribute, filter attribute, color encoding, size encoding, shape encoding, and label encoding.

8. The method of claim 1, wherein the aggregated data values are computed using an aggregate function selected from the group consisting of: SUM, COUNT, COUNTD, MIN, MAX, AVG, MEDIAN, ATTR, PERCENTILE, STDEV, STDEVP, VAR, and VARP.

9. The method of claim 1, wherein the plurality of data fields are from a plurality of distinct tables in the data source.

10. The method of claim 1, wherein the object model of the data source has a plurality of objects, and the plurality of data fields belong to two or more distinct objects of the plurality of objects.

11. The method of claim 1, wherein the visual specification specifies a plurality of data sources, the visual specification specifies one or more data fields from each of the plurality of data sources, and the object model is an object model for the plurality of data sources.

12. A computer system for generating data visualizations, comprising:
    a display;
    one or more processors; and
    memory;
    wherein the memory stores one or more programs configured for execution by the one or more processors, and the one or more programs comprising instructions for:
    receiving a visual specification, which specifies a data source, a plurality of visual variables, and a plurality of data fields from the data source, wherein each of the visual variables is associated with a respective one or more of the data fields and each of the data fields is identified as either a dimension data field or a measure data field;
    identifying an object model of the data source, each object in the object model having a respective primary key;
    from the object model, identifying a minimal subtree that includes all of the dimension data fields;
    constructing a query from the minimal subtree that accesses the dimension data fields, the minimal subtree including a root node and all other objects in the minimal subtree are reachable from the root node by a sequence of relationships between primary keys and foreign keys of objects in the object model;

executing the query against the data source to retrieve a set of tuples, each tuple in the set of tuples comprising a unique ordered combination of data values for the dimension data fields and forming a distinct data row in a data table for generating a data visualization;

for each measure data field, extending the set of tuples by inserting an additional column in the data table whose values are aggregated data values corresponding to the respective measure data field; and building and displaying the data visualization according to the data fields in the extended set of tuples and according to the visual variables to which each of the data fields is associated.

13. The computer system of claim 12, wherein the visual specification further includes one or more additional visual variables that are not associated with any data fields from the data source.

14. The computer system of claim 12, wherein the aggregated data values corresponding to each measure data field are aggregated according to the dimension data fields.

15. The computer system of claim 12, wherein the one or more programs further comprise instructions for:

generating a plurality of visual marks, each of the visual marks corresponding to a respective extended tuple; and displaying the data visualization in a graphical user interface for the computer system.

16. The computer system of claim 12, wherein each of the visual variables is selected from the group consisting of: rows attribute, columns attribute, filter attribute, color encoding, size encoding, shape encoding, and label encoding.

17. The computer system of claim 12, wherein the plurality of data fields are from a plurality of distinct tables in the data source.

18. The computer system of claim 12, wherein the object model of the data source has a plurality of objects, and the plurality of data fields belong to two or more distinct objects of the plurality of objects.

19. The computer system of claim 12, wherein the visual specification specifies a plurality of data sources, the visual specification specifies one or more data fields from each of the plurality of data sources, and the object model is an object model for the plurality of data sources.

20. A non-transitory computer-readable storage medium storing one or more programs configured for execution by a computer system having a display, one or more processors, and memory, the one or more programs comprising instructions for:

receiving a visual specification, which specifies a data source, a plurality of visual variables, and a plurality of data fields from the data source, wherein each of the visual variables is associated with a respective one or more of the data fields and each of the data fields is identified as either a dimension data field or a measure data field;

identifying an object model of the data source, each object in the object model having a respective primary key;

from the object model, identifying a minimal subtree that includes all of the dimension data fields;

constructing a query from the minimal subtree that accesses the dimension data fields, the minimal subtree including a root node and all other objects in the minimal subtree are reachable from the root node by a sequence of relationships between primary keys and foreign keys of objects in the object model;

executing the query against the data source to retrieve a set of tuples, each tuple in the set of tuples comprising a unique ordered combination of data values for the dimension data fields and forming a distinct data row in a data table for generating a data visualization;

for each measure data field, extending the set of tuples by inserting an additional column in the data table whose values are aggregated data values corresponding to the respective measure data field; and building and displaying the data visualization according to the data fields in the extended set of tuples and according to the visual variables to which each of the data fields is associated.

* * * * *